(12) United States Patent
Ishizuka

(10) Patent No.: US 6,229,140 B1
(45) Date of Patent: *May 8, 2001

(54) DISPLACEMENT INFORMATION DETECTION APPARATUS

(75) Inventor: Koh Ishizuka, Omiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,595

(22) Filed: Oct. 24, 1996

(30) Foreign Application Priority Data

Oct. 27, 1995 (JP) .................................................. 7-303608
Oct. 27, 1995 (JP) .................................................. 7-303609
Oct. 27, 1995 (JP) .................................................. 7-303610

(51) Int. Cl.$^7$ ...................................................... H01J 3/14
(52) U.S. Cl. ................................ 250/237 G; 250/231.18; 356/373
(58) Field of Search ......................... 250/237 G, 231.18, 250/231.16; 356/373, 375, 358

(56) References Cited

U.S. PATENT DOCUMENTS

| | | | |
|---|---|---|---|
| 4,477,189 | 10/1984 | Ernst | 356/374 |
| 5,073,710 | 12/1991 | Takagi et al. | 250/231.14 |
| 5,283,434 | 2/1994 | Ishizuka et al. | 250/237 G |
| 5,390,022 | 2/1995 | Ishizuka et al. | 356/356 |
| 5,448,358 | 9/1995 | Ishizuka et al. | 356/373 |
| 5,481,106 | 1/1996 | Nyui et al. | 250/237 G |
| 5,483,377 | 1/1996 | Kaneda et al. | 359/566 |
| 5,498,870 | 3/1996 | Ishizuka | 250/237 G |
| 5,506,681 * | 4/1996 | Igaki | 250/237 G |
| 5,557,396 | 9/1996 | Ishizuka et al. | 356/28.5 |
| 5,569,913 | 10/1996 | Ishizuka et al. | 250/237 G |
| 5,650,834 | 7/1997 | Nakagawa et al. | 349/139 |
| 5,691,787 | 11/1997 | Shimada et al. | 349/40 |

FOREIGN PATENT DOCUMENTS

| | | |
|---|---|---|
| 0 292 151 | 11/1988 | (EP) . |
| 0 376 165 | 7/1990 | (EP) . |
| 0 845 697 | 6/1998 | (EP) . |
| 63-63919 | 3/1988 | (JP) . |

* cited by examiner

Primary Examiner—Que T. Le
(74) Attorney, Agent, or Firm—Fitzpatrick, Cella, Harper & Scinto

(57) ABSTRACT

A displacement information detection apparatus includes a light generation unit, a first unit including a first grating for displacement information detection and one or more lens members for original detection, and a second unit including a second grating for displacement detection, which cooperates with the first grating, and an origin detection mark. The apparatus also includes at least one first light-receiving element for receiving light generated by the light generation unit and propagated via the first and second gratings, and outputting a signal including relative displacement information between the first and second units. The apparatus also includes one or more second light-receiving elements for receiving light generated by the light generation unit and propagated via the lens member. The second light-receiving elements output a signal indicating an origin based on a change in light-receiving state when the origin detection mark is present in the optical path of light leaving the lens member.

21 Claims, 53 Drawing Sheets

DISPLACEMENT INFORMATION DETECTION APPARATUS

BACKGROUND OF THE INVENTION

1. Field of the Invention

The present invention relates to a displacement information detection apparatus and, more particularly, to an apparatus suitably applied to encoders (linear encoders and rotary encoders) which irradiate gratings attached to a scale (first substrate) and a substrate (second substrate) with a light beam which move relative to each other, and detects phase- or intensity-modulated signal light obtained therefrom, thereby detecting displacement information such as the position, position deviation amount, position deviation direction, velocity, acceleration, origin position, and the like associated with the scale and the substrate.

Also, the present invention relates to an apparatus suitably applied to an apparatus (a motor with an encoder or the like) which controls the current amount or direction of a driving apparatus such as an AC motor on the basis of such displacement information to rotate an object.

2. Related Background Art

Conventionally, an incremental type encoder is popularly used as an apparatus for measuring relative displacement information (displacement amount, velocity, acceleration, and the like) of an object with high precision. The encoder includes an apparatus for detecting origin information so as to calculate absolute position information.

In general, in an incremental signal detection mechanism in an encoder, a repetitive grating pattern of transparent and non-transparent (or reflection and non-reflection) portions is recorded on a relatively moving scale (first substrate), and a slit pattern (grating pattern) having the same pitch as the repetitive grating pattern is also recorded on a stationary slit substrate (second substrate). These substrates are stacked to be separated from each other by a gap G, and a collimated light beam irradiates the substrates. At this time, the transmission optical amount periodically changes in correspondence with the degree of coincidence between the patterns of the two substrates upon movement of the scale. The change amount at that time is detected by a light-receiving element to obtain an electrical sinusoidal incremental signal. Also, the signal is further converted into a rectangular wave signal by a binarization circuit to obtain an electrical incremental signal.

In an origin signal detection mechanism, a plurality of random grating patterns including transparent and non-transparent (or reflection and non-reflection) portions are recorded on a relatively moving scale, and the same random grating patterns are recorded on a stationary slit substrate. These substrates are stacked to be separated each other by a gap G, and a collimated light beam is irradiated onto the substrate. At this time, a signal light pulse having a maximum transmission optical amount is obtained at an instance when the patterns of the two substrates perfectly coincide with each other upon movement of the scale. The signal light pulse is detected by a light-receiving element to obtain an origin signal. Furthermore, the signal is converted into a rectangular wave signal by a binarization circuit to obtain an electrical origin signal.

On the scale and the slit substrate used for detecting relative displacement information, the grating patterns and origin patterns are juxtaposed. In many cases, an incremental signal and an origin signal are parallelly detected at the same time using a single optical system. In this case, both the detection principle of an incremental signal and that of an origin signal utilize the modulation effect of the transmission optical amount which depends on changes in degree of overlapping between the scale and the slit substrate.

Recent encoders are required to have high resolution in detection of displacement information. In order to detect an incremental signal with higher precision and higher resolution, grating patterns for detecting an incremental signal must be recorded at higher density. However, with this arrangement, the contrast of an intensity pattern tends to decrease owing to diffraction of light before the light is transmitted through the slit array on the scale and reaches that on the slit substrate.

In view of this problem, a method of reducing the gap between a scale substrate and a slit substrate (detection head) to several 10 μm is known. However, when the two substrates are too close to each other, they may contact and damage each other due to errors a scale guide mechanism, and cannot be set so close to each other.

As a method of detecting an origin signal having a high resolution, a light beam is linearly condensed on an origin pattern track (ideally, a transparent/non-transparent pattern) arranged on a scale using a lens or a cylinder lens which is arranged in addition to optical elements used for detecting an incremental signal to illuminate an origin pattern consisting of a single slit aperture pattern formed on the scale. Changes in transmission optical amount from the origin pattern upon movement of the scale are detected, thereby obtaining an origin signal at a resolution as high as the detection resolution of an incremental signal.

However, a condensed light beam is required for detecting an origin signal. For example, a cylinder lens or the like must be inserted at a position near the slit aperture pattern between a collimator lens and the scale, and as a result, a size reduction and assembly of the apparatus become difficult.

Furthermore, since the cylinder lens is inserted, the detection timing of an origin signal deviates depending on the way of attaching the cylinder lens, and it becomes difficult to satisfactorily synchronize an origin signal with an incremental signal.

SUMMARY OF THE INVENTION

It is the first object of the present invention to provide a displacement information detection apparatus which can detect an origin signal with higher precision and higher resolution while attaining a size reduction of the entire apparatus, and can obtain relative displacement information with high precision.

Other objects of the present invention will become apparent from the following description of the embodiments.

DETAILED DESCRIPTION OF THE PREFERRED EMBODIMENTS

Figure 1:
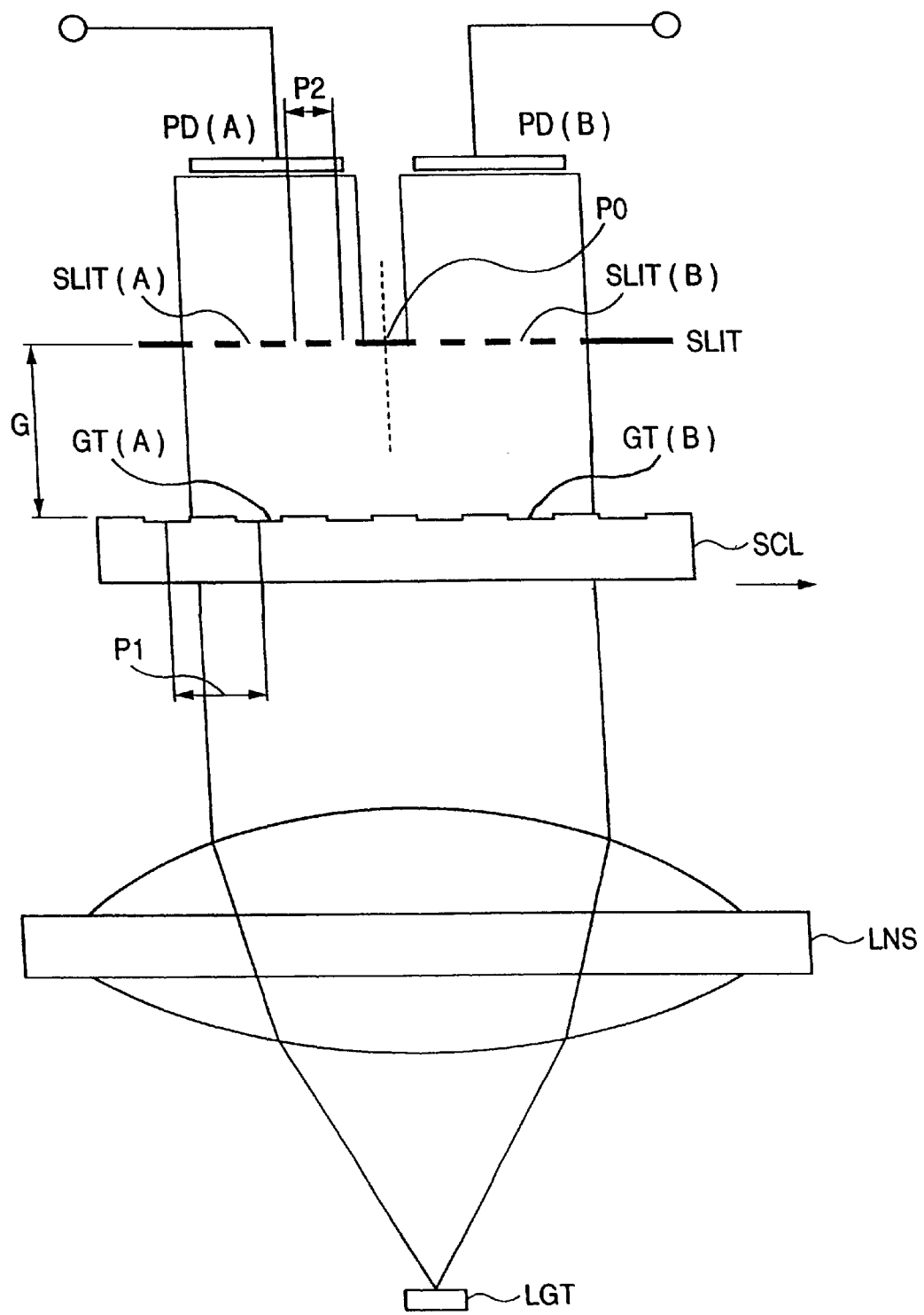
FIG. 1 is an explanatory view of an incremental signal detection optical system according to the first embodiment of the present invention.
Figure 2:
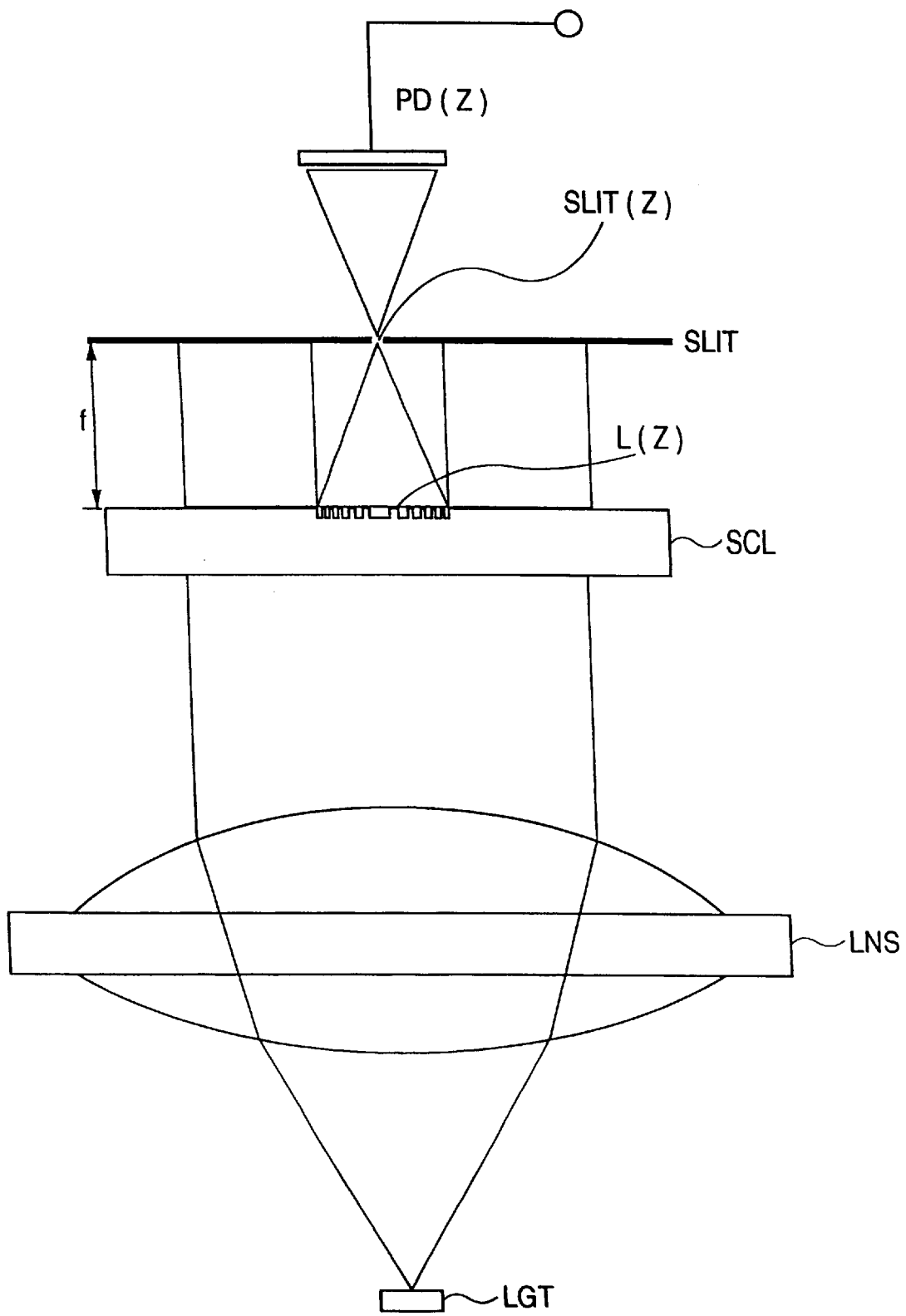
FIG. 2 is an explanatory view of an analog origin signal detection optical system in the first embodiment of the present invention.
Figure 3:
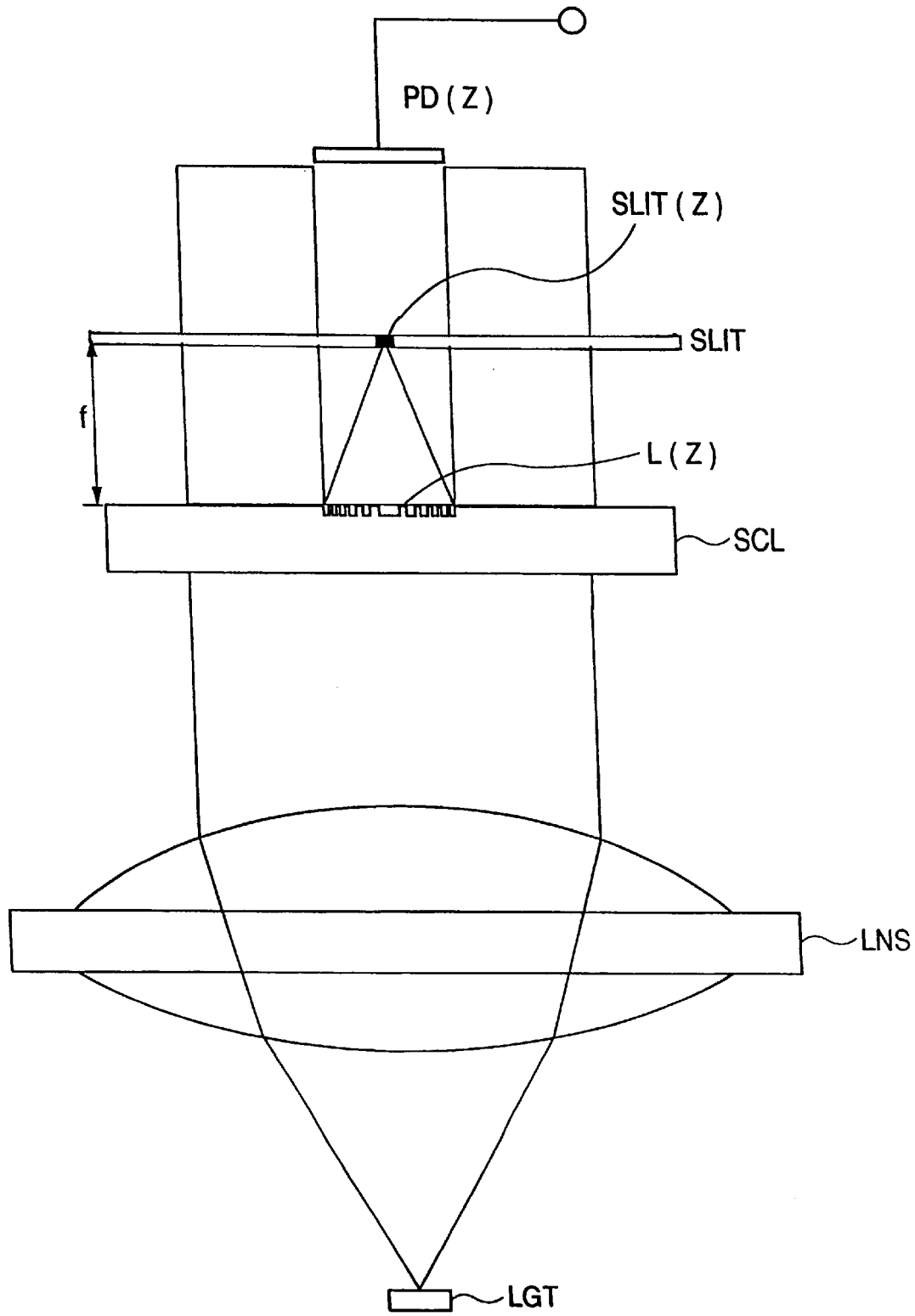
FIG. 3 is an explanatory view of another embodiment of the analog origin signal detection optical system in the first embodiment of the present invention.
Figure 4:
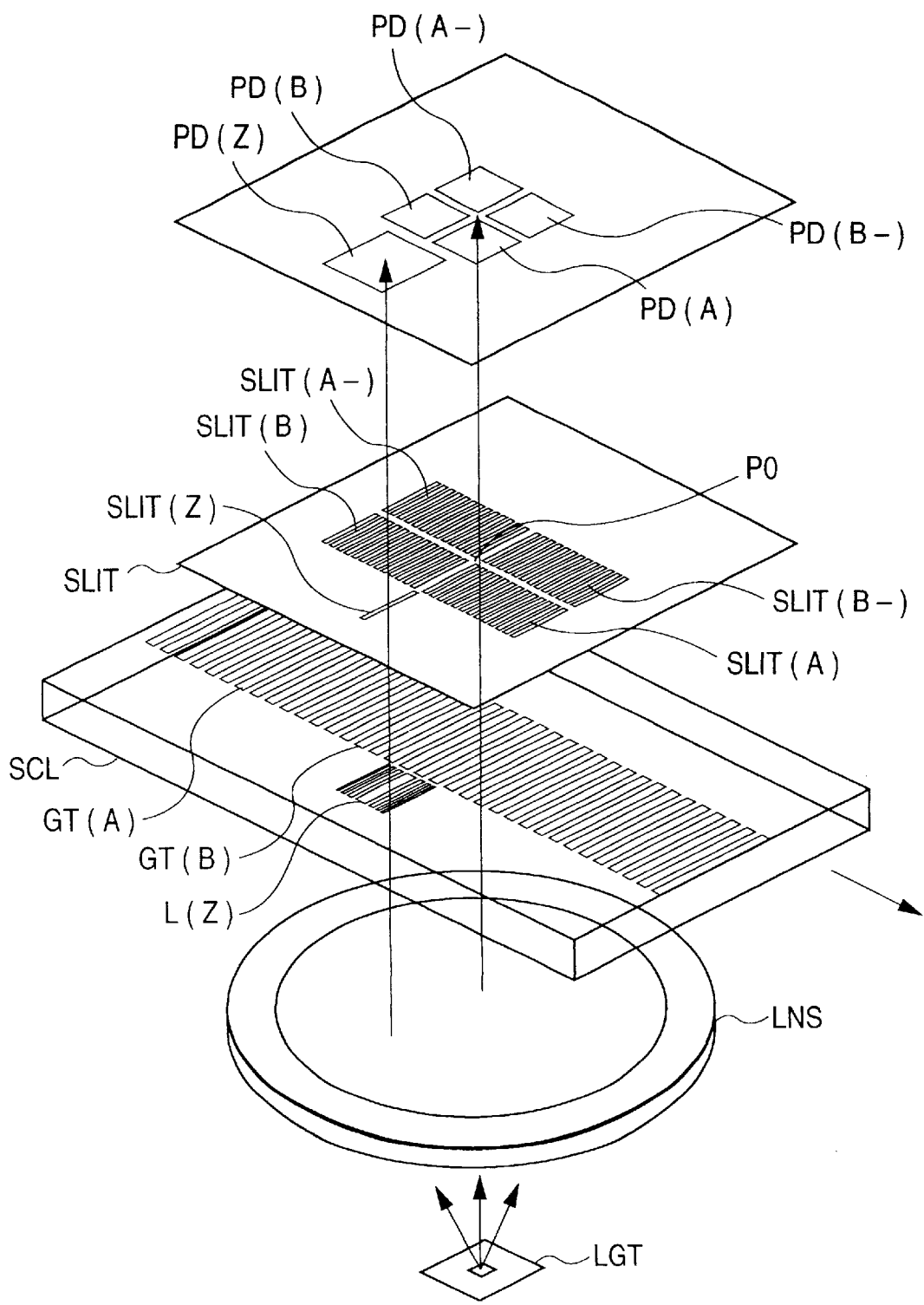
FIG. 4 is a schematic perspective view showing principal part of the first embodiment of the present invention.
Figure 5A:
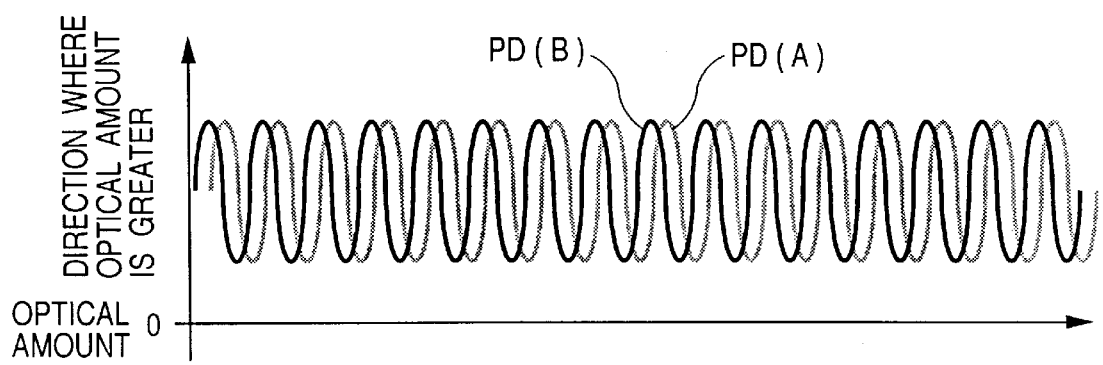
FIGS. 5A, 5B, and 5C are explanatory views of signals from a light-receiving means in the first embodiment of the present invention.
Figure 5B:
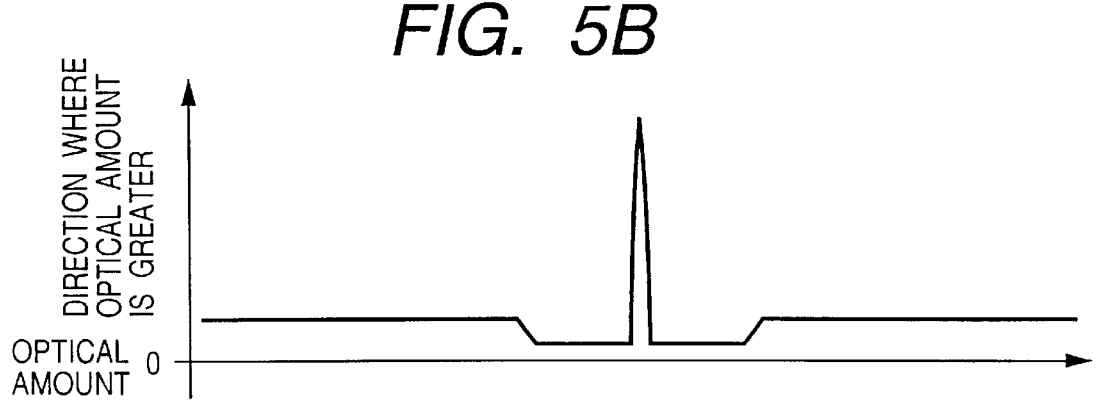
Figure 5C:
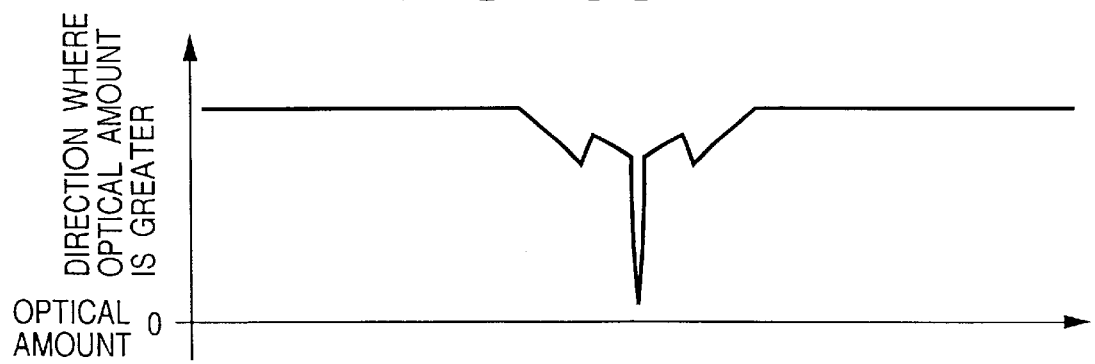

FIG. 1 is a sectional view showing principal part of an incremental signal detection optical system according to the first embodiment of the present invention, and FIG. 2 is a sectional view showing principal part of an analog origin signal detection optical system according to the first embodiment of the present invention. FIG. 3 is a sectional view showing principal part when the system shown in FIG. 2 is partially modified. FIG. 4 is a perspective view showing principal part when the incremental signal detection optical system shown in FIG. 1 and the analog origin signal detection optical system shown in FIG. 2 are combined, and FIGS. 5A, 5B, and 5C are explanatory views of signals obtained by a light-receiving means in the first embodiment.

Referring to FIGS. 1 to 4, a scale SCL serving as a first substrate is movable in the direction of an arrow in FIG. 1, and is attached to a moving object (not shown). Two phase gratings (grating patterns) GT(A) and GT(B) for an incremental signal, and an origin lens (this lens comprises a diffraction lens having a linear pattern; also called a linear diffraction lens or linear Fresnel zone plate) L(Z) for an origin signal are formed on different tracks on the scale SCL.

A slit substrate SLIT serving as a second substrate opposes the scale SCL to be separated by a gap G of about 50 to several 100 $\mu$m. The slit substrate SLIT is divided into four regions to have a point PO as a boundary, and slit gratings SLIT(A), SLIT(B), SLIT(A-), and SLIT(B-) whose grating layout positions are shifted from each other by ¼ pitches are respectively formed on the divided regions. Also, an origin slit grating (origin slit) SLIT(Z) is formed on a track different from that of the slit gratings SLIT(A), SLIT (B), SLIT(A-), and SLIT(B-) on the slit substrate SLIT.

A light source means LGT such as an LED has low coherency. A collimator lens LNS converts a light beam emitted by the light source means LGT into a collimated light beam. The light source means LGT and the collimator lens LNS are constituting elements of a light-projection means. A light-receiving means PD has four light-receiving elements PD(A), PD(B), PD(A-), and PD(B-) for receiving diffracted light components diffracted by the slit gratings SLIT(A), SLIT(B), SLIT(A-), and SLIT(B-), and a light-receiving element PD(Z) for an origin signal.

In this embodiment, the light source means LGT, the collimator lens LNS, the slit substrate SLIT, and the light-receiving means PD are housed in a detection head and are fixed in position.

A method of detecting the incremental signal in this embodiment will be described below with reference to FIG. 1. A light beam emitted by the light source means LGT is converted into a collimated light beam by the collimator lens LNS, and the light beam is illuminated on the scale SCL which moves relative to the substrate SLIT. The collimated light beam simultaneously illuminates the phase grating track for an incremental signal and the origin diffraction lens track for an origin signal on the scale SCL.

As shown in FIG. 1, the phase grating track for an incremental signal generates diffracted light beams by the phase gratings GT(A) and GT(B) each having a three-dimensional pattern, and projects an intensity pattern having a pitch half the original grating pitch onto a space separated by 50 to several 100 $\mu$m. Note that each of the phase gratings GT(A) and GT(B) comprises a lamellar grating having a fine structure that does not generate any 0th-order diffracted light. Also, recess and projecting portions of each grating transmit light.

The intensity pattern projected onto the slit substrate SLIT by the phase gratings GT(A) and GT(B) on the scale SCL is selectively transmitted through or shielded by the slit gratings SLIT(A), SLIT(B), SLIT(A-), and SLIT(B-) on the slit substrate SLIT, which have the same pitch as that of the intensity pattern, in correspondence with the positional relationship between the intensity pattern and the slit gratings SLIT(A), SLIT(B), SLIT(A-), and SLIT(B-).

The four slit gratings SLIT(A), SLIT(B), SLIT(A-), and SLIT(B-) are formed on four regions divided to have the point PO as a boundary, so that their grating layout phases are shifted from each other by ¼ pitches. With this arrangement, the timings of changes in intensity of signal light components transmitted through these regions are shifted from each other by ¼ periods, thereby generating so-called A- and B-phase signals. In this case, when the phase gratings GT(A) and GT(B) move by one pitch upon movement of the scale SCL, the intensity pattern moves by two pitches, and the intensity of the light beam transmitted through the slit grating SLIT changes twice sinusoidally.

FIG. 5A shows the state of an intensity signal when the amounts of light beams that reach the two light-receiving elements PD(A) and PD(B) of the four light-receiving elements change upon relative movement of the scale SCL. This intensity signal light is received by the light-receiving elements PD(A) and PD(B), and a sinusoidal analog signal current for two periods is obtained from the light-receiving elements PD(A) and PD(B) upon movement of the scale SCL by one pitch of the phase grating. For example, if the phase grating pitch of the scale SCL is P=20 $\mu$m, a sinusoidal analog signal current having a period of 10 $\mu$m is obtained.

In this embodiment, as described above, the light-receiving means PD obtains an incremental signal upon movement of the scale SCL.

In this embodiment, two slit gratings SLIT(A) and SLIT (B) which are shifted from each other by ¼ pitches may be arranged in place of the four slit gratings on the slit substrate SLIT, and two light-receiving elements PD(A) and PD(B) may be arranged in place of the four light-receiving elements of the light-receiving means PD, so that A- and B-phase signals may be obtained by the two light-receiving elements.

A method of detecting the analog origin signal in this embodiment will be explained below with reference to FIG. 2. As shown in FIG. 2, a light beam that illuminates the origin lens L(Z) on the scale SCL projects a linearly condensed light pattern onto a space corresponding to the position of the focal length f of the origin lens L(Z), and enters one origin slit SLIT(Z) of the slit substrate SLIT arranged at the projection space. The light beam that has passed through the origin slit SLIT(Z) of the slit substrate SLIT is incident on the light-receiving element PD(Z). A width a (the width of a region having an intensity of ½ or higher) of the condensed light beam is set to be equal to or smaller than a width b of the origin slit SLIT(Z). That is, the respective elements are set so that the relation of a≦b is satisfied.

At an instance when a light beam illuminates the entire origin lens L(Z), and the lens and the slit coincide with each other upon relative movement of the scale SCL, a light beam having a maximum optical amount passes through the origin slit SLIT(Z). Hence, the light beam having the maximum optical amount is incident on the light-receiving element PD(Z), thus outputting a pulse-shaped sharp waveform.

FIG. 5B shows the state of changes in optical amount of light that reaches the light-receiving element PD(Z) upon relative movement of the scale. In this embodiment, portions, on both sides of the origin lens L(Z), of the origin lens L(Z) track on the scale SCL are simply light beam transmission portions, and straight transmission light becomes incident on the light-receiving element PD(Z) upon relative movement of the origin lens L(Z). For this reason, even when the origin lens L(Z) is not present, the light-receiving element PD(Z) detects some light amount.

In this embodiment, in order to prevent straight transmission light from being incident on the light-receiving element PD(Z) when a light beam illuminates the entire origin lens L(Z), the width of the light-receiving element PD(Z) is set to be smaller than that of the origin lens L(Z), thereby improving the S/N ratio of the origin signal.

FIG. 3 is a schematic view showing principal part of an embodiment when the transparent and non-transparent portions of the origin slit grating SLIT(Z) on the slit substrate SLIT shown in FIG. 2 replace each other. According to the arrangement shown in FIG. 3, at an instance when the origin lens L(Z) and the origin slit grating SLIT (Z) coincide with each other upon relative movement of the scale SCL, all the light beam components are shielded, and the sum total of them is minimized. As a result, a transmission light beam having a minimum optical amount is incident on the light-receiving element PD(Z), and a pulse-shaped sharp waveform obtained by inverting that shown in FIG. 5B is output, as shown in FIG. 5C.

In this embodiment as well, portions, on both sides of the origin lens L(Z), of the origin lens L(Z) track on the scale SCL are simply light beam transmission portions, and straight transmission light is incident in a large amount on the light-receiving element PD(Z) upon relative movement of the origin lens L(Z). For this reason, when the origin lens L(Z) is not present, a large optical amount is detected.

When the origin lens L(Z) reaches an illumination region upon relative movement, a light beam incident on the peripheral portion of the origin lens L(Z) initially falls outside the origin slit grating SLIT(Z) on the slit substrate SLIT, and is incident on a portion outside the light-receiving element PD(Z). For this reason, the optical amount of light incident on the light-receiving element PD(Z) begins to decrease. After a while, a light beam incident on a portion near the central portion of the origin lens L(Z) slightly falls outside the origin slit grating SLIT(Z) on the slit substrate SLIT but is incident on the light-receiving element PD(Z). For this reason, the optical amount of light incident on the light-receiving element PD(Z) is temporarily recovered.

Soon, the light beam incident on the entire origin lens L(Z) matches the origin slit grating SLIT(Z) on the slit substrate SLIT and becomes shielded, and the straight light beam ceases to become incident on the light-receiving element PD(Z). In this embodiment, an analog origin signal is obtained in this manner.

Extraction of a digital origin signal and its signal processing system in this embodiment will be described below.

Figure 6A:
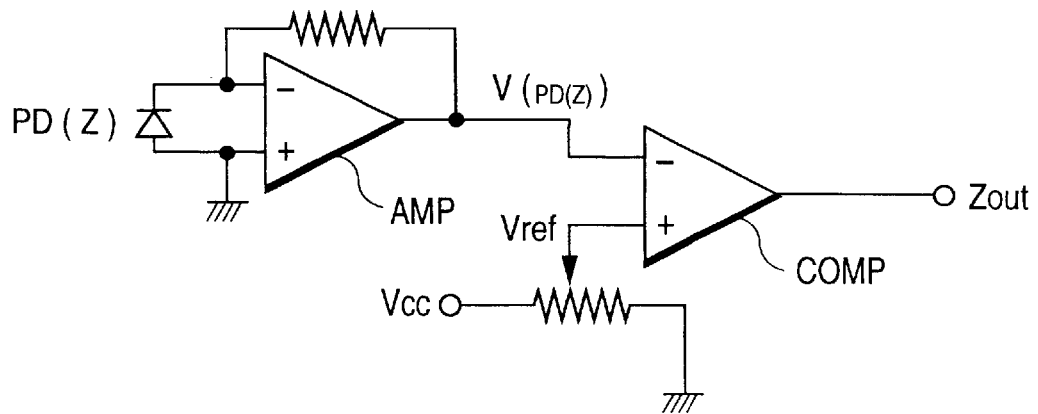
FIGS. 6A and 6B are explanatory views of conversion into a digital origin signal in the first embodiment of the present invention.
Figure 6B:
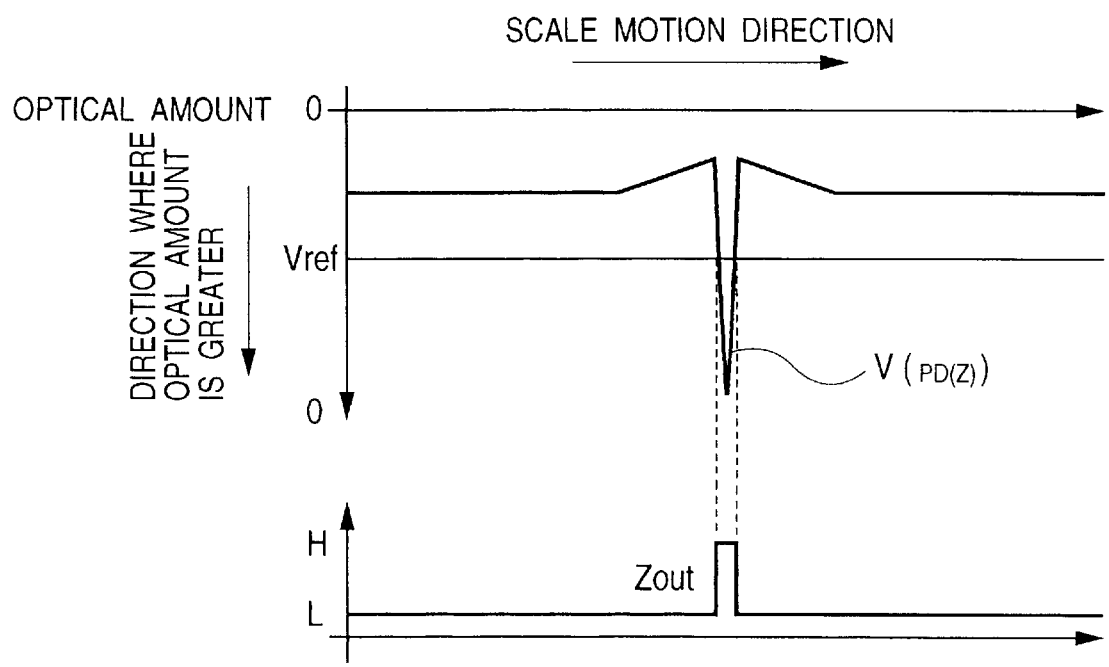

FIG. 4 is a perspective view showing the arrangement of the overall optical system obtained when the incremental signal detection optical system shown in FIG. 1 and the origin signal detection optical system shown in FIG. 2 are combined. FIG. 6A is an explanatory view of a circuit for obtaining a digital origin signal from the output of the light-receiving element PD(Z), and FIG. 6B is an explanatory view showing the state of changes in signal level in the circuit shown in FIG. 6A upon relative movement of the scale SCL. As shown in FIG. 6B, an appropriately set reference voltage Vref and an analog origin signal V(PD(Z)) obtained from the output from the light-receiving element PD(Z) via an amplifier AMP are compared by a comparator COMP to binarize the signal V(PD(Z)), and the binarized signal is output as a digital origin signal.

In FIG. 4, the slit substrate SLIT for an incremental signal is divided into four regions, i.e., the slit gratings SLIT(A), SLIT(B), SLIT(A-), and SLIT(B-), which are formed to have a 90° phase difference from each other. When light beams diffracted by these gratings are received by the four corresponding light-receiving elements PD(A), PD(B), PD(A-) and PD(B-), 4-phase incremental signals having a 90° phase difference from each other are obtained. The method of detecting the incremental signal is the same as that shown in FIG. 1. Also, the method of detecting the origin signal is the same as that shown in FIG. 2.

As described above, in this embodiment, the incremental and origin signal detection optical systems are constituted using common components. In particular, the incremental and origin signal detection optical systems are constituted, as shown in FIGS. 1 and 2, and are integrally arranged, as shown in FIG. 4. A distance G from the scale SCL to the position where an intensity pattern of a pitch half the grating pitch is generated by the phase gratings for an incremental signal is set to be nearly equal to the focal length f of the origin lens, so that the slit gratings SLIT(A), SLIT(B), SLIT(A-) and SLIT(B-) for an incremental signal and the origin slit grating SLIT(Z) for origin detection can be formed on a single substrate. In this manner, the slit substrate SLIT is commonly used. Also, the light-receiving means PD for an incremental signal, the light-receiving element PD(Z) for an origin signal, and other light-receiving elements are integrally formed as a light-receiving element array on a single substrate, thus simplifying the apparatus. In this embodiment, the following effects are similarly obtained.

(A1) The productivity is splendid.

For example, both the origin lens L(Z) and the phase gratings GT(A) and GT(B) for an incremental signal formed on the scale SCL are transparent three-dimensional optical elements, and can be manufactured by the same manufacturing method such as replica, injection molding, or the like, thus achieving a great cost reduction. In particular, when the origin lens is patterned as a diffraction lens, both the origin lens and the phase gratings have lamellar phase grating patterns, and the step of their projecting and recess portions is determined not to generate 0th-order diffracted light. For this reason, the manufacturing method based on glass etching, and a replica or injection molding method using the same can be used, thus realizing optical elements with very high productivity.

(A2) High-resolution origin and incremental signals are easily obtained.

When the condensed light beam width by the origin lens L(Z) on the scale SCL and the slit width of the origin slit grating SLIT(Z) are decreased, an origin signal having a high resolution required can be easily obtained.

(A3) A downsizing is easy.

Since the phase gratings for an incremental signal and the origin lens are juxtaposed on the scale SCL, the slit gratings SLIT(A), SLIT(B), SLIT(A-), and SLIT(B-) for an incremental signal and the origin slit grating SLIT(Z) are juxtaposed on the slit substrate SLIT, and the four light-receiving elements PD(A), PD(B), PD(A-), and PD(B-) for an incremental signal and the light-receiving element PD(Z) for an origin signal are juxtaposed as a light-receiving element array on the light-receiving element substrate, the respective signal detection optical system members can be commonly used, and special-purpose origin detection members can be omitted, thus realizing a downsizing.

(A4) The origin and incremental signals can be synchronized.

Since both the incremental and origin signals are detected with reference to the scale and the slit substrate, the relationship between the incremental and origin signals are mechanically stabilized, and synchronous signals are obtained.

Figure 7:
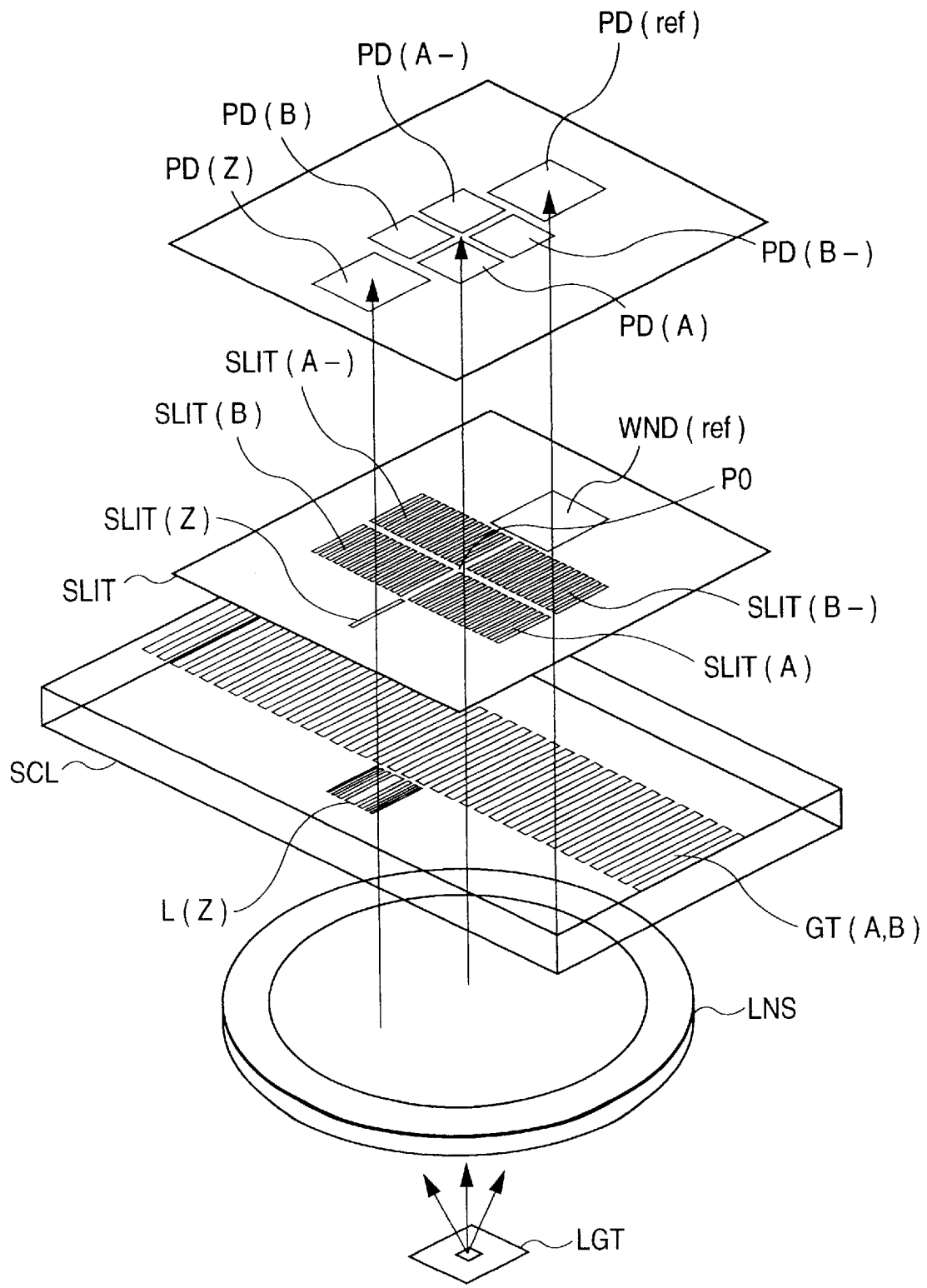
FIG. 7 is a schematic perspective view showing principal part of the second embodiment of the present invention.

FIG. 7 is a schematic perspective view showing principal part of the second embodiment of the present invention. In this embodiment, as compared to the first embodiment, an optical amount monitor track (the entire track is a transparent portion) is added to be juxtaposed with the origin lens track and the incremental phase grating track on the scale SCL, and is illuminated with the same collimated light beam which is also irradiated onto the origin lens track and the incremental phase grating track on the scale SCL. The light beam is transmitted trough the optical amount monitor track and an aperture portion WND(ref) formed on the slit substrate SLIT, and is received by a light-receiving element PD(ref) for monitoring the optical amount. Other arrangements are the same as those in the first embodiment.

Figure 8A:
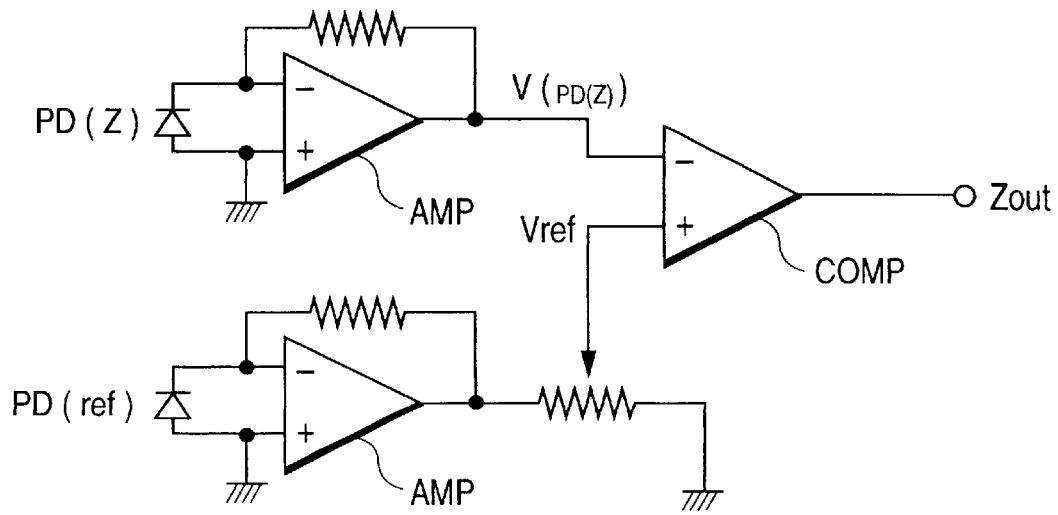
FIGS. 8A and 8B are explanatory views of conversion into a digital origin signal in the second embodiment of the present invention.
Figure 8B:
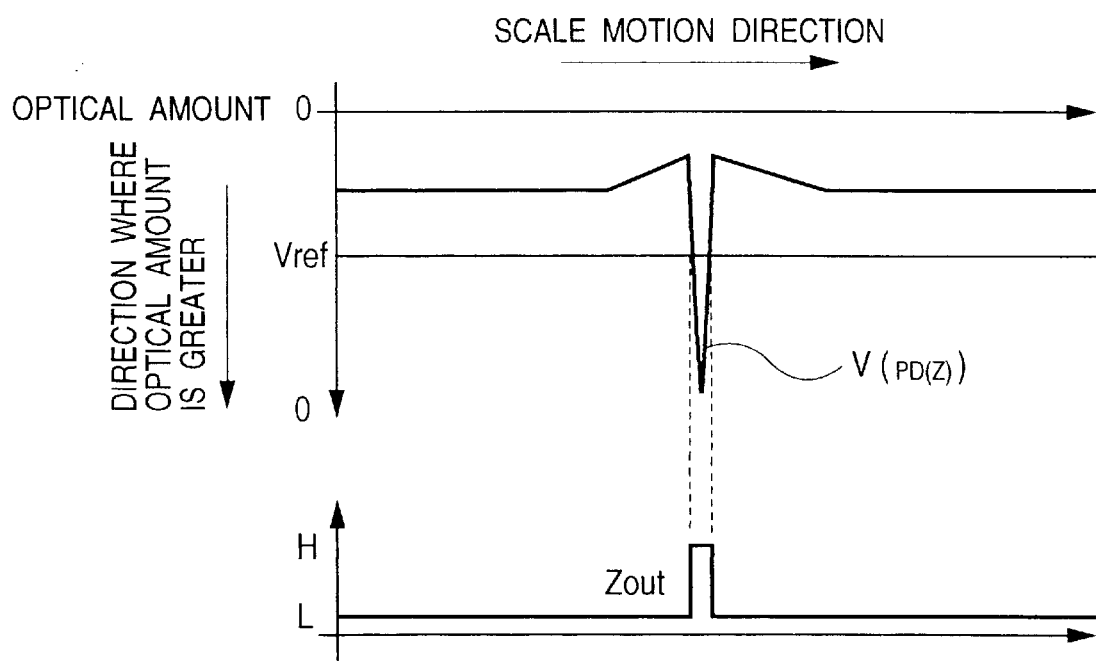

FIG. 8A is an explanatory view of a circuit for obtaining a digital origin signal from the output signals from the light-receiving elements PD(Z) and PD(ref) in this embodiment. In FIG. 8A, the optical amount level detected by the light-receiving element PD(ref) is multiplied with an appropriate coefficient to generate a reference voltage signal Vref, which is compared with an analog origin signal V(PD(Z)) by a comparator, thus binarizing the origin signal and outputting a binarized signal. FIG. 8B is an explanatory view showing the state of changes in signal level in the circuit shown in FIG. 8A upon relative movement of the scale SCL.

In this embodiment, an origin signal can be detected without being influenced by variations in optical amount of light from the light source means.

Figure 9:
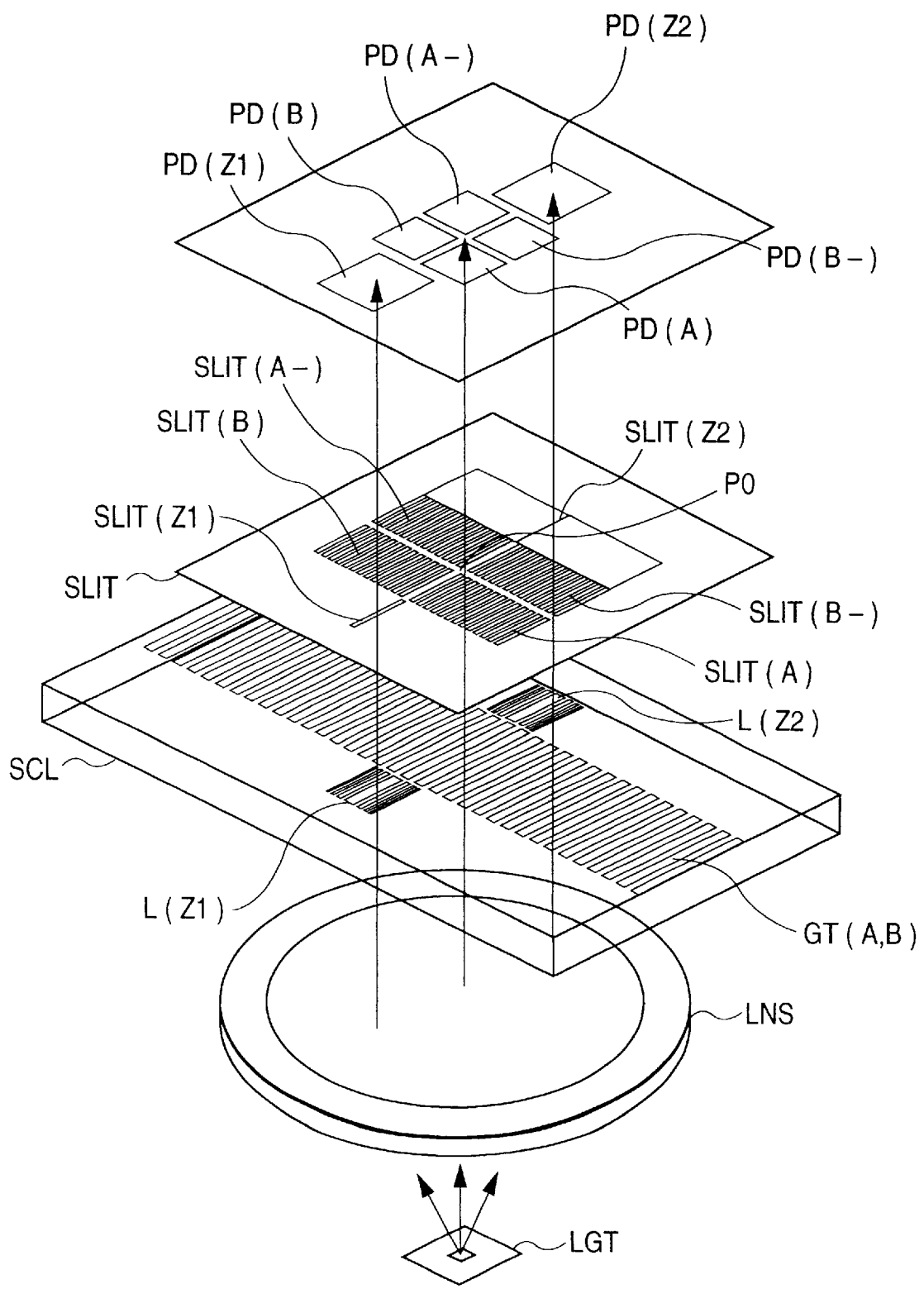
FIG. 9 is a schematic perspective view showing principal part of the third embodiment of the present invention.

FIG. 9 is a schematic perspective view showing principal part of the third embodiment of the present invention. In this embodiment, as compared to the first embodiment shown in FIG. 4, another origin lens track L(Z2) is arranged to be juxtaposed with an origin lens track L(Z1) and the incremental phase grating track on the scale SCL, and is illuminated with the same collimated light beam as that which illuminates the origin lens track and the incremental phase grating track on the scale SCL. The light beam is transmitted through an origin slit grating SLIT(Z1) and is received by a light-receiving element PD(Z1) for origin detection, and at the same time, the light beam is transmitted through a reversed slit array SLIT(Z2) for origin detection and is received by a light-receiving element PD(Z2). Other arrangements are the same as those in the first embodiment.

Figure 10A:
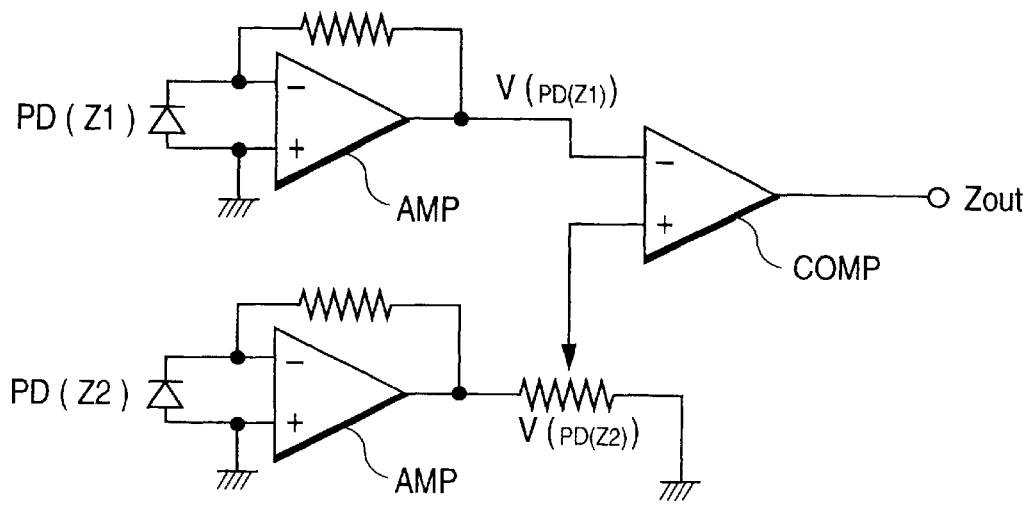
FIGS. 10A and 10B are explanatory views of conversion into a digital origin signal in the third embodiment of the present invention.

FIG. 10A is an explanatory view of a circuit for obtaining a digital origin signal from the output signals from the light-receiving elements PD(Z1) and PD(Z2). In FIG. 10A, two detected analog origin signals (PD(Z1)) and (PD(Z2)) which are inverted from each other are compared by a comparator to be binarized, and a binarized signal is output.

Figure 10B:
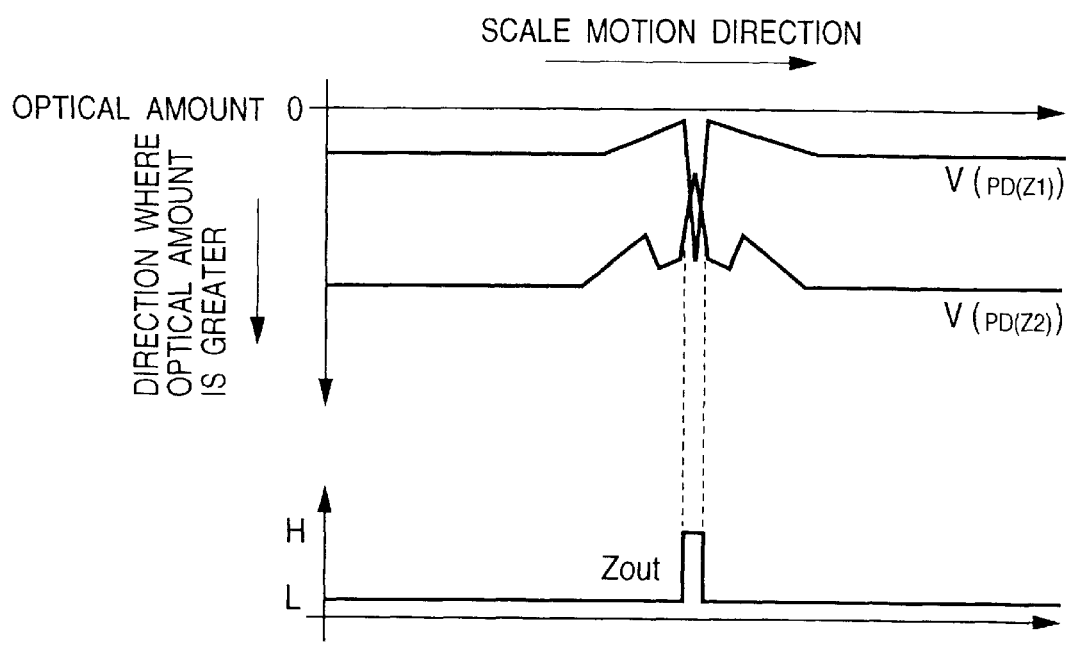

FIG. 10B is an explanatory view showing the state of changes in signal level in the circuit shown in FIG. 10A upon relative movement of the scale SCL.

In this embodiment, origin detection can be made without being influenced by variations in optical amount of light from the light source means. In addition, when an analog origin signal shown in FIG. 2 or 3 is small, the amplitude difference between peak signals can be increased, and binarization of the comparator can be performed more stably.

Figure 11A:
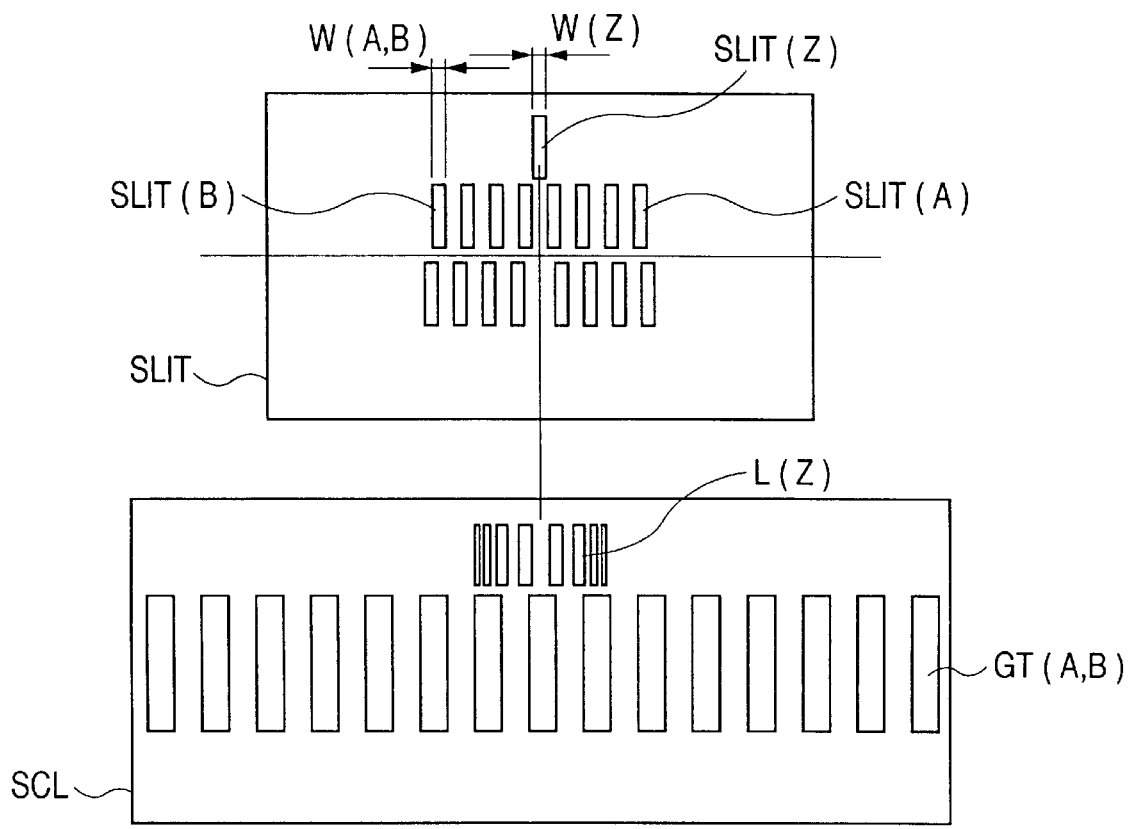
FIGS. 11A and 11B are explanatory views of a synchronization method of an origin signal and an incremental signal in an embodiment of the present invention.
Figure 11B:
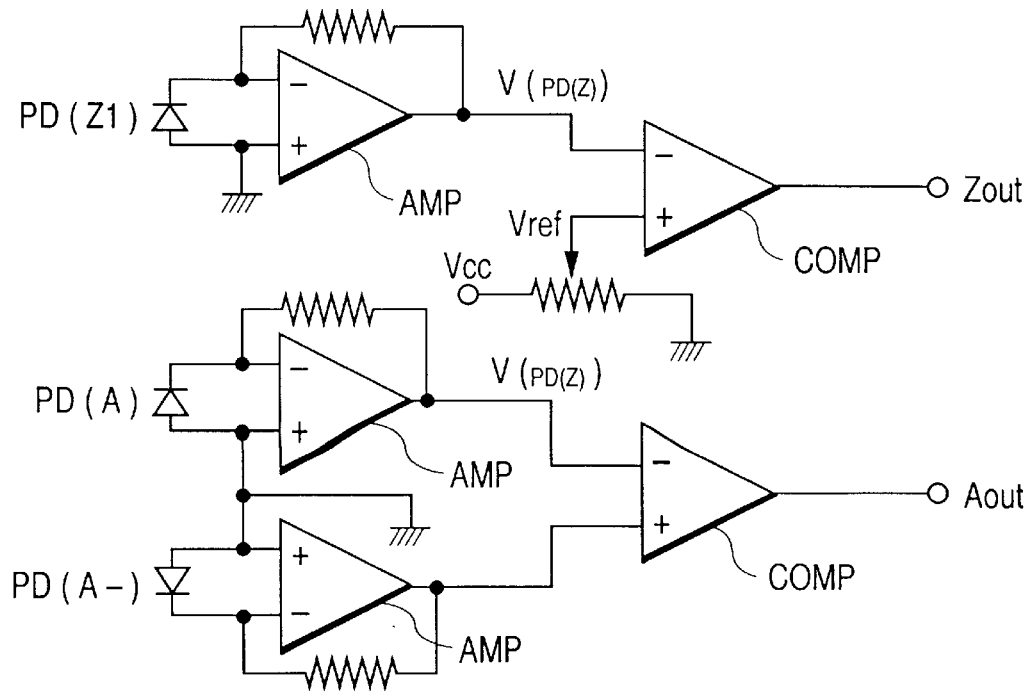

In the displacement information detection apparatus according to the present invention, incremental and origin signals are synchronized, and a method of synchronizing the two signals will be explained below. FIGS. 11A and 11B are explanatory views of the third embodiment when incremental and origin signals are synchronized in the present invention. As shown in FIG. 11A, let W(A,B) be the slit width of each of the slit gratings SLIT(A) and SLIT(B) for an incremental signal, and W(Z) be the slit width of the origin slit grating SLIT(Z). Then, these widths are determined so that:

$$W(A,B)=W(Z)$$

As a result, an incremental signal Aout and an origin signal Zout obtained by binarization circuits shown in FIG. 11B have substantially equal detection resolutions (in the case of a digital origin signal obtained by binarizing a peak signal of an analog origin signal by a ½ voltage).

Figure 12:
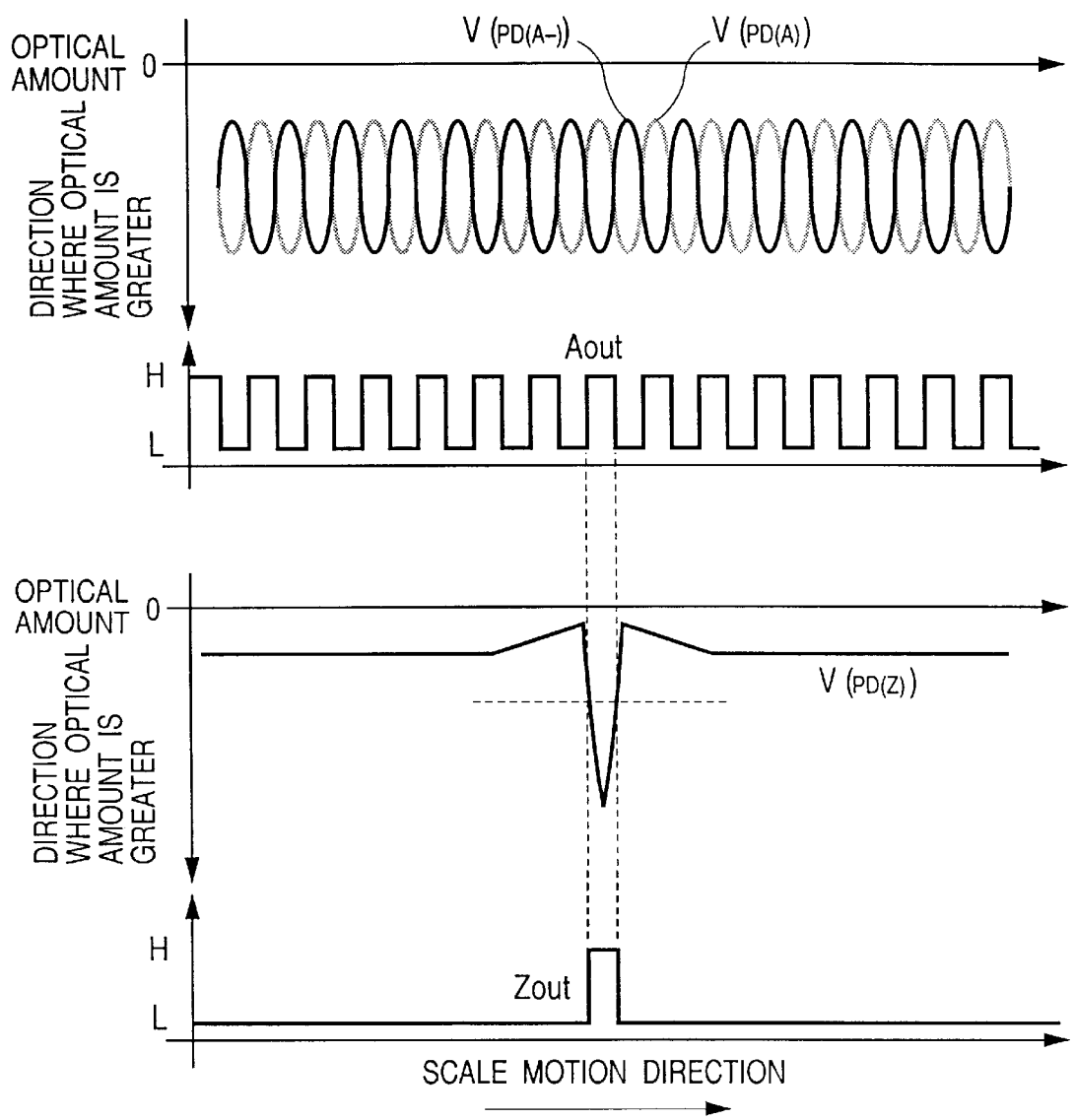
FIG. 12 is an explanatory view of a synchronization method of an origin signal and an incremental signal in the embodiment of the present invention.

In this embodiment, since both incremental and origin signals are generated by detecting, using a single slit substrate, the intensity pattern and condensed light projected by the single scale SCL onto a space, the detection timings of the two signals hardly shift from each other. More specifically, since the relationship between the origin and incremental signals is optically and mechanically fixed, the two signals are substantially synchronized. FIG. 12 is an explanatory view showing changes in origin signal level (upper side) and incremental signal level (lower side) in the circuit shown in FIG. 11B upon movement of the scale. As shown in FIG. 12, an origin signal Zout and an incremental signal Aout are substantially synchronized. In FIG. 12, PD(A) and PD(A-) are the light-receiving elements for an A-phase incremental signal, which are 180° out of phase.

Figure 13A:
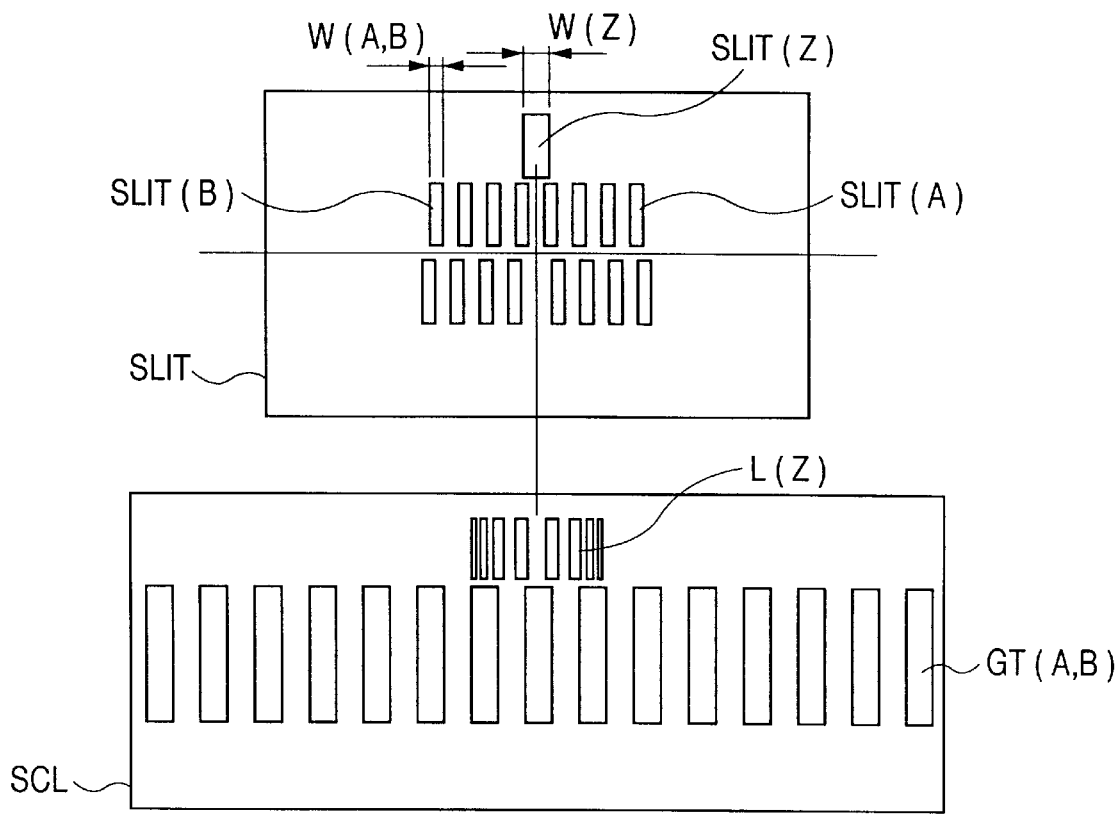
FIGS. 13A and 13B are explanatory views of a synchronization method of an origin signal and an incremental signal in another embodiment of the present invention.
Figure 13B:
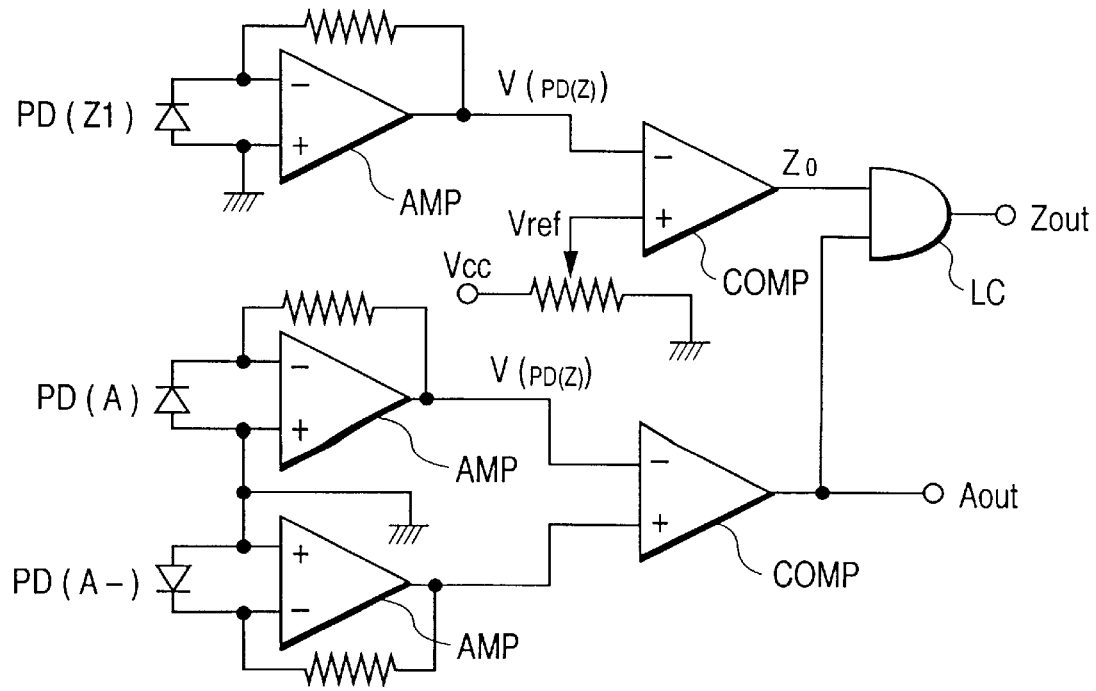

FIGS. 13A and 13B are explanatory views of the fourth embodiment when incremental and origin signals are synchronized in the present invention. In this embodiment, as compared to the third embodiment shown in FIGS. 11A and 11B, the detection resolution of the origin signal is intentionally set to be ½ that of the incremental signal by setting the slit widths so that substantially:

$$W(A,B)=W(Z)/2$$

An origin signal Z0 obtained via a binarization circuit shown in FIG. 13B, and an incremental signal Aout are ANDed by a logic circuit LC, thereby obtaining an origin signal Zout which is perfectly synchronized with the incremental signal Aout including its phase.

Figure 14:
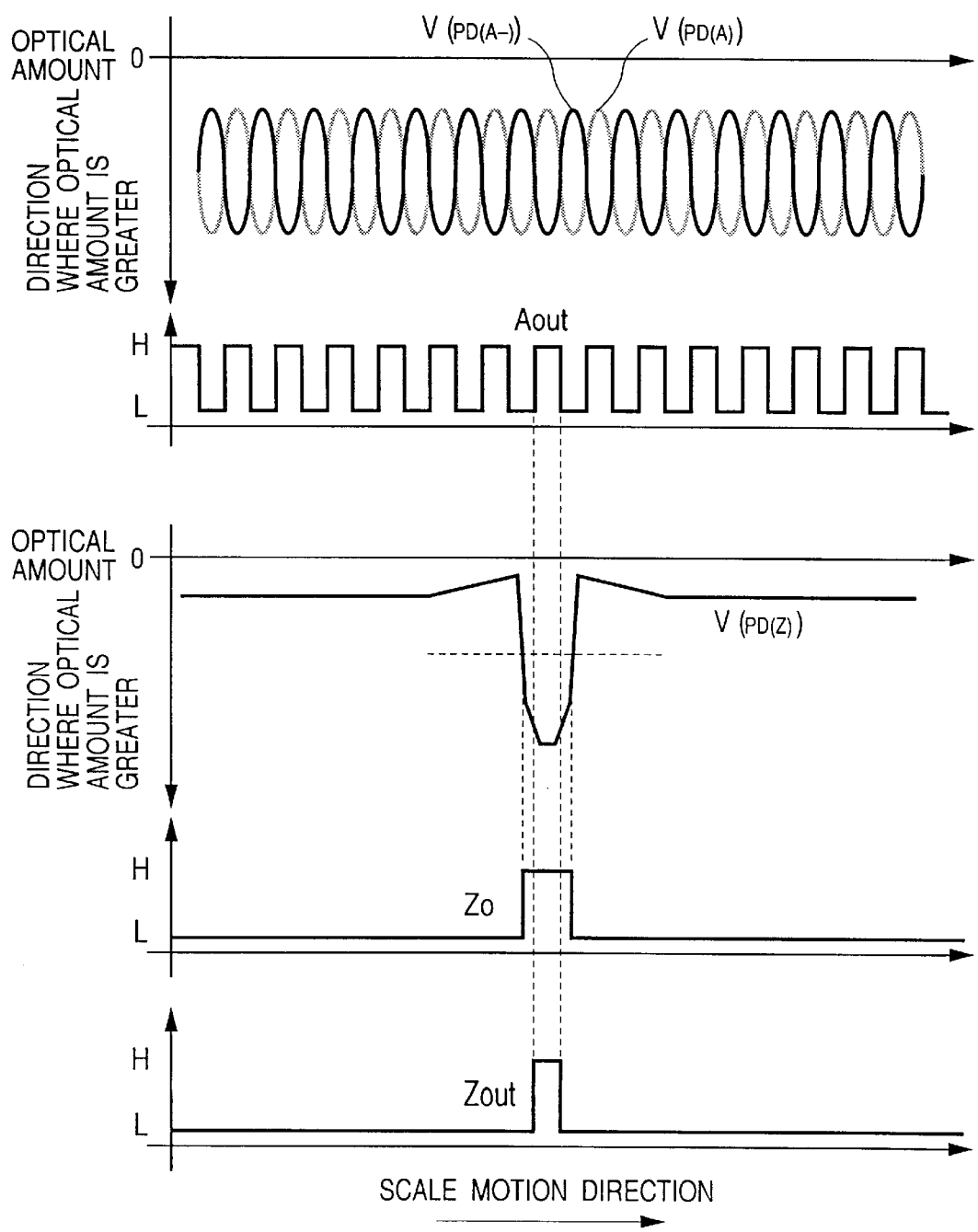
FIG. 14 is an explanatory view of a synchronization method of an origin signal and an incremental signal in the embodiment of the present invention.

FIG. 14 is an explanatory view showing changes in origin signal level (upper side) and incremental signal level (lower side) in the circuit shown in FIG. 13B upon relative movement of the scale. As shown in FIG. 14, the origin signal Zout and the incremental signal Aout are perfectly synchronously output. Note that PD(A) and PD(A-) in FIG. 14 are the light-receiving elements for an A-phase incremental signal, which are 180° out of phase.

Figure 15:
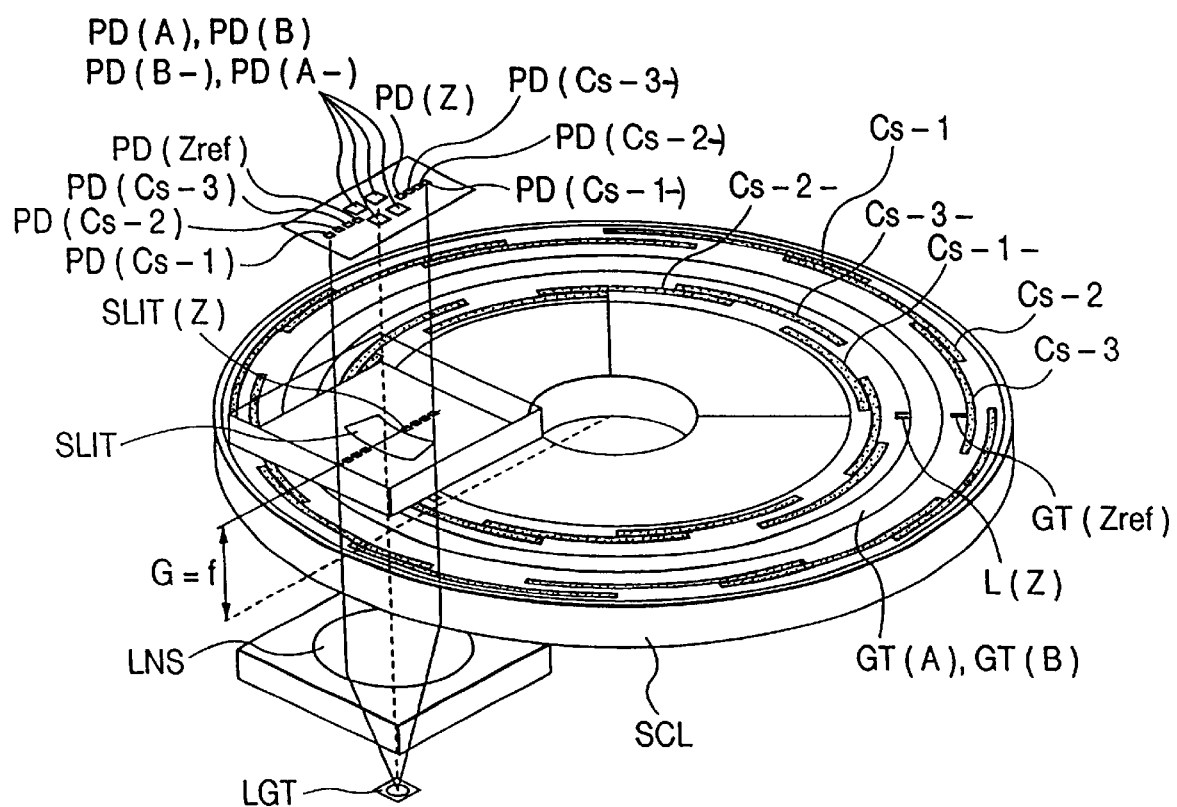
FIG. 15 is a schematic perspective view of principal part of a rotary encoder with an AC motor control signal detection function to which the above embodiment is applied.

FIG. 15 is a perspective view showing principal part of the optical arrangement used when the displacement information detection apparatus of the present invention is applied to a rotary encoder with 8-pole AC motor control signal phases (Cs phases). In FIG. 15, a scale SCL is formed into a circular shape to serve as a disk scale. Linear phase gratings for an incremental signal to be formed on the scale SCL are formed on an annular track as radial phase gratings GT(A) and GT(B). On the other hand, slits to be formed on a slit substrate SLIT are formed as radial slit gratings SLIT(A) and SLIT(B) having the same radiating central axis as that of the radial phase gratings GT(A) and GT(B).

Note that four-divided slit gratings SLIT(A), SLIT(B), SLIT(A-), and SLIT(B-) are formed on the slit substrate SLIT to shift from each other by ¼ pitches, as shown in FIG. 7, so that four-phase signals A, B, A-, and B- having a 90° phase difference therebetween are detected as incremental signals.

On the other hand, a light-receiving means PD receives signal light components using four light-receiving elements PD(A), PD(B), PD(A-), and PD(B-) in correspondence with the four slit gratings. Six patterns Cs-1, Cs-2, Cs-3, Cs-1-, Cs-2-, and Cs-3- of the 8-pole AC motor control signal phases (Cs phases) are formed on the scale substrate SCL as the presence/absence of phase diffraction gratings, and are formed on six tracks as intensity patterns having four periods/revolution to have a 120° phase difference therebetween, since the optical amount of straight light of light beams transmitted through these patterns is reduced by each phase diffraction grating. Light beams transmitted through these patterns are transmitted through a window portion on the slit substrate SLIT, and are detected by corresponding light-receiving elements PD(Cs-1) to PD(Cs-3-). These signals are detected parallel to the incremental and origin signals.

In each of the above embodiments, the arrangement may be modified as follows.

(B1) The origin lens may comprise a spherical lens that utilizes refraction. In this case, microlenses can be formed on the surface of a transparent substrate by, e.g., a replica method.

(B2) In the above embodiments, the origin lens comprises a linear diffraction lens, but may comprise a circular diffraction lens that uses a circular zone plate as a phase grating. In this case, dot-like condensed light beams appear on the slit substrate. Likewise, an elliptic diffraction lens may be used.

(B3) On the origin lens track, the portion other than the origin lens may comprise non-transparent and semi-transparent portions using, e.g., diffraction gratings in place of a simple transparent portion. In this case, the S/N ratio of the analog origin signal is slightly improved.

(B4) The origin pulse signal may be directly output as an analog origin signal without being binarized.

(B5) The linear scale may be converted into a circular shape as a disk scale, linear phase diffraction gratings for an incremental signal to be formed there may be formed on an annular track as radial phase diffraction gratings, and a linear slit on the slit substrate may also be converted into a radial slit having the same radiating central axis as that of the radial phase diffraction gratings on the disk scale, thus constituting a rotary encoder that detects rotary displacement information.

(B6) AC motor control signal tracks and the like may be juxtaposed on the scale together with the origin lens track and the phase grating track for an incremental signal, and light beams transmitted through these tracks are simultaneously received by a single light-receiving element array, thus realizing an encoder that can output incremental signals, an origin signal, and AC motor control signals (Cs phases).

In the embodiments to be described hereinafter, a plurality of origin lenses are used. The embodiments will be described hereinafter although some components will be repetitively described.

Figure 16:
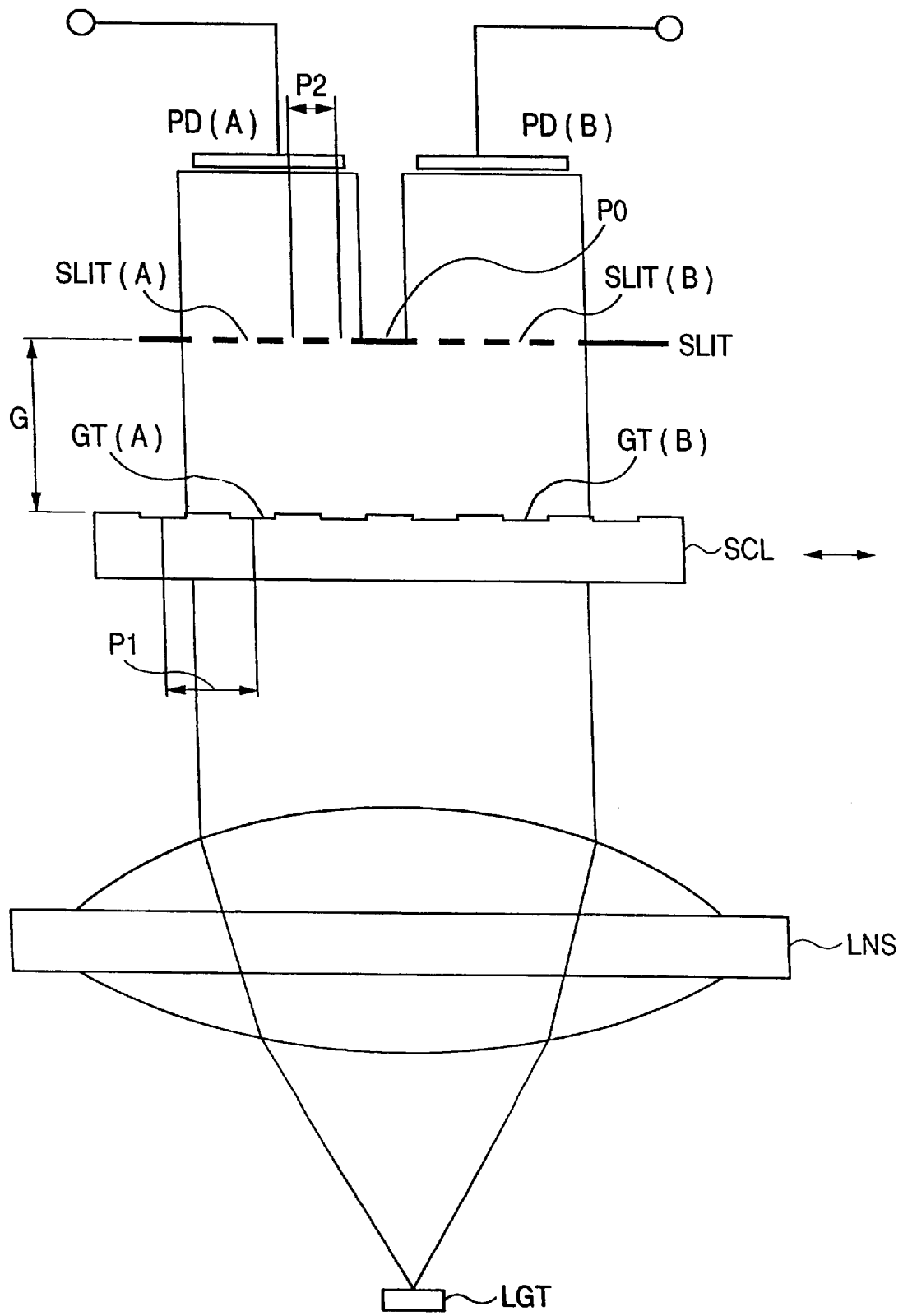
FIG. 16 is an explanatory view of an incremental signal detection optical system according to the fourth embodiment of the present invention.
Figure 17:
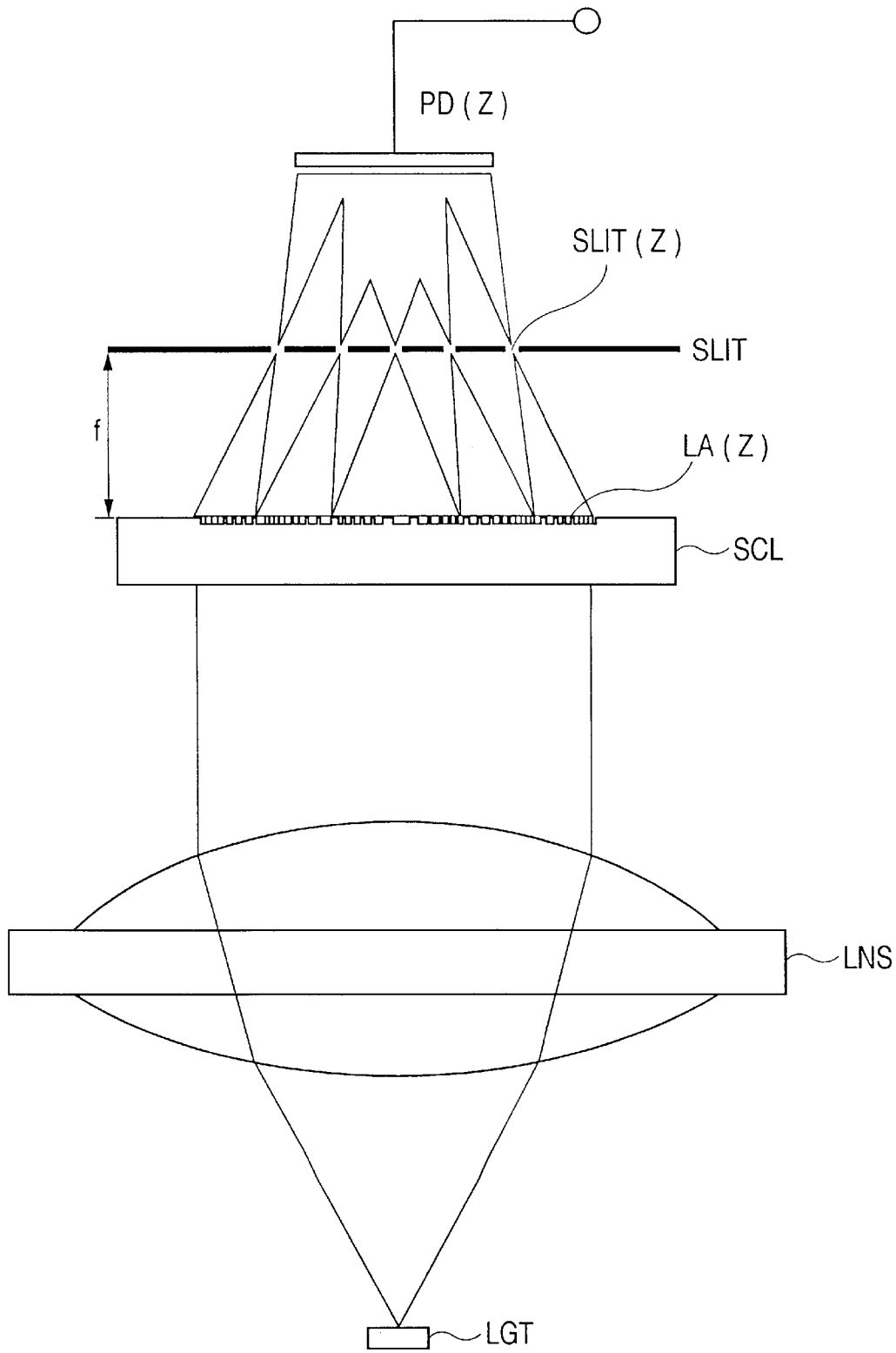
FIG. 17 is an explanatory view of an analog origin signal detection optical system in the fourth embodiment of the present invention.
Figure 18:
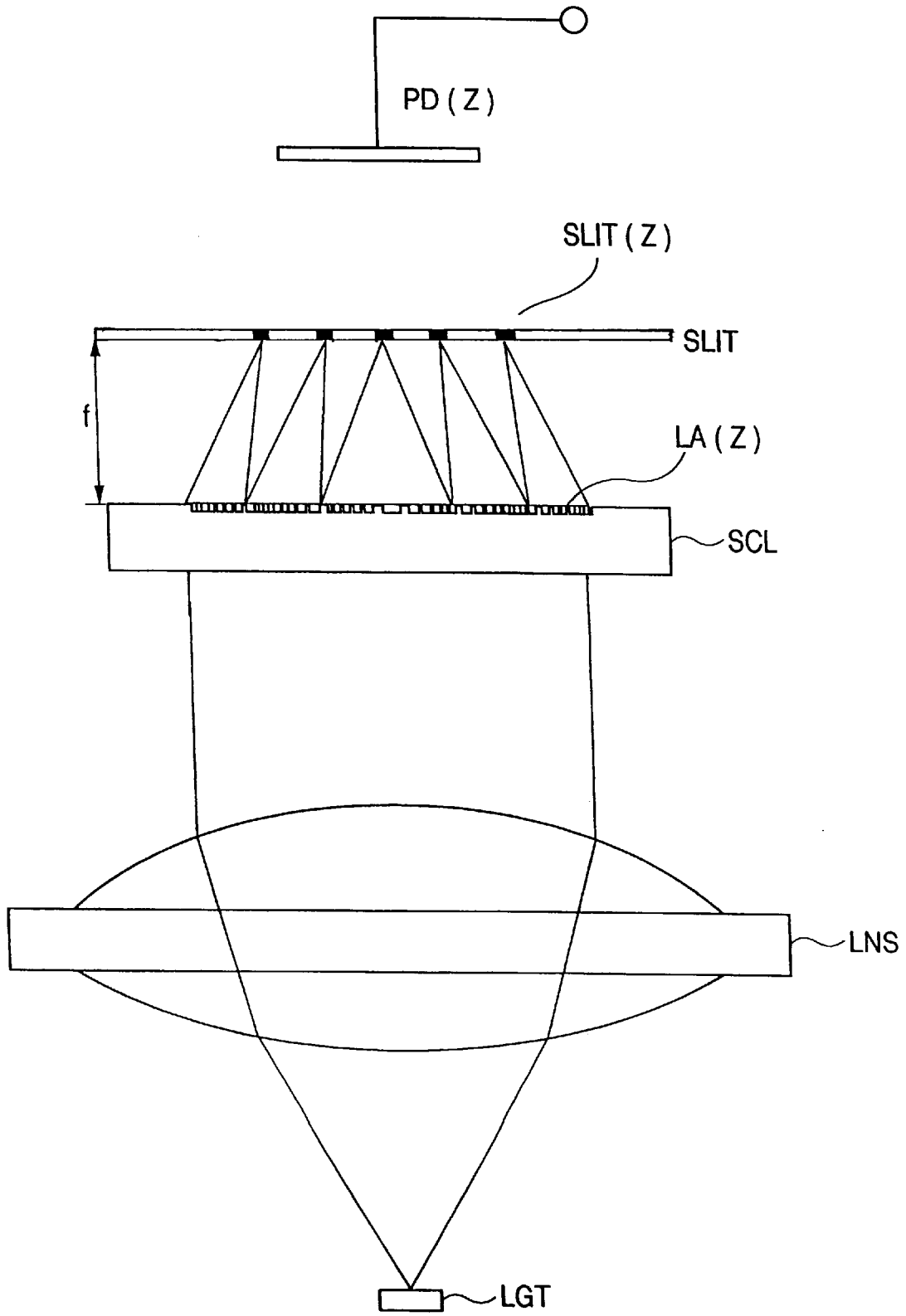
FIG. 18 is an explanatory view of another embodiment of the analog origin signal detection optical system in the fourth embodiment of the present invention.
Figure 19:
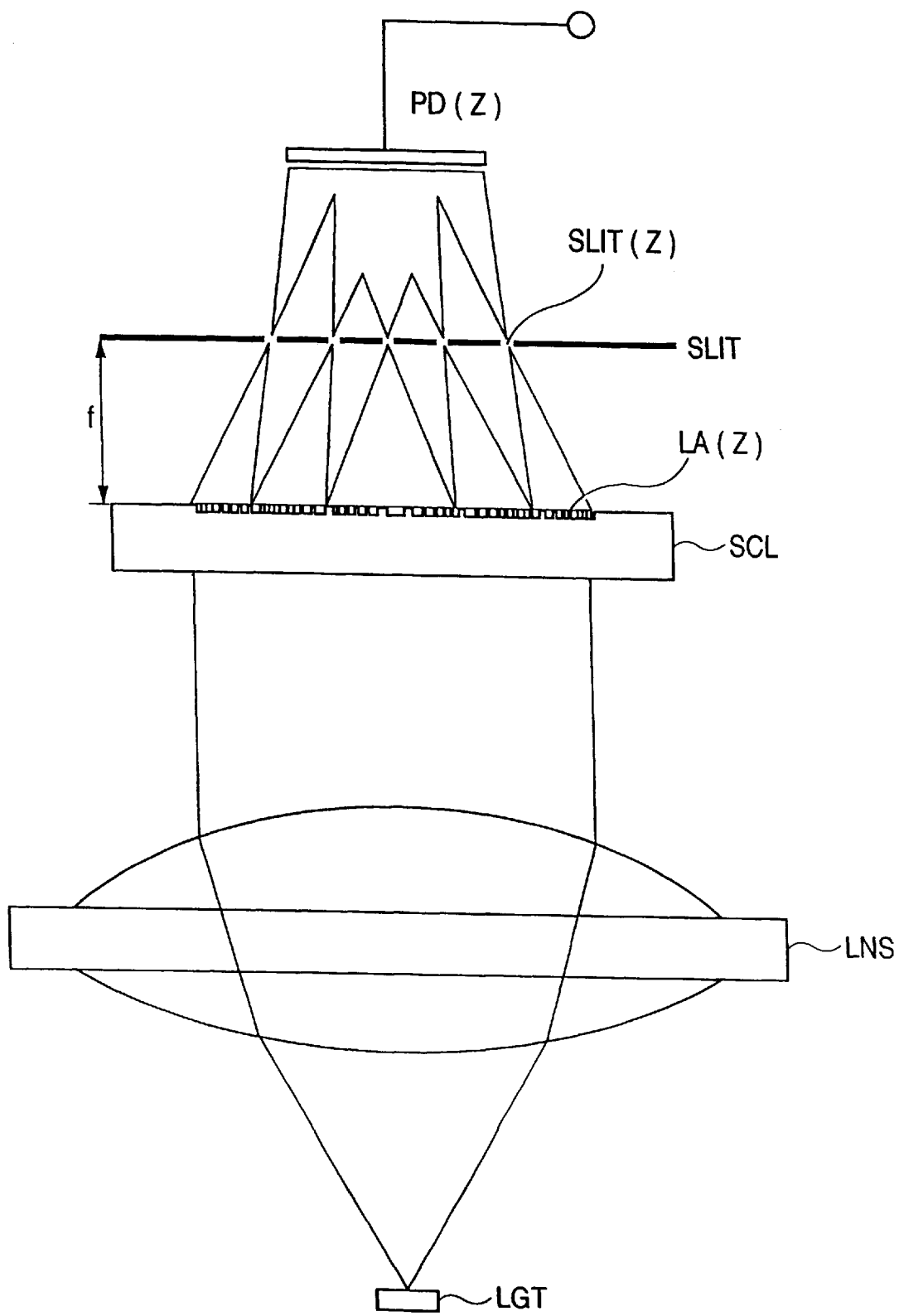
FIG. 19 is an explanatory view of still another embodiment of the analog origin signal detection optical system in the fourth embodiment of the present invention.
Figure 20:
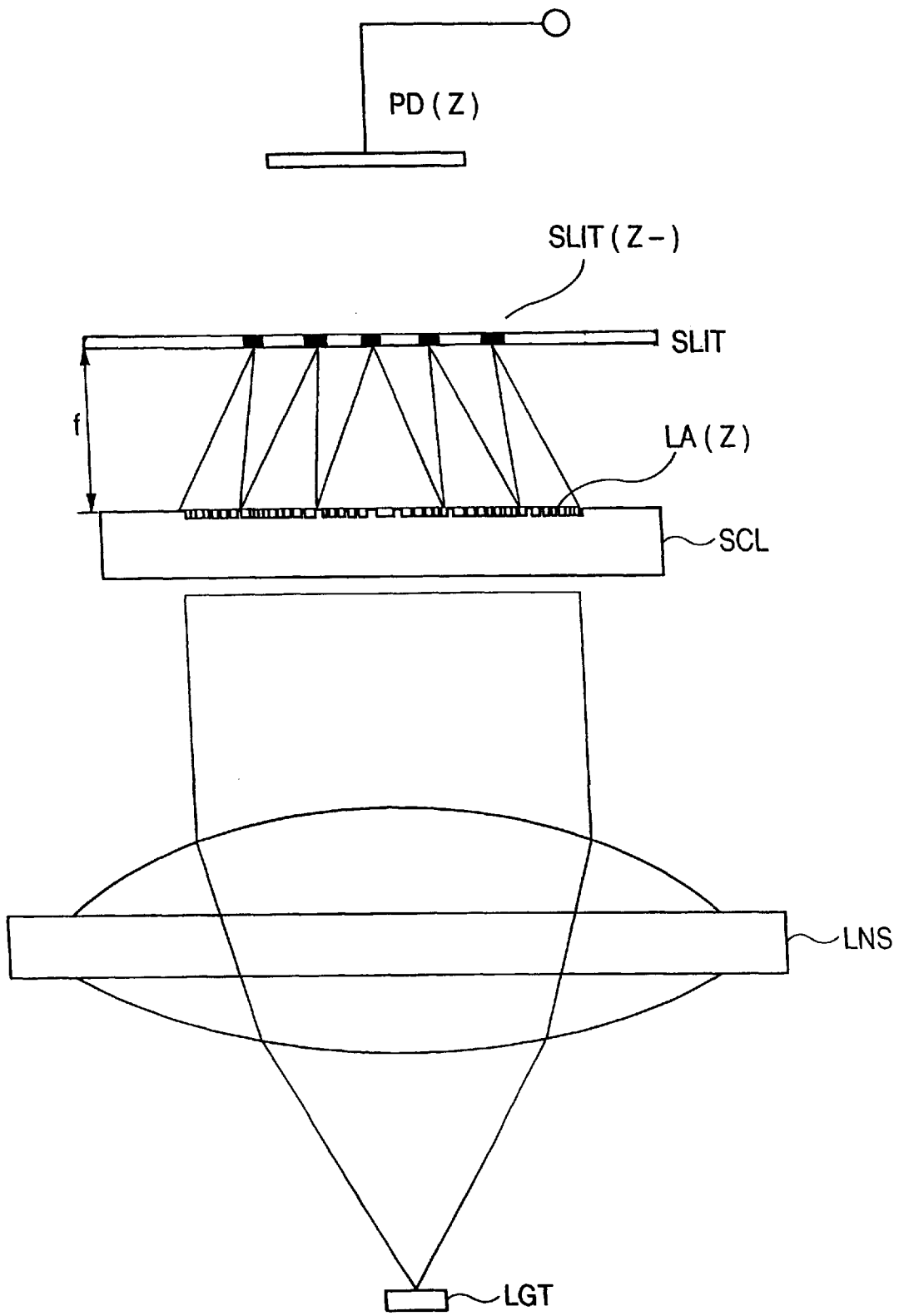
FIG. 20 is an explanatory view of still another embodiment of the analog origin signal detection optical system in the fourth embodiment of the present invention.
Figure 21:
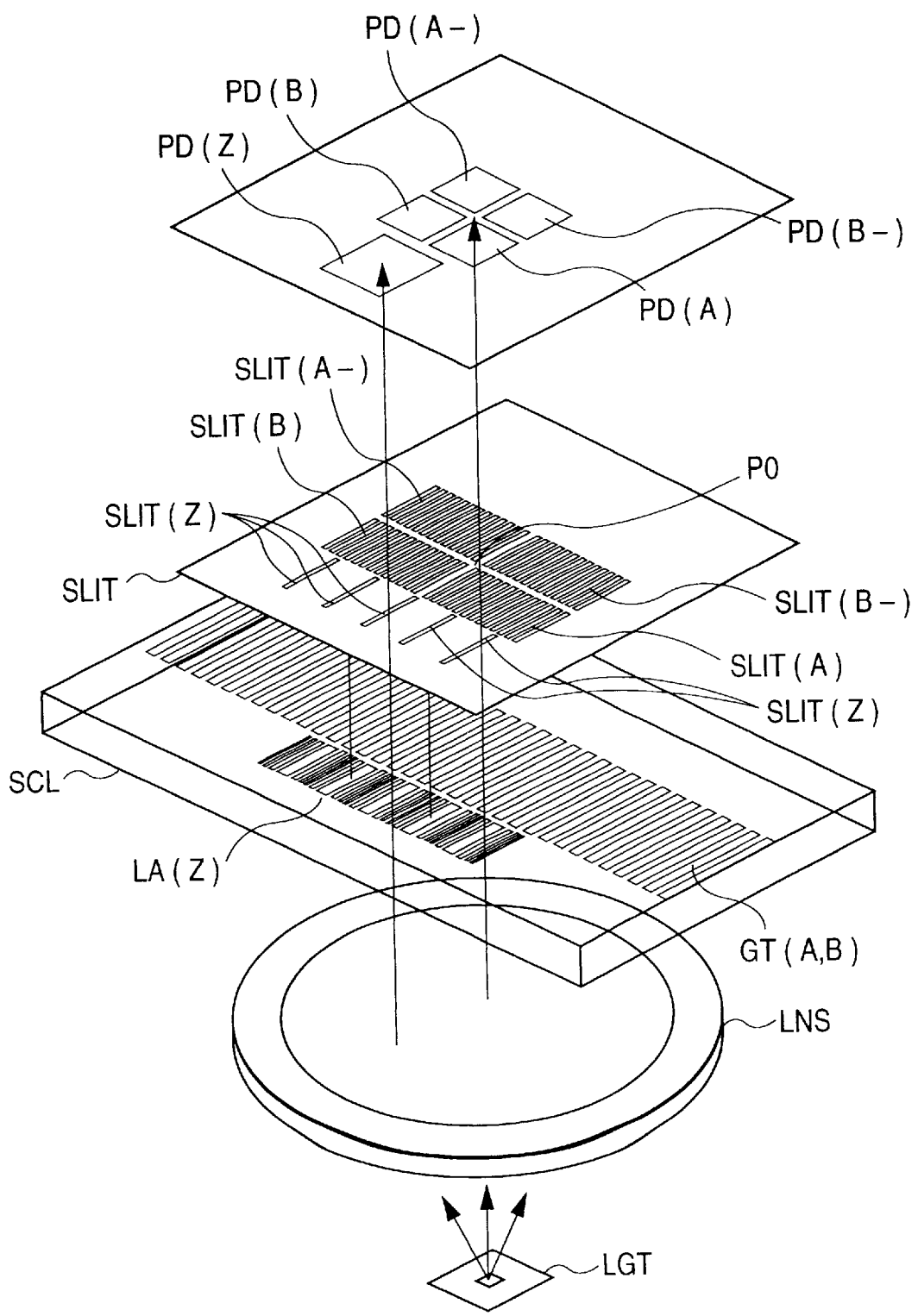
FIG. 21 is a schematic perspective view of principal part in the fourth embodiment of the present invention.

FIG. 16 is a sectional view showing principal part of an incremental signal detection optical system according to the fourth embodiment of the present invention, and FIG. 17 is a sectional view showing principal part of an analog origin signal detection optical system according to the fourth embodiment of the present invention. FIGS. 18, 19, and 20 are sectional views showing principal part when the system shown in FIG. 17 is partially modified. FIG. 21 is a perspective view showing principal part when the incremental signal detection optical system shown in FIG. 16 and the analog origin signal detection optical system shown in FIG. 17 are combined, and FIGS. 22A to 22E are explanatory views of signals obtained by a light-receiving means in the fourth embodiment.

In FIGS. 16 to 20, a scale SCL serving as a first substrate is movable in the direction of an arrow in FIG. 16, and is attached to a moving object (not shown). Two phase gratings (grating patterns) GT(A) and GT(B) for an incremental signal, and an origin lens array (this lens comprises a diffraction lens array having a linear pattern; also called a linear diffraction lens array or linear Fresnel zone plate array) LA(Z) as an array of a plurality of lenses for an origin signal are formed on different tracks on the scale SCL.

A slit substrate SLIT serving as a second substrate opposes the scale SCL to be separated by a gap G of about 50 to several 100 μm. The slit substrate SLIT is divided into four regions to have a point PO as a boundary, and slit gratings SLIT(A), SLIT(B), SLIT(A-), and SLIT(B-) whose grating layout positions are shifted from each other by ¼ pitches are respectively formed on the divided regions. Also, an origin slit grating array (origin slit array) SLIT(Z) as an array of a plurality of slits for an origin signal is formed on a track different from that of the slit gratings SLIT(A), SLIT(B), SLIT(A-), and SLIT(B-) on the slit substrate SLIT.

A light source means LGT such as an LED has low coherency. A collimator lens LNS converts a light beam emitted by the light source means LGT into a collimated light beam. The light source means LGT and the collimator lens LNS are constituting elements of a light-projection means. A light-receiving means PD has four light-receiving elements PD(A), PD(B), PD(A-), and PD(B-) for receiving diffracted light components diffracted by the slit gratings SLIT(A), SLIT(B), SLIT(A-), and SLIT(B-), and a light-receiving element PD(Z) for an origin signal.

In this embodiment, the light source means LGT, the collimator lens LNS, the slit substrate SLIT, and the light-receiving means PD are housed in a detection head and are fixed in position.

A method of detecting the incremental signal in this embodiment will be described below with reference to FIG. 16. A light beam emitted by the light source means LGT is converted into a collimated light beam by the collimator lens LNS, and the light beam is illuminated on the scale SCL which moves relative to the substrate SLIT. The collimated light beam simultaneously illuminates the phase grating track for an incremental signal and the origin diffraction lens track for an origin signal on the scale SCL.

As shown in FIG. 16, the phase grating track for an incremental signal generates diffracted light beams by the phase gratings GT(A) and GT(B) each having a three-dimensional pattern, and projects an intensity pattern having a pitch half the original grating pitch onto a space separated by 50 to several 100 μm. Note that each of the phase gratings GT(A) and GT(B) comprises a lamellar grating having a fine structure that does not generate any 0th-order diffracted light. Also, recess and projecting portions of each grating transmit light.

The intensity pattern projected onto the slit substrate SLIT by the phase gratings GT(A) and GT(B) on the scale SCL is selectively transmitted through or shielded by the slit gratings SLIT(A), SLIT(B), SLIT(A-), and SLIT(B-) on the slit substrate SLIT, which have the same pitch as that of the intensity pattern, in correspondence with the positional relationship between the intensity pattern and the slit gratings SLIT(A), SLIT(B), SLIT(A-), and SLIT(B-).

The four slit gratings SLIT(A), SLIT(B), SLIT(A-), and SLIT(B-) are formed on four regions divided to have the point PO as a boundary, so that their grating layout phases are shifted from each other by ¼ pitches. With this arrangement, the timings of changes in intensity of signal light components transmitted through these regions are shifted from each other by ¼ periods, thereby generating so-called A- and B-phase signals. In this case, when the phase gratings GT(A) and GT(B) move by one pitch upon movement of the scale SCL, the intensity pattern moves by two pitches, and the intensity of the light beam transmitted through the slit grating SLIT changes twice sinusoidally.

Figure 22A:
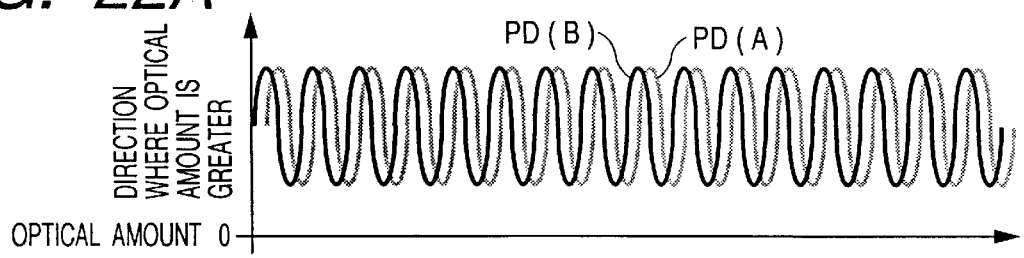
FIGS. 22A to 22E are explanatory views of signals from a light-receiving means in the fourth embodiment of the present invention.

FIG. 22A shows the state of an intensity signal when the amounts of light beams that reach the two light-receiving elements PD(A) and PD(B) of the four light-receiving elements change upon relative movement of the scale SCL. This intensity signal light is received by the light-receiving elements PD(A) and PD(B), and a sinusoidal analog signal current for two periods is obtained from the light-receiving elements PD(A) and PD(B) upon movement of the scale SCL by one pitch of the phase grating. For example, if the phase grating pitch of the scale SCL is P=20 μm, a sinusoidal analog signal current having a period of 10 μm is obtained.

In this embodiment, as described above, the light-receiving means PD obtains an incremental signal upon movement of the scale SCL.

In this embodiment, two slit gratings SLIT(A) and SLIT(B) which are shifted from each other by ¼ pitches may be arranged in place of the four slit gratings on the slit substrate SLIT, and two light-receiving elements PD(A) and PD(B) may be arranged in place of the four light-receiving elements of the light-receiving means PD, so that A- and B-phase signals may be obtained by the two light-receiving elements.

A method of detecting the analog origin signal in this embodiment will be explained below with reference to FIG. 17. As shown in FIG. 17, a light beam that illuminates the origin lens array LA(Z) on the scale SCL projects a linearly condensed light pattern onto a space corresponding to the position of the focal length f of one lens of the origin lens array LA(Z), and enters the origin slit array SLIT(Z) including an array of a plurality of slits on the slit substrate SLIT arranged at the projection space. The light beam that has passed through the origin slit array SLIT(Z) of the slit substrate SLIT is incident on the light-receiving element PD(Z). A width a (the width of a region having an intensity of ½ or higher) of the condensed light beam is set to be equal to or smaller than a width b of the origin slit array SLIT(Z). That is, the respective elements are set so that the relationship of a≦b is satisfied.

In this embodiment, since the light-receiving element PD(Z) for origin detection is separated from the slit substrate SLIT and is small, the respective lens elements of the origin lens array LA(Z) are appropriately decentered to give appropriate directivity to light beams to be condensed by them, so that the light beams are transmitted through the origin slit grating array SLIT(Z) and efficiently become incident on the light-receiving element PD(Z).

When a light beam illuminates the entire origin lens array LA(Z), the linearly condensed light pattern generated by the origin lens array LA(Z) matches the origin slit grating array SLIT(Z) on the slit substrate SLIT, and at an instance when all the lenses and slits match each other upon relative movement of the scale SCL, light beams pass through all the slits. Hence, the sum total of the amounts of these light beams is maximized, and transmission light having a maximum optical amount is incident on the light-receiving element PD(Z), thus outputting a pulse-shaped sharp waveform.

Figure 22B:
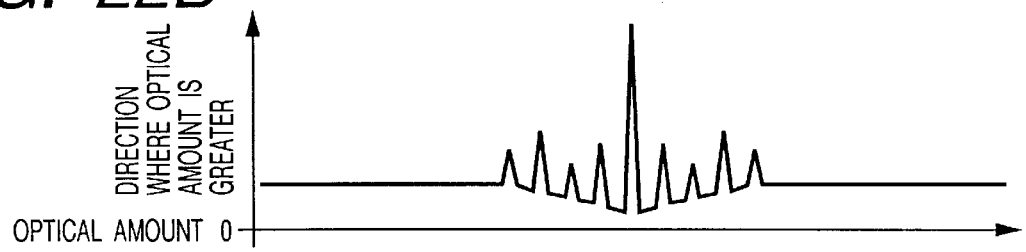

FIG. 22B shows the state of changes in optical amount of light that reaches the light-receiving element PD(Z) upon relative movement of the scale SCL. Note that the bottom positions of a plurality of pulse-shaped waveforms define a V shape, and small transmission optical amounts are detected on both sides since a light beam irradiated onto a portion other than the origin lens array LA(Z) is transmitted through the origin slit grating array SLIT(Z) and is incident on the light-receiving element PD(Z). Such changes can be eliminated by forming a light-shielding/light-reducing portion (absorption of light using a light-shielding paint, or a reduction of 0th-order transmission light using a lamellar diffraction grating) on a portion, of the origin lens array track, other than the origin lens array LA(Z). However, if such changes are small, no serious problem is posed.

FIG. 18 is a schematic view showing principal part of an embodiment when the transparent and non-transparent portions of the origin slit grating array SLIT(Z) on the slit substrate SLIT shown in FIG. 17 replace each other. As shown in FIG. 18, when the transparent slit pattern on the slit substrate SLIT is reversed, and the linearly condensed light pattern generated by the origin lens array LA(Z) is set to equal the non-transparent slit pattern SLIT(Z-) on the slit substrate SLIT when a light beam illuminates the entire origin lens array LA(Z), the light beam is shielded by all the non-transparent slits at an instance when the lenses and slits match each other upon relative movement of the scale SCL, and the sum total of optical amounts is minimized. As a result, transmission light of a minimum optical amount is incident on the light-receiving element PD(Z), and a pulse-shaped sharp waveform obtained by inverting that shown in FIG. 22B is output, as shown in FIG. 22C.

Figure 22C:
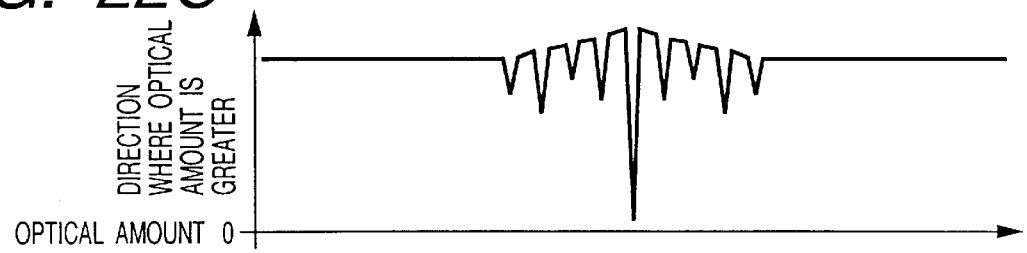

As shown in FIG. 22B or 22C, when the slits of the origin slit grating array SLIT(Z) match the condensed light beams, transmission light of a maximum or minimum optical amount is incident on the light-receiving element, and a pulse-shaped sharp waveform is obtained. Also, pulse-shaped waveforms are output at intervals close to the average interval of slits of the origin slit grating array SLIT(Z) or SLIT(Z-). In this case, by appropriately varying the intervals of the slit elements of the origin slit grating array SLIT(Z) or SLIT(Z-) or the intervals of condensed light beams condensed on the origin slit grating array SLIT(Z) or SLIT(Z-), the latter waveforms are suppressed, and essentially one pulse-shaped sharp waveform is output.

Figure 22D:
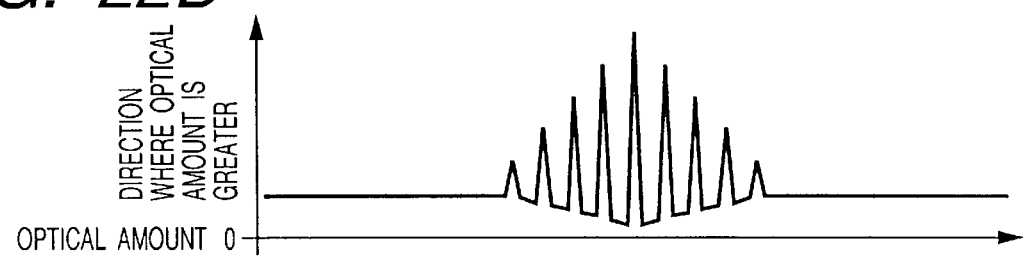

FIG. 19 is a schematic view showing the arrangement wherein the intervals of the slit elements of the origin slit grating array SLIT(Z) shown in FIG. 17 and the condensed light beam intervals on the origin slit grating array SLIT(Z) are set to be equal to each other. At this time, as shown in FIG. 22D, when the slit elements and the condensed light beams match each other, transmission light of a maximum optical amount is incident and a pulse-shaped sharp waveform is obtained. However, before and after this pulse, pulse-shaped waveforms are output at the slit intervals of the origin slit grating array SLIT(Z).

Figure 22E:
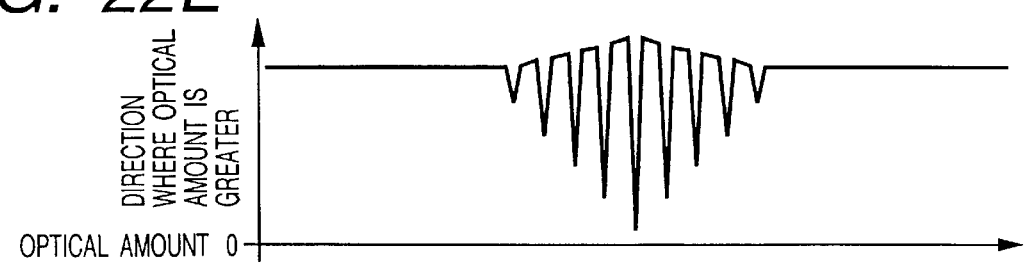

FIG. 20 is a schematic view showing the arrangement wherein the origin slit grating array SLIT(Z) shown in FIG. 19 is reversed to obtain a non-transparent slit grating array SLIT(Z-). At this time, as shown in FIG. 22E, since light beams are shielded by all the non-transparent slits at an instance when the slits and the light beams match each other upon relative movement of the scale SCL, the sum total of optical amounts is minimized. As a result, transmission light of a minimum optical amount is incident on the light-receiving element PD(Z), and a pulse-shaped sharp waveform inverted from that shown in FIG. 22D is output.

In this embodiment, an analog origin signal is obtained in this manner. Extraction of a digital origin signal and its signal processing system in this embodiment will be described below.

Figure 23A:
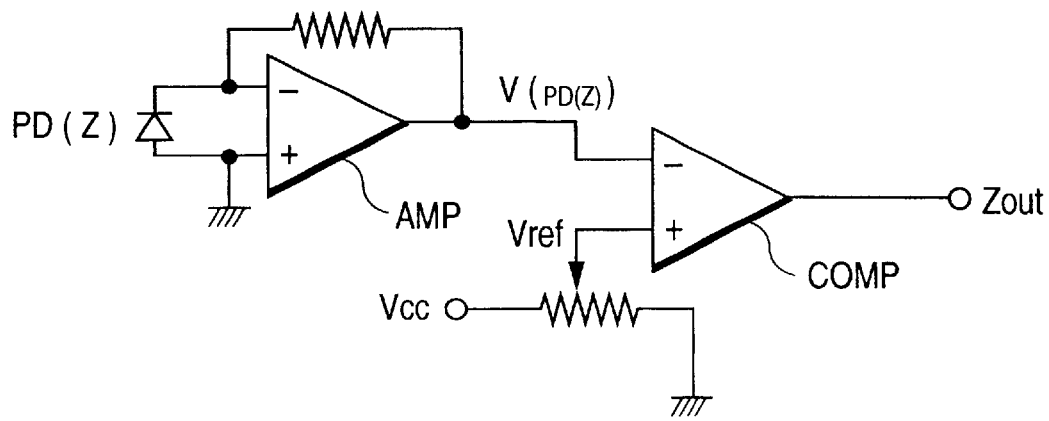
FIGS. 23A and 23B are explanatory views of conversion into a digital origin signal in the fourth embodiment of the present invention.
Figure 23B:
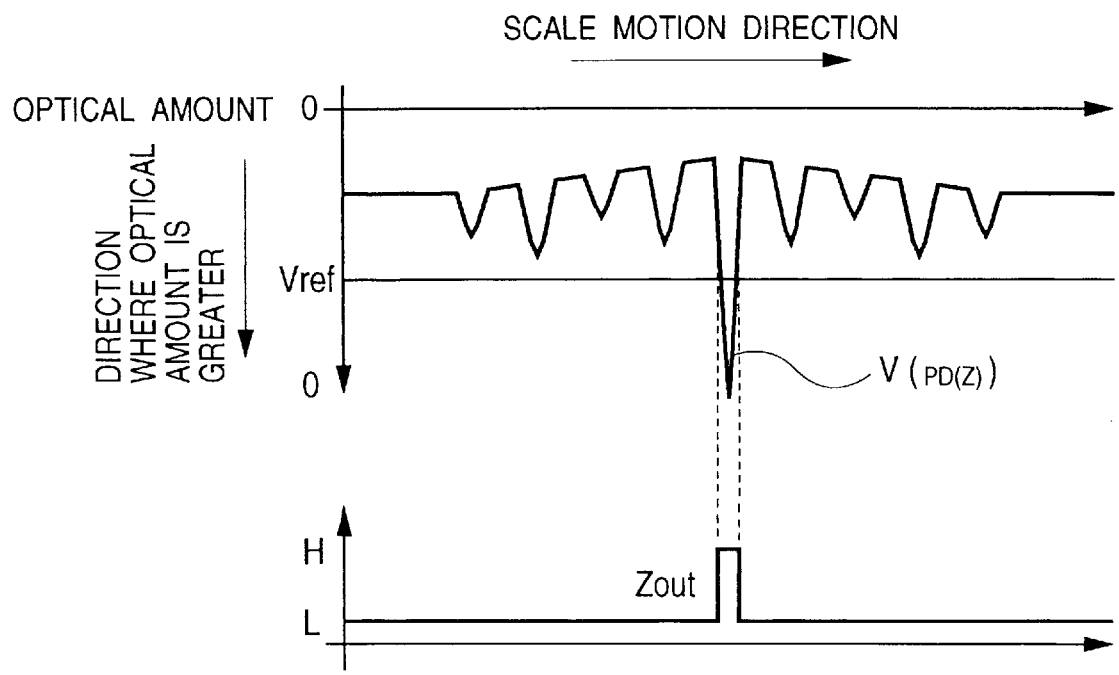

FIG. 21 is a perspective view showing the arrangement of the overall optical system obtained when the incremental signal detection optical system shown in FIG. 16 and the origin signal detection optical system shown in FIG. 17 are combined. FIG. 23A is an explanatory view of a circuit for obtaining a digital origin signal from the output of the light-receiving element PD(Z), and FIG. 23B is an explanatory view showing the state of changes in signal level in the circuit shown in FIG. 23A upon relative movement of the scale SCL. As shown in FIG. 23B, an appropriately set reference voltage Vref and an analog origin signal V(PD(Z)) obtained from the output from the light-receiving element PD(Z) via an amplifier AMP are compared by a comparator COMP to binarize the signal V(PD(Z)), and the binarized signal is output as a digital origin signal.

In FIG. 21, the slit substrate SLIT for an incremental signal is divided into four regions, i.e., the slit gratings SLIT(A), SLIT(B), SLIT(A-), and SLIT(B-), which are formed to have a 90° phase difference from each other. When light beams diffracted by these gratings are received by the four corresponding light-receiving elements PD(A), PD(B), PD(A-) and PD(B-), 4-phase incremental signals having a 90° phase difference from each other are obtained. The method of detecting the incremental signal is the same as that shown in FIG. 16. Also, the method of detecting the origin signal is the same as that shown in FIG. 17.

As described above, in this embodiment, the incremental and origin signal detection optical systems are constituted using common components. In particular, the incremental and origin signal detection optical systems are constituted, as shown in FIGS. 16 and 17, and are integrally arranged, as shown in FIG. 21. A distance G from the scale SCL to the position where an intensity pattern of a pitch half the grating pitch is generated by the phase gratings for an incremental signal is set to be nearly equal to the focal length f of one lens of the origin lens array, so that the slit gratings SLIT(A), SLIT(B), SLIT(A-) and SLIT(B-) for an incremental signal and the origin slit grating array SLIT(Z) for origin detection can be formed on a single substrate. In this manner, the slit substrate SLIT is commonly used. Also, the light-receiving means PD for an incremental signal, the light-receiving element PD(Z) for an origin signal, and other light-receiving elements are integrally formed as a light-receiving element array on a single substrate, thus simplifying the apparatus. In this embodiment, the following effects are similarly obtained.

(A1) The Productivity is splendid.

For example, both the origin lens array LA(Z) and the phase gratings GT(A) and GT(B) for an incremental signal formed on the scale SCL are transparent three-dimensional optical elements, and can be manufactured by the same manufacturing method such as replica, injection molding, or the like, thus achieving a great cost reduction. In particular, when the origin lens array is patterned as a diffraction lens, both the origin lens and the phase gratings have lamellar phase grating patterns, and the step of their projecting and recess portions is determined not to generate 0th-order diffracted light. For this reason, the manufacturing method based on glass etching, and a replica or injection molding method using the same can be used, thus realizing optical elements with very high productivity.

(A2) High-resolution origin and incremental signals are easily obtained.

When the condensed light beam width by the origin lens array LA(Z) on the scale SCL and the slit width of the origin slit grating array SLIT(Z) are decreased, an origin signal having a high resolution required can be easily obtained.

(A3) A downsizing is easy.

Since the phase gratings for an incremental signal and the origin lens array are juxtaposed on the scale SCL, the slit gratings SLIT(A), SLIT(B), SLIT(A-), and SLIT(B-) for an incremental signal and the origin slit grating array SLIT(Z) are juxtaposed on the slit substrate SLIT, and the four light-receiving elements PD(A), PD(B), PD(A-), and PD(B-) for an incremental signal and the light-receiving element PD(Z) for an origin signal are juxtaposed as a light-receiving element array on the light-receiving element substrate, the respective signal detection optical system members can be commonly used, and special-purpose origin detection members can be omitted, thus realizing a size reduction.

(A4) The origin and incremental signals can be synchronized.

Since both the incremental and origin signals are detected with reference to the scale and the slit substrate, the relationship between the incremental and origin signals are mechanically stabilized, and synchronous signals are obtained.

(A5) An origin signal with a high S/N ratio is obtained.

Since an array of a plurality of lenses are arranged on the scale, a plurality of origin signal slits are also arranged on the slit substrate, and the respective lens elements have directivity toward the light-receiving element PD(Z), the optical amount of light beams which are condensed toward the light-receiving element PD(Z) by the origin lens array LA(Z) increases even when the gap G between the scale and the slit substrate is as small as 50 to several 100 μm. Since such light beams are transmitted through the origin slit array SLIT(Z), the optical amount of the analog origin signal increases, and hence, an analog origin signal with a high S/N ratio can be obtained.

In this embodiment, the slit gratings used for detecting the incremental signal may be formed on a third substrate different from the slit substrate SLIT as the second substrate on which the origin slit grating array is formed, and the positional relationship between the first and third substrates may be set to be the same as that described above.

Using the incremental signal obtained from the light-receiving means PD, relative displacement information between the first and third substrates may be obtained.

Figure 24:
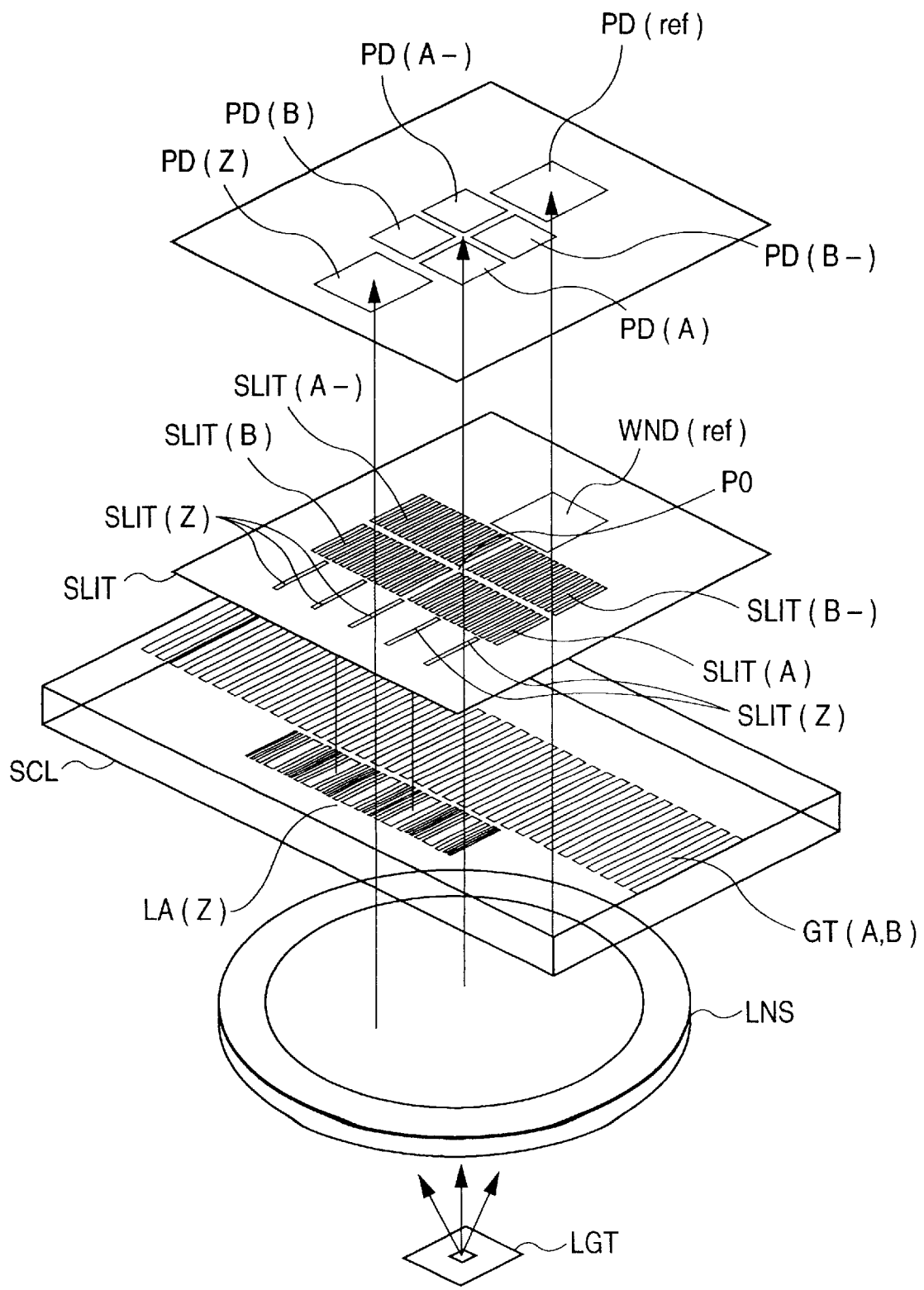
FIG. 24 is a schematic perspective view of principal part of the fifth embodiment of the present invention.

FIG. 24 is a schematic perspective view showing principal part of the fifth embodiment of the present invention. In this embodiment, as compared to the fourth embodiment shown in FIG. 21, an optical amount monitor track (the entire track is a transparent portion) is added to be juxtaposed with the origin lens array track and the incremental phase grating track on the scale SCL, and is illuminated with the same collimated light beam which is also irradiated onto the origin lens array track and the incremental phase grating track on the scale SCL. The light beam is transmitted through the optical amount monitor track and an aperture portion WND(ref) formed on the slit substrate SLIT, and is received by a light-receiving element PD(ref) for monitoring the optical amount. Other arrangements are the same as those in the fourth embodiment.

Figure 25A:
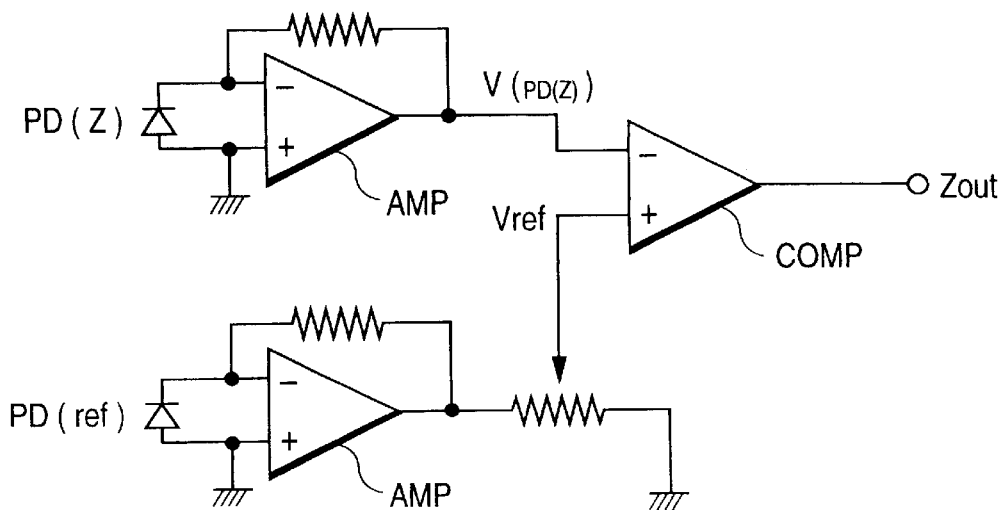
FIGS. 25A and 25B are explanatory views of conversion into a digital origin signal in the fifth embodiment of the present invention.
Figure 25B:
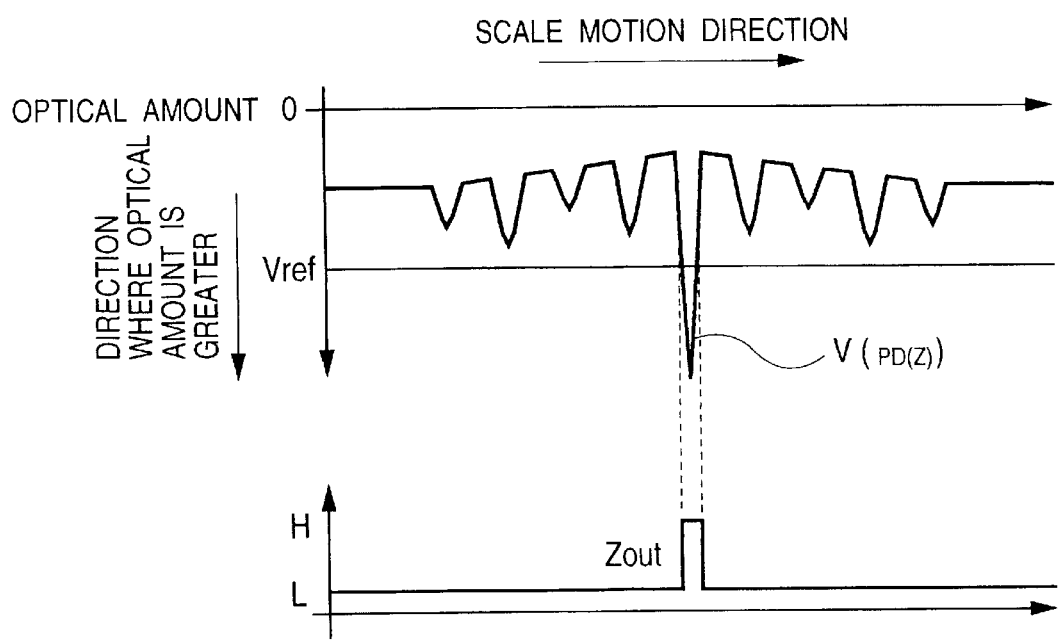

FIG. 25A is an explanatory view of a circuit for obtaining a digital origin signal from the output signals from the light-receiving elements PD(Z) and PD(ref) in this embodiment. In FIG. 25A, the optical amount level detected by the light-receiving element PD(ref) is multiplied with an appropriate coefficient to generate a reference voltage signal Vref, which is compared with an analog origin signal V(PD(Z)) by a comparator, thus binarizing the origin signal and outputting a binarized signal. FIG. 25B is an explanatory view showing the state of changes in signal level in the circuit shown in FIG. 25A upon relative movement of the scale SCL.

In this embodiment, the origin signal can be detected without being influenced by variations in optical amount of light from the light source means.

Figure 26:
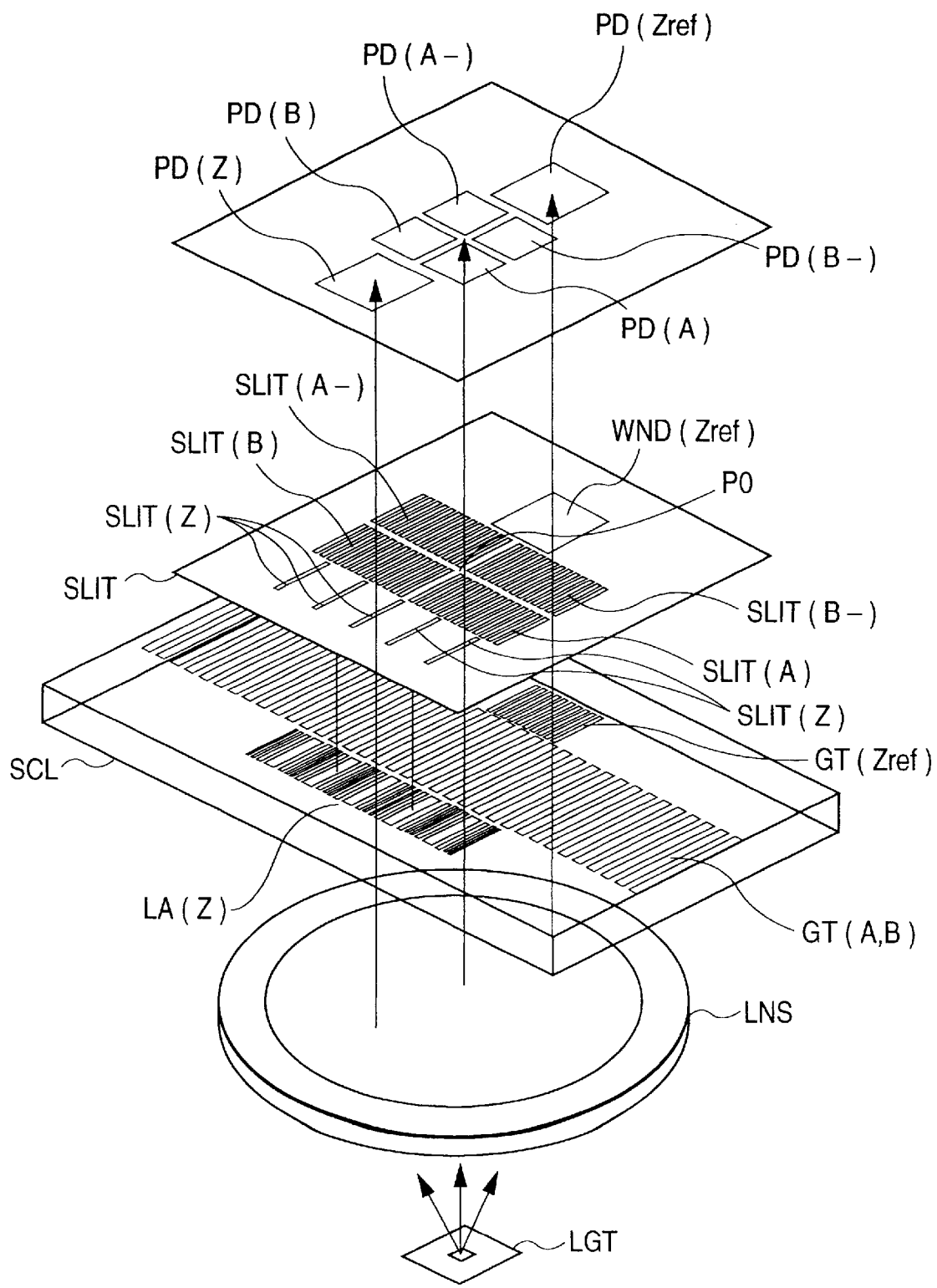
FIG. 26 is a schematic perspective view of principal part of the sixth embodiment of the present invention.

FIG. 26 is a schematic perspective view showing principal part of the sixth embodiment of the present invention. FIG. 26 is a perspective of an embodiment in which, in addition to FIG. 21, an origin vicinity detection track GT(Zref) is arranged to be juxtaposed with the origin lens array track and the incremental phase diffraction grating track on the scale, and a semi-transparent pattern reaches a position above the origin vicinity detection track when a light beam illuminates the entire origin lens array.

Figure 27A:
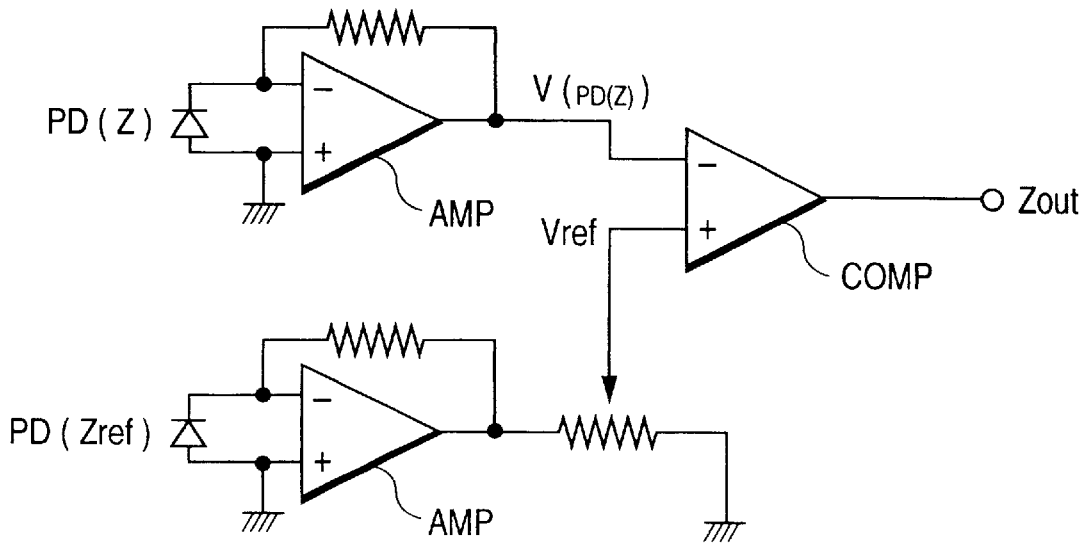
FIGS. 27A and 27B are explanatory views of conversion into a digital origin signal in the sixth embodiment of the present invention.

FIG. 27A shows an embodiment of a circuit for obtaining a digital origin signal from the output signals from the light-receiving elements PD(Z) and PD(Zref). The optical amount level detected by the light-receiving element PD(Zref) is multiplied with an appropriate coefficient to generate a reference voltage signal Vref, which is compared with an analog origin signal V(PD(Z)) by a comparator, thus binarizing the origin signal and outputting a binarized signal.

Figure 27B:
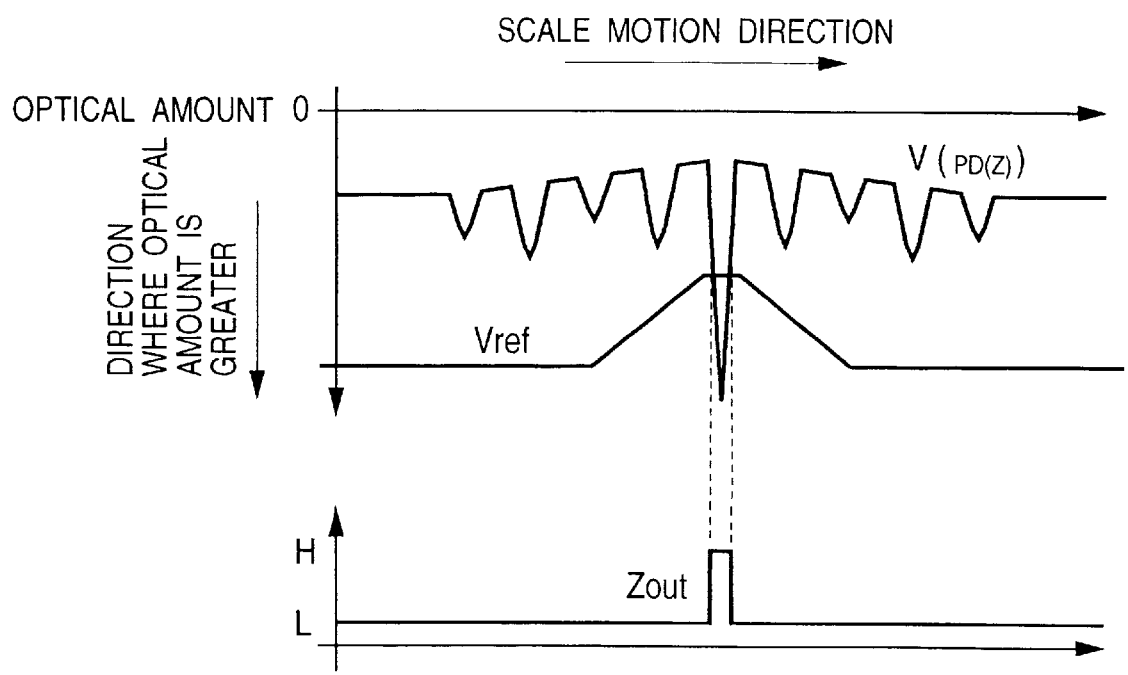

FIG. 27B is an explanatory view showing the state of changes in signal level in the circuit shown in FIG. 27A upon relative movement of the scale. In this embodiment, in addition to the feature of origin detection free from the influence of variations in optical amount of the light source, when the analog origin signal level in the embodiment shown in FIG. 17 or 18 is small or when a peak signal having a level which is smaller than that of the maximum peak signal but is negligible is present near the maximum peak signal as in the embodiment shown in FIG. 19 or 20, a triangular or trapezoidal origin vicinity detection signal shown in FIG. 27B can prevent an unwanted signal from being compared by the comparator.

In this embodiment, the origin vicinity detection semi-transparent portion pattern on the scale obtains a semi-transparent effect by forming a three-dimensional phase diffraction grating only in the neighborhood of the origin to suppress straight light.

Figure 28:
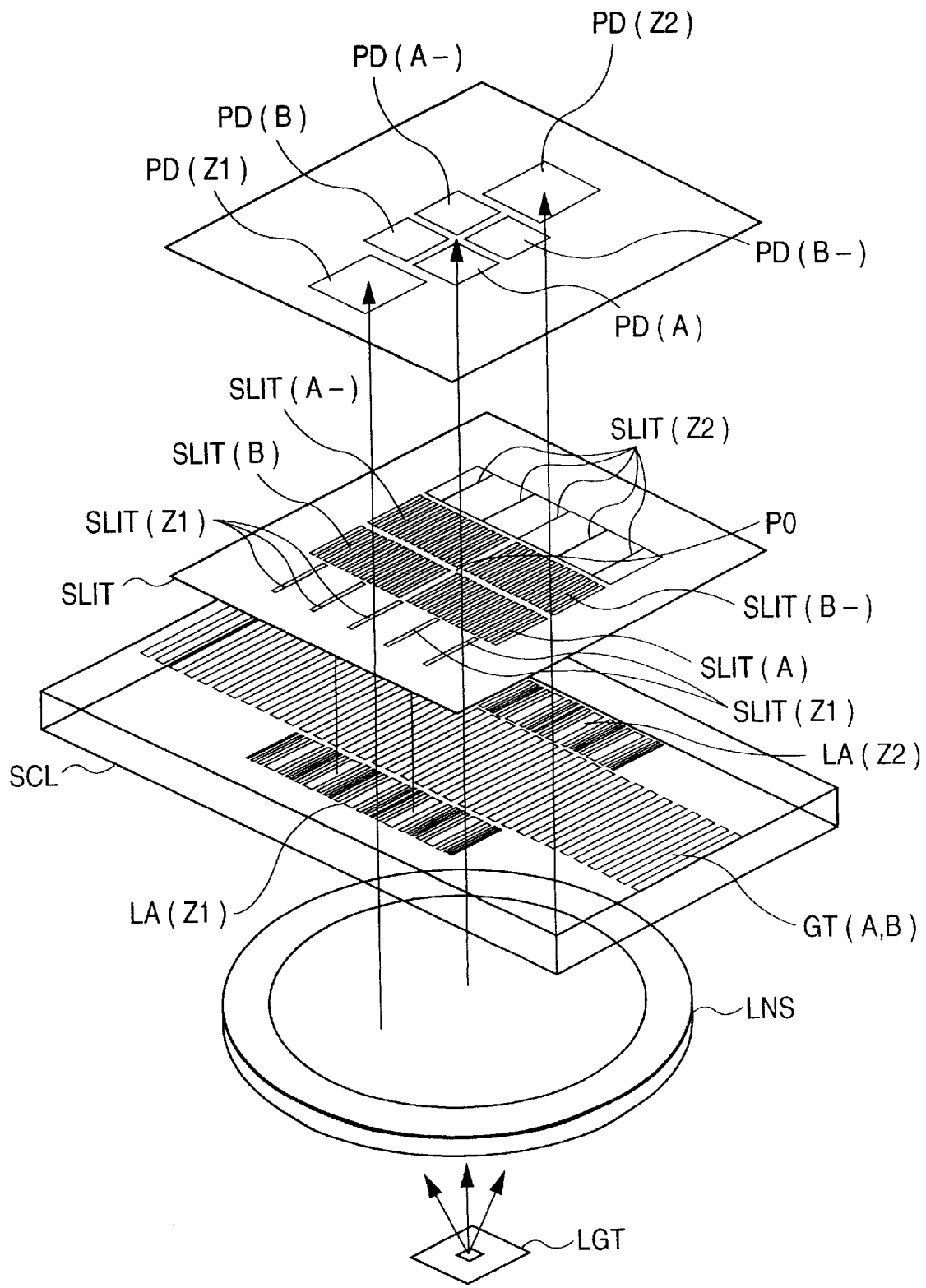
FIG. 28 is a schematic perspective view of principal part of the seventh embodiment of the present invention.

FIG. 28 is a schematic perspective view showing principal part of the seventh embodiment of the present invention. In this embodiment, as compared to the embodiment shown in FIG. 21, another origin lens array track LA(Z2) is arranged to be juxtaposed with an origin lens array track LA(Z1) and the incremental phase grating track on the scale SCL, and is illuminated with the same collimated light beam as that which illuminates the origin lens array track and the incremental phase grating track on the scale SCL. The light beam is transmitted through an origin slit grating array SLIT(Z1) and is received by a light-receiving element PD(Z1) for origin detection, and at the same time, the light beam is transmitted through a reversed slit array SLIT(Z2) for origin detection and is received by a light-receiving element PD(Z2). The other arrangements are the same as those in the fourth embodiment.

Figure 29A:
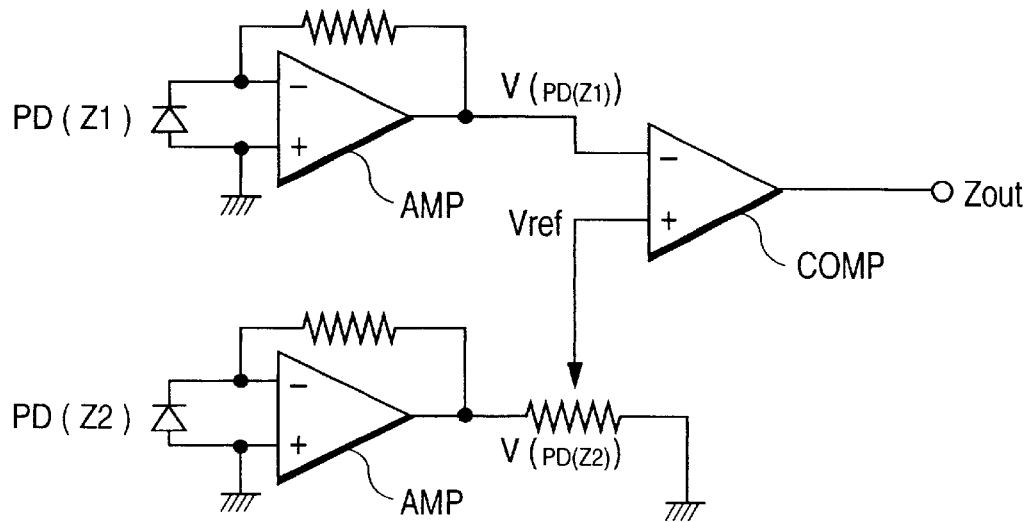
FIGS. 29A and 29B are explanatory views of conversion into a digital origin signal in the seventh embodiment of the present invention.
Figure 29B:
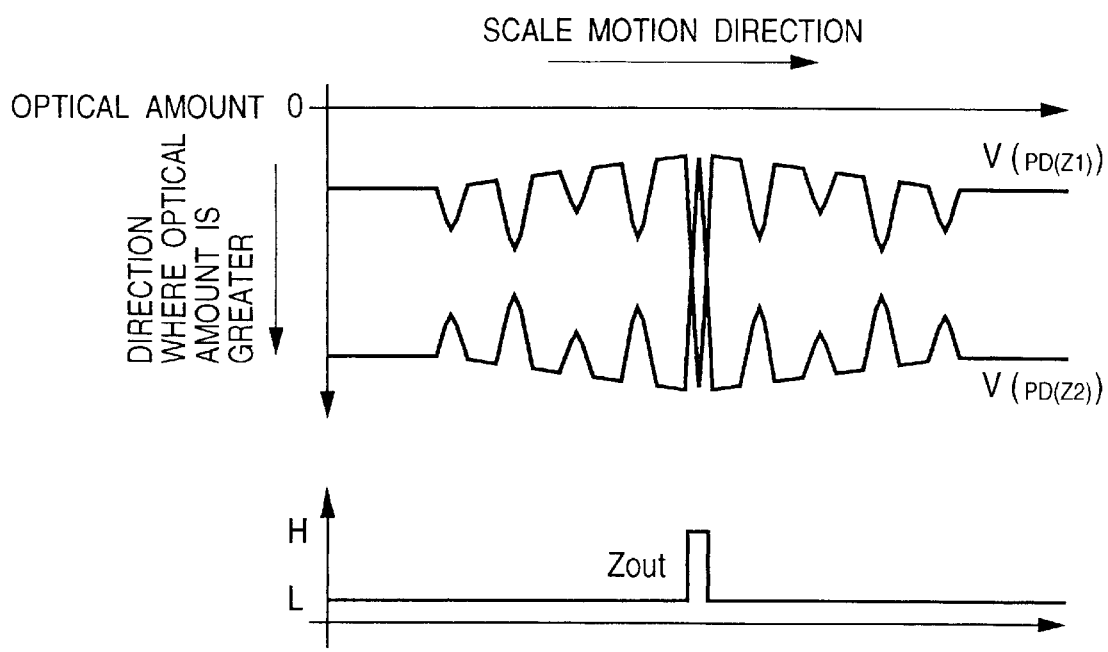

FIG. 29A is an explanatory view of a circuit for obtaining a digital origin signal from the output signals from the light-receiving elements PD(Z1) and PD(Z2). In FIG. 29A, two detected analog origin signals (PD(Z1)) and (PD(Z2)) which are inverted from each other are compared by a comparator to be binarized, and a binarized signal is output. FIG. 29B is an explanatory view showing the state of changes in signal level in the circuit shown in FIG. 29A upon relative movement of the scale SCL.

In this embodiment, in addition to the feature of origin detection free from the influence of variations in optical amount of light from the light source means, when the analog origin signal shown in FIG. 17 or 18 is small or when a peak signal having a level which is smaller than that of the maximum peak signal but is negligible is present near the maximum peak signal as in the embodiment shown in FIG. 19 or 20, the amplitude difference between peak signals can be increased, and binarization of the comparator can be performed more stably.

Figure 30A:
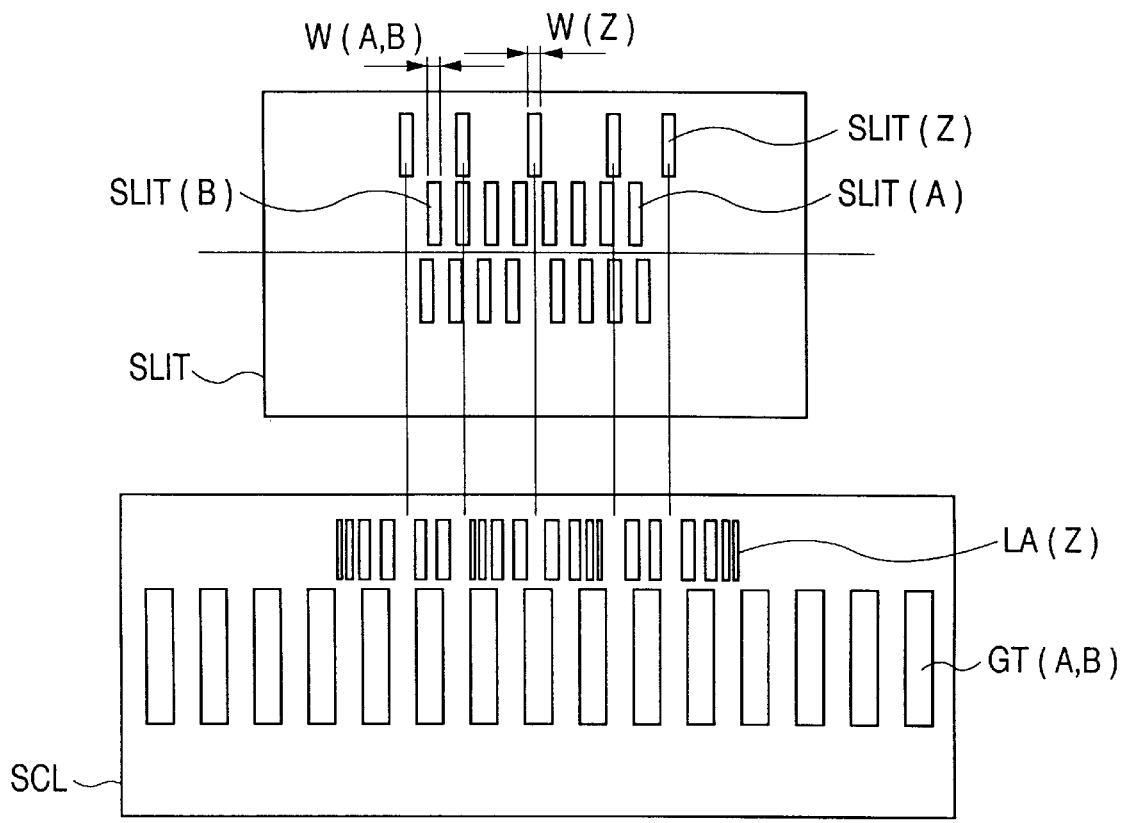
FIGS. 30A and 30B are explanatory views of a synchronization method of an origin signal and an incremental signal in the eighth embodiment of the present invention.
Figure 30B:
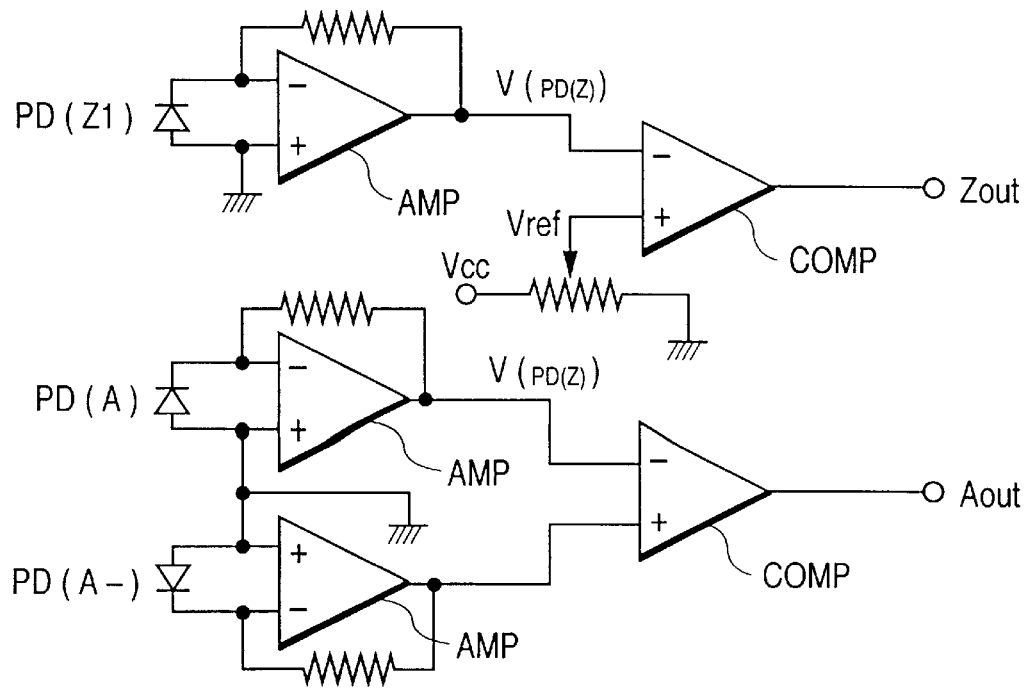

In the displacement information detection apparatus according to the present invention, the incremental and origin signals are synchronized, and a method of synchronizing the two signals will be explained below. FIGS. 30A and 30B are explanatory views of the eighth embodiment when the incremental and origin signals are synchronized in the present invention. As shown in FIG. 30A, let W(A,B) be the slit width of each of the slit gratings SLIT(A) and SLIT(B) for an incremental signal, and W(Z) be the slit width of the origin slit grating array SLIT(Z). Then, these widths are determined so that the relationship of W(A,B)= W(Z) is satisfied. As a result, an incremental signal Aout and an origin signal Zout obtained by binarization circuits shown in FIG. 30B have substantially equal detection resolutions (in the case of a digital origin signal obtained by binarizing a peak signal of an analog origin signal by a ½ voltage).

In this embodiment, since both incremental and origin signals are generated by detecting, using the single slit substrate, the intensity pattern and condensed light projected by the single scale SCL onto a space, the detection timings of the two signals hardly shift from each other. More specifically, since the relationship between the origin and incremental signals is optically and mechanically fixed, the two signals are substantially synchronized.

Figure 31:
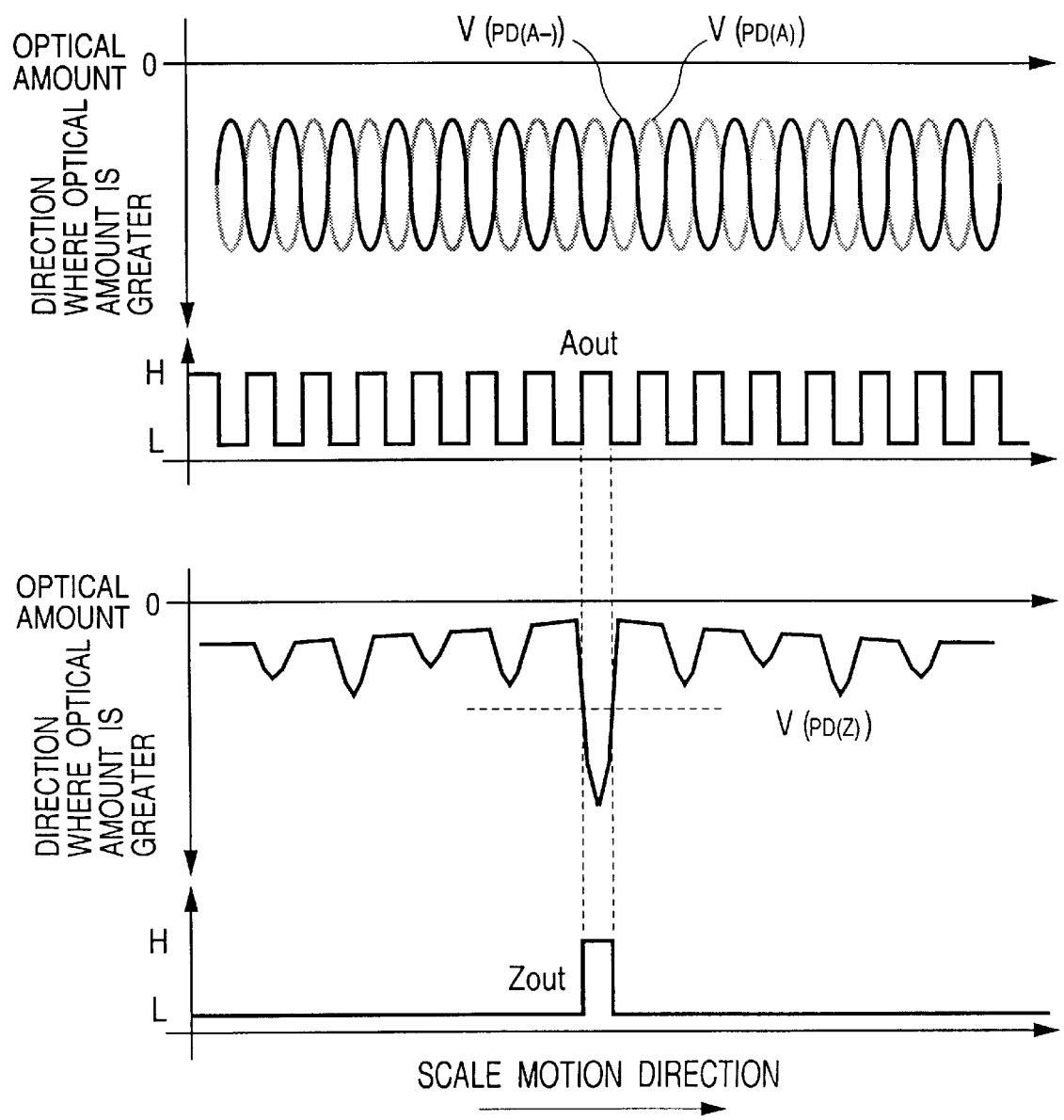
FIG. 31 is an explanatory view of the synchronization method of an origin signal and an incremental signal in the eighth embodiment of the present invention.

FIG. 31 is an explanatory view showing changes in origin signal level and incremental signal level in the circuit shown in FIG. 30B upon movement of the scale. As shown in FIG. 31, an origin signal Zout and an incremental signal Aout are substantially synchronized. In FIG. 31, PD(A) and PD(A-) are the light-receiving elements for an A-phase incremental signal, which are 180° out of phase.

Figure 32A:
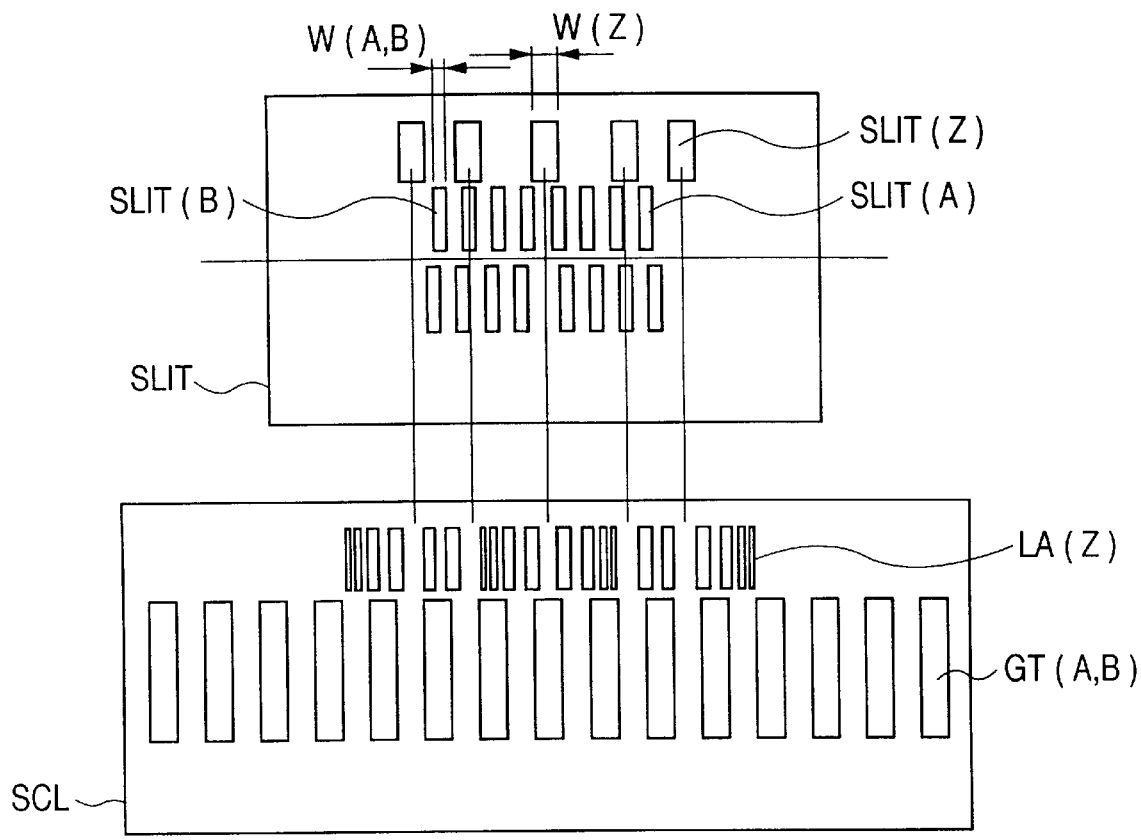
FIGS. 32A and 32B are explanatory views of a synchronization method of an origin signal and an incremental signal in the ninth embodiment of the present invention.
Figure 32B:
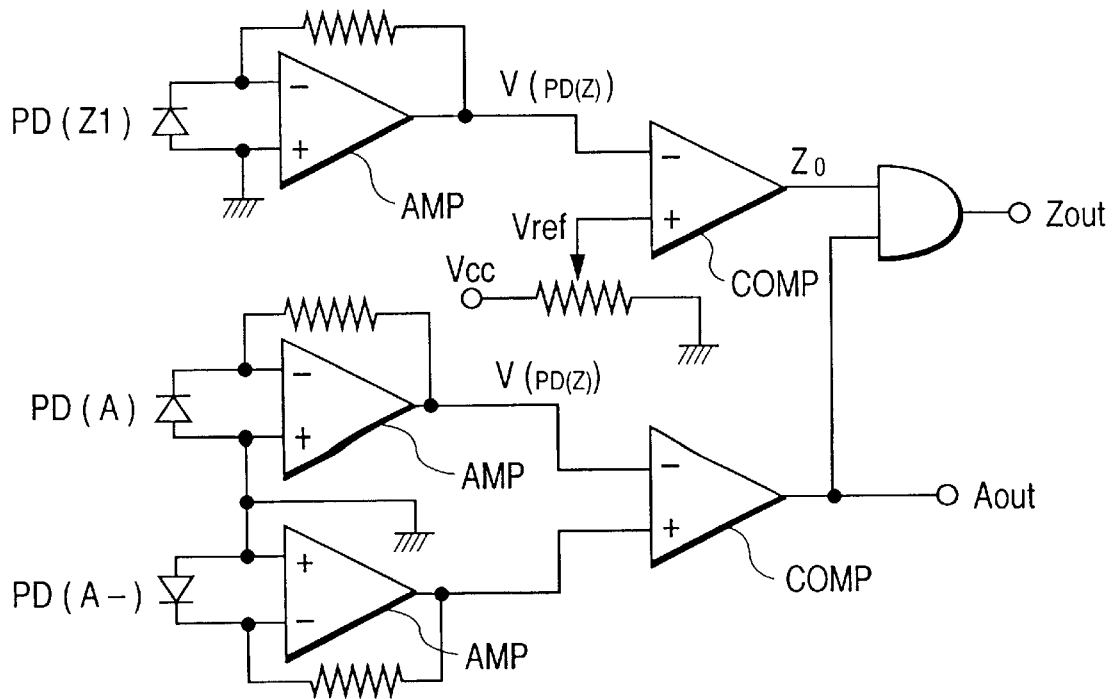

FIGS. 32A and 32B are explanatory views of the ninth embodiment when the incremental and origin signals are synchronized in the present invention. In this embodiment, as compared to the eighth embodiment shown in FIGS. 30A and 30B, the detection resolution of the origin signal is intentionally set to be ½ that of the incremental signal by setting the slit widths so that the relationship of W(A,B)= W(Z)/2 is substantially satisfied.

An origin signal Z0 obtained via a binarization circuit shown in FIG. 32B, and an incremental signal Aout are ANDed by a logic circuit LC, thereby obtaining an origin signal Zout which is perfectly synchronized with the incremental signal Aout including its phase.

Figure 33:
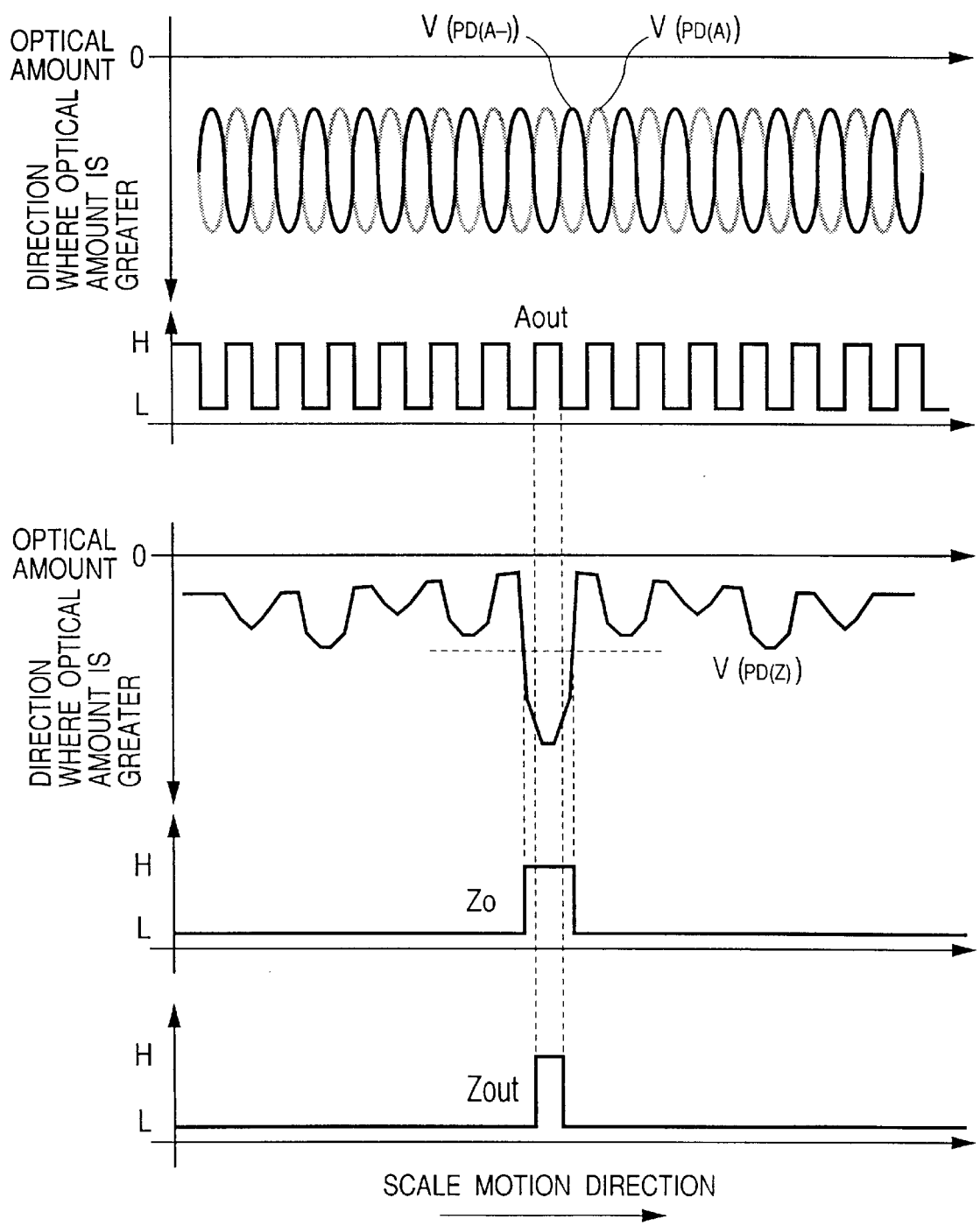
FIG. 33 is an explanatory view of the synchronization method of an origin signal and an incremental signal in the ninth embodiment of the present invention.

FIG. 33 is an explanatory view showing changes in origin signal level and incremental signal level in the circuit shown in FIG. 32B upon relative movement of the scale. As shown in FIG. 33, the origin signal Zout and the incremental signal Aout are perfectly synchronously output. Note that PD(A) and PD(A-) in FIG. 33 are the light-receiving elements for an A-phase incremental signal, which are 180° out of phase.

Figure 34:
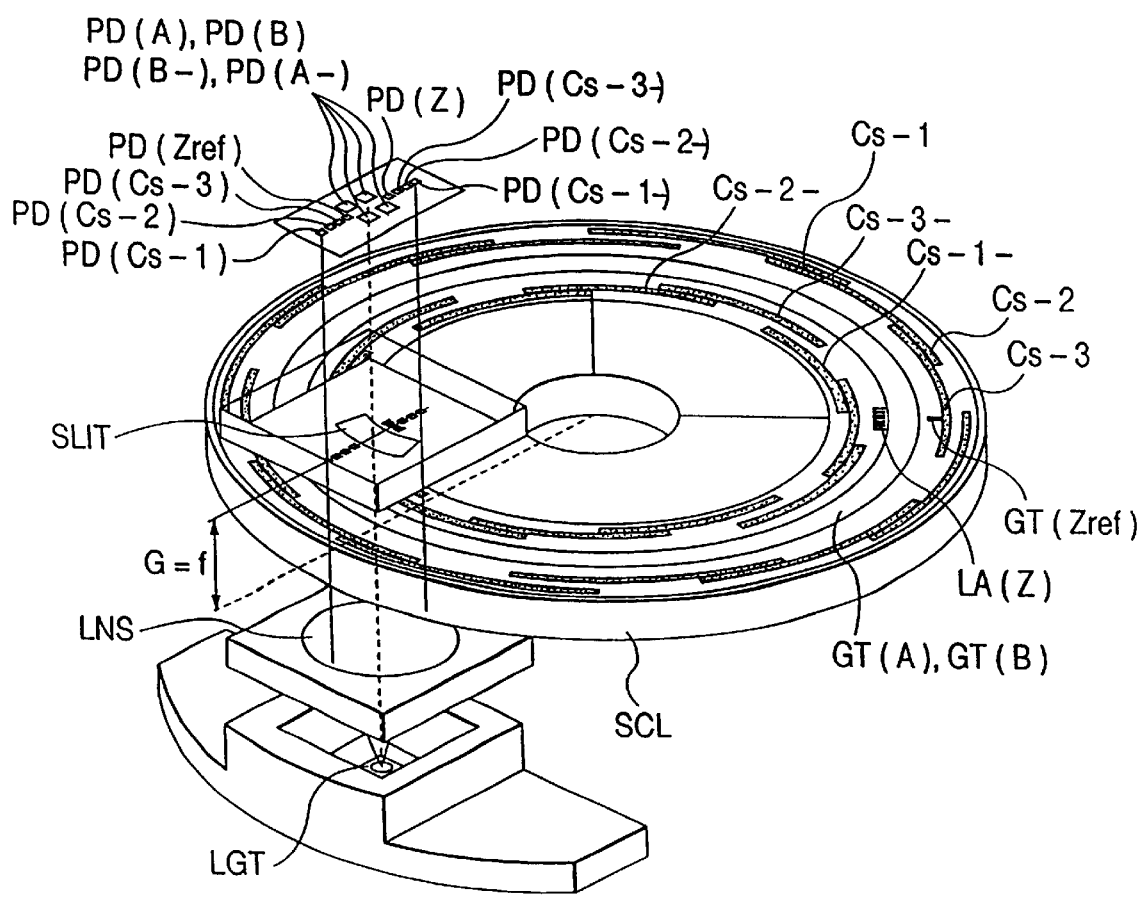
FIG. 34 is a schematic perspective view of principal part of a rotary encoder with an AC motor control signal detection function to which the above embodiment is applied.

FIG. 34 is a perspective view showing principal part of the optical arrangement used when the displacement information detection apparatus of the present invention is applied to a rotary encoder with 8-pole AC motor control signal phases (Cs phases). In FIG. 34, a scale SCL is formed into a circular shape to serve as a disk scale. Linear phase gratings for an incremental signal to be formed on the scale SCL are formed on an annular track as radial phase gratings GT(A) and GT(B). On the other hand, slits to be formed on a slit substrate SLIT are formed as radial slit gratings SLIT(A) and SLIT(B) having the same radiating central axis as that of the radial phase gratings GT(A) and GT(B).

Note that four-divided slit gratings SLIT(A), SLIT(B), SLIT(A-), and SLIT(B-) are formed on the slit substrate SLIT to shift from each other by ¼ pitches, as shown in FIG. 24 so that four-phase signals A, B, A-, and B- having a 90° phase difference therebetween are detected as incremental signals.

On the other hand, a light-receiving means PD receives signal light components using four light-receiving elements PD(A), PD(B), PD(A-), and PD(B-) in correspondence with the four slit gratings. Six patterns Cs-1, Cs-2, Cs-3, Cs-1-, Cs-2-, and Cs-3- of the 8-pole AC motor control signal phases (Cs phases) are formed on the scale substrate SCL as the presence/absence of phase diffraction gratings, and are formed on six tracks as intensity patterns having four periods/revolution to have a 120° phase difference therebetween, since the optical amount of straight light of light beams transmitted through these patterns is reduced by each phase diffraction grating. Light beams transmitted through these patterns are transmitted through a window portion on the slit substrate SLIT, and are detected by corresponding light-receiving elements PD(Cs-1) to PD(Cs-3-). These signals are detected parallel to the incremental and origin signals.

In each of the above fourth to ninth embodiments, the arrangement may be modified as follows.

(B1) The origin lens array may comprise a spherical lens array that utilizes refraction. In this case, microlenses can be formed on the surface of a transparent substrate by, e.g., a replica method.

(B2) In the above embodiments, the origin lens array comprises a linear diffraction lens array, but may comprise a circular diffraction lens array that uses a circular zone plate as a phase grating. In this case, dot-like condensed light beams appear on the slit substrate. Likewise, an elliptic diffraction lens may be used.

(B3) On the origin lens array track, any portion other than the origin lens array may comprise non-transparent and semi-transparent portions using, e.g., diffraction gratings in place of a simple transparent portion. In this case, the S/N ratio of the analog origin signal is slightly improved.

(B4) The origin pulse signal may be directly output as an analog origin signal without being binarized. Alternatively, an analog origin signal may be output after an unwanted signal is removed by an appropriate circuit.

(B5) The linear scale may be converted into a circular shape as a disk scale, linear phase diffraction gratings for an incremental signal to be formed there may be formed on an annular track as radial phase diffraction gratings, and a linear slit on the slit substrate may also be converted into a radial slit having the same radiating central axis as that of the radial phase diffraction gratings on the disk scale, thus constituting a rotary encoder that detects rotary displacement information.

(B6) AC motor control signal tracks and the like may be juxtaposed on the scale together with the origin lens array track and the phase grating track for an incremental signal, and light beams transmitted through these tracks are simultaneously received by a single light-receiving element array, thus realizing an encoder that can output incremental signals, an origin signal, and AC motor control signals (Cs phases).

In the embodiments to be described hereinafter, a lens array is arranged on the reference grating side. The embodiments will be described hereinafter although some components will be repetitively described.

Figure 35:
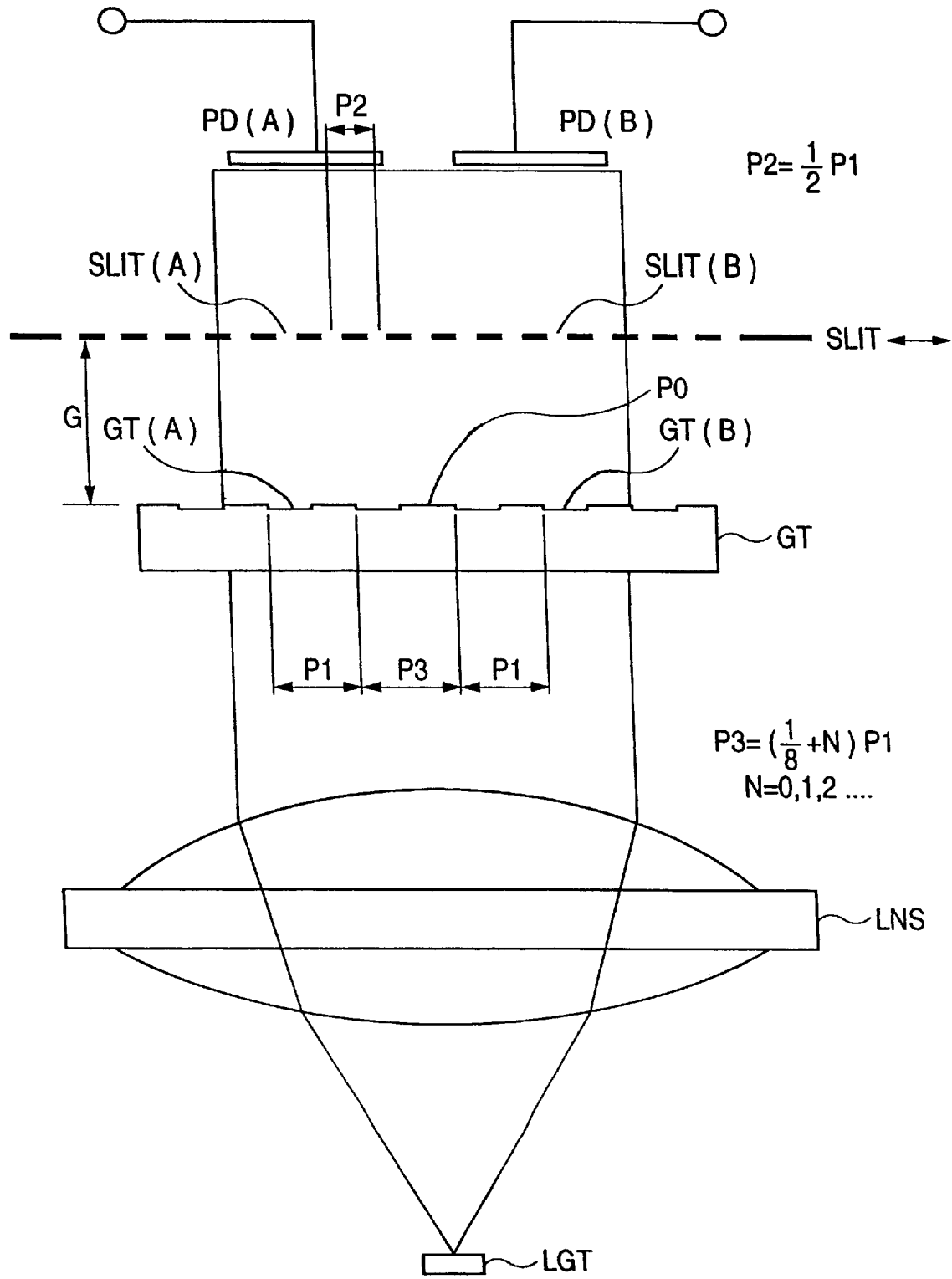
FIG. 35 is an explanatory view of an incremental signal detection optical system in the 10th embodiment of the present invention.
Figure 36:
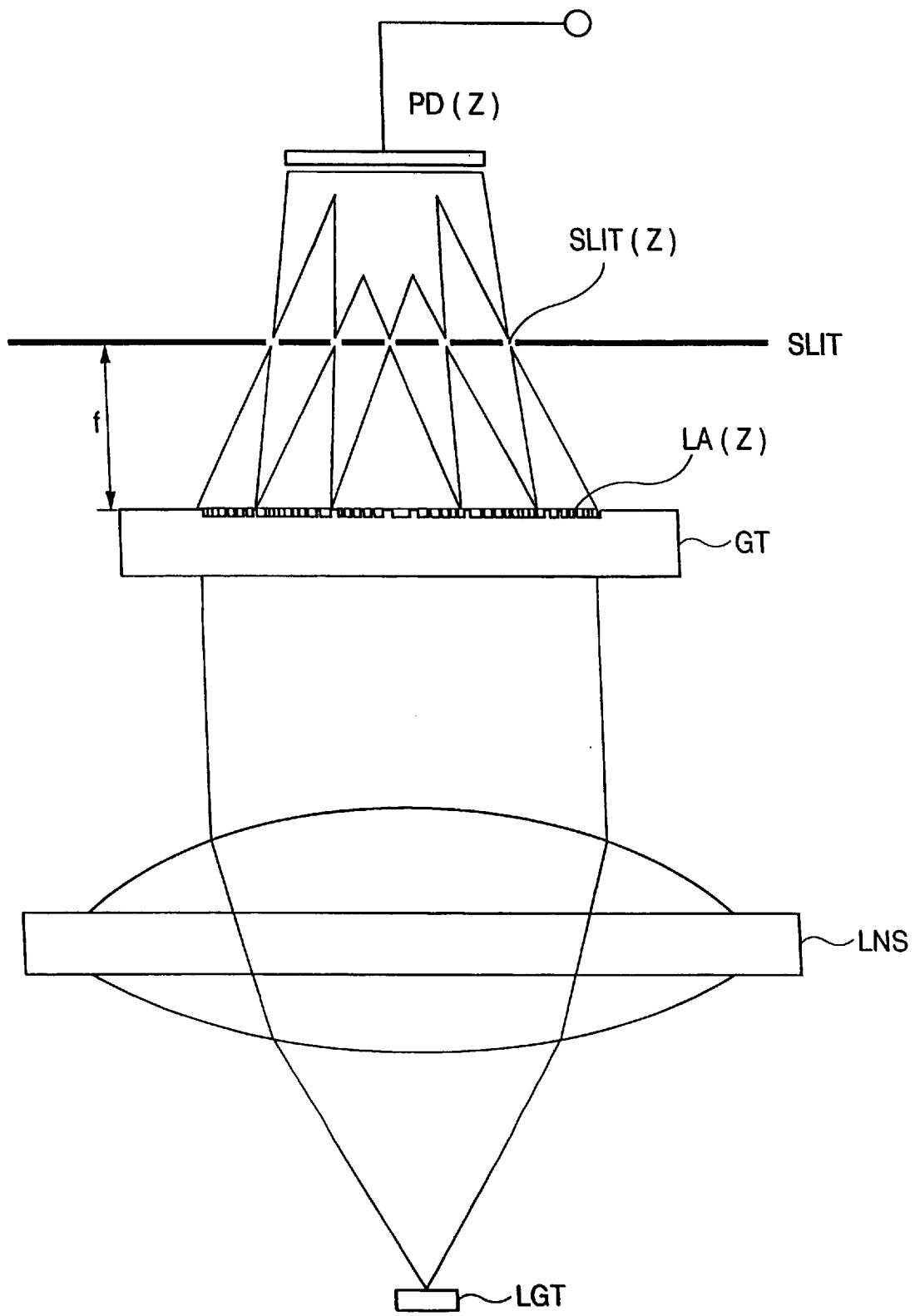
FIG. 36 is an explanatory view of an analog origin signal detection optical system in the 10th embodiment of the present invention.
Figure 37:
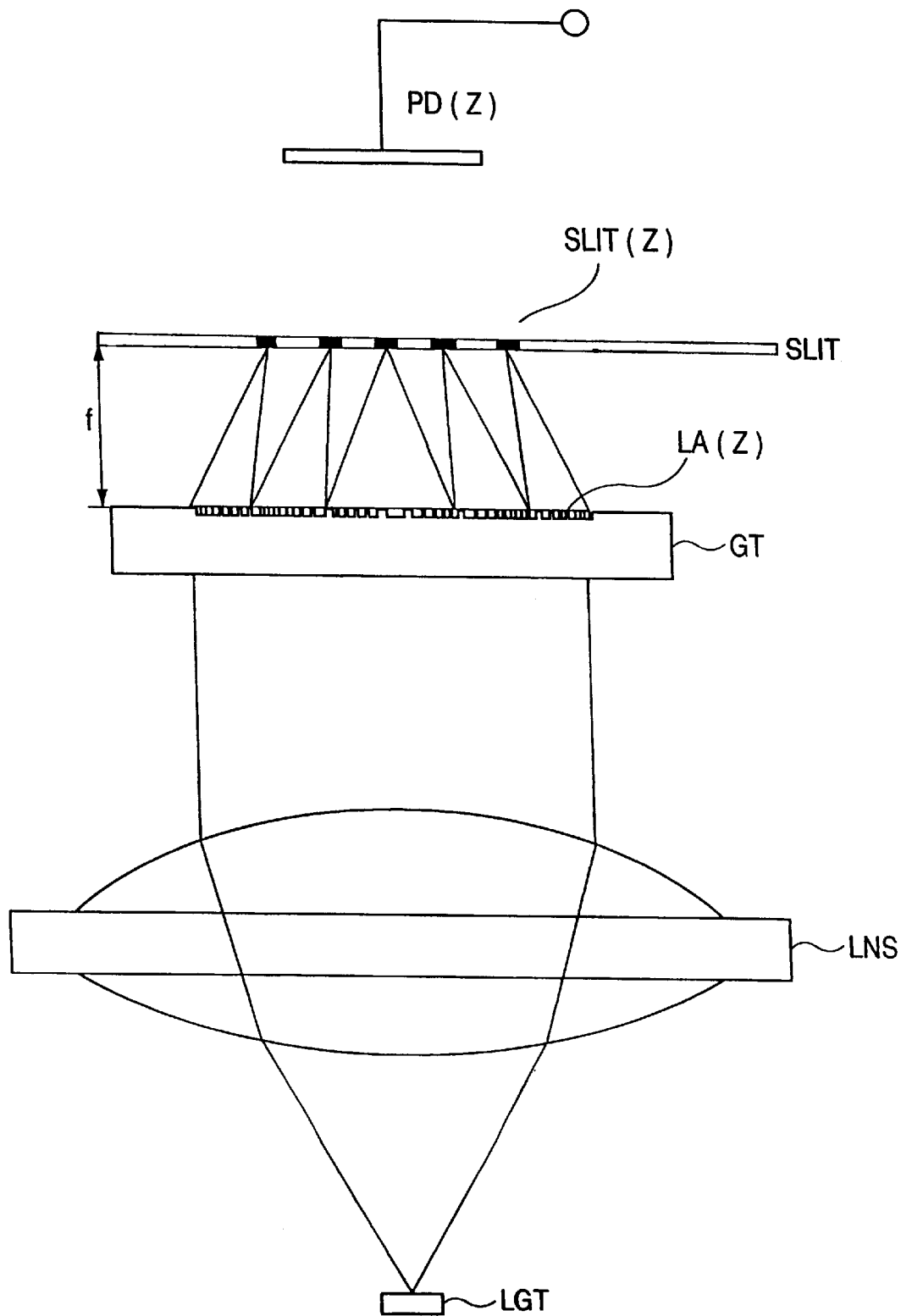
FIG. 37 is an explanatory view of another embodiment of the analog origin signal detection optical system in the 10th embodiment of the present invention.
Figure 38:
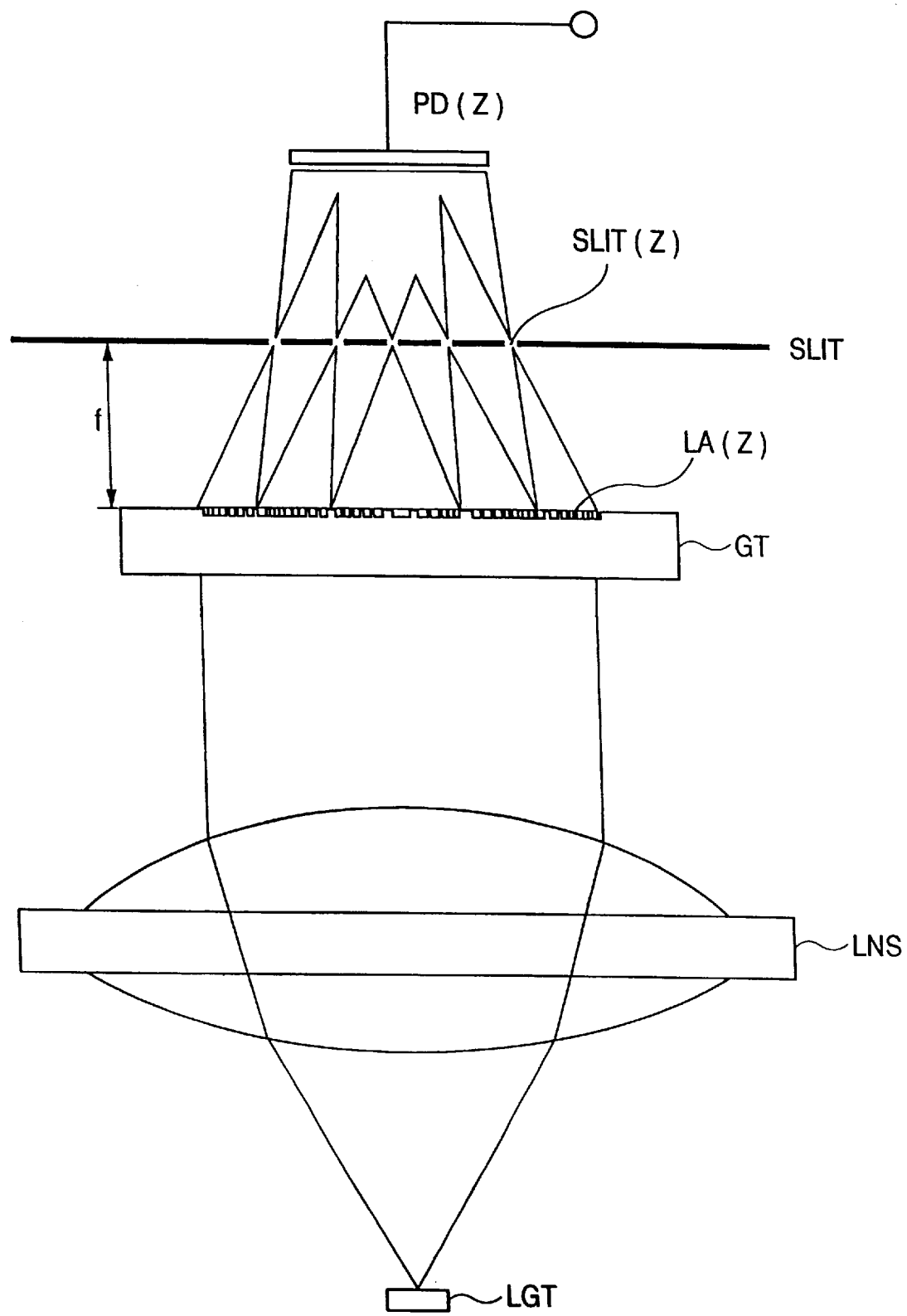
FIG. 38 is an explanatory view of still another embodiment of the analog origin signal detection optical system in the 10th embodiment of the present invention.
Figure 39:
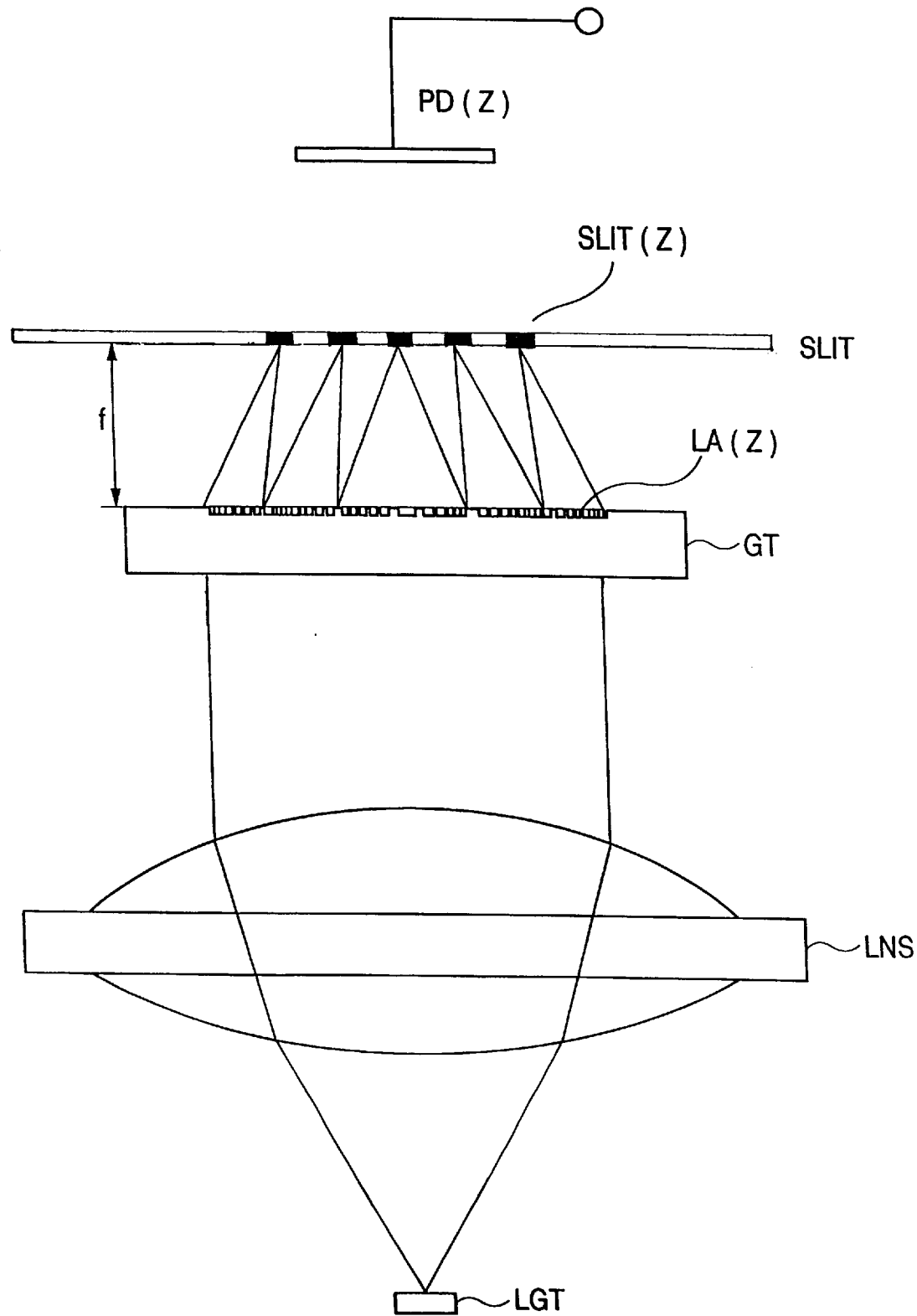
FIG. 39 is an explanatory view of still another embodiment of the analog origin signal detection optical system in the 10th embodiment of the present invention.
Figure 40:
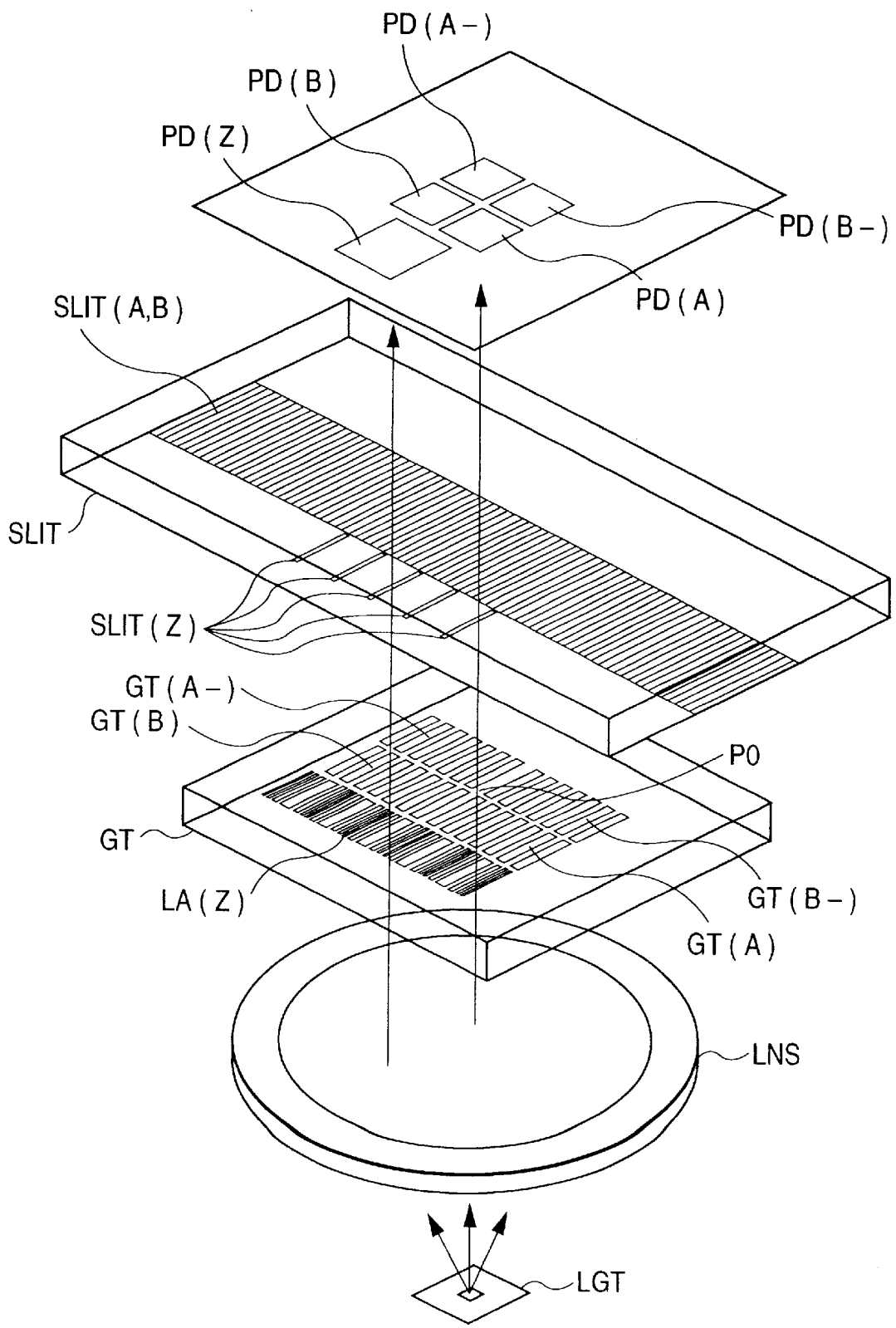
FIG. 40 is a schematic perspective view of principal part of the 10th embodiment of the present invention.

FIG. 35 is a sectional view showing principal part of an incremental signal detection optical system according to the 10th embodiment of the present invention, and FIG. 36 is a sectional view showing principal part of an analog origin signal detection optical system according to the 10th embodiment of the present invention. FIGS. 37, 38, and 39 are sectional views showing principal part when the system shown in FIG. 36 is partially modified. FIG. 40 is a perspective view showing principal part when the incremental signal detection optical system shown in FIG. 35 and the analog origin signal detection optical system shown in FIG. 36 are combined, and FIGS. 41A to 41E are explanatory views of signals obtained by a light-receiving means in the fourth embodiment.

In FIGS. 35 to 39, a stationary phase grating plate GT serves as a first substrate. On the phase grating plate GT, four phase gratings (grating patterns) GT(A), GT(B), GT(A-), and GT(B-) for an incremental signal, the grating layout positions of which are shifted by ⅛ pitches from each other to have a point PO as a boundary, and an origin lens array (this lens comprises a diffraction lens array having a linear pattern; also called a linear diffraction lens array or linear Fresnel zone plate array) LA(Z) as an array of a plurality of lenses for an origin signal are formed on different tracks.

A slit scale SLIT serving as a second substrate opposes the scale SCL to be separated by a gap G of about 50 to several 100 μm. Slit gratings SLIT(A) and SLIT(B) are formed on the slit scale SLIT. Also, an origin slit grating array (origin slit array) SLIT(Z) as an array of a plurality of slits for an origin signal is formed on a track different from that of the slit gratings SLIT(A) and SLIT(B).

A light source means LGT such as an LED has low coherency. A collimator lens LNS converts a light beam emitted by the light source means LGT into a collimated light beam. The light source means LGT and the collimator lens LNS are constituting elements of a light-projection means. A light-receiving means PD has four light-receiving elements PD(A), PD(B), PD(A-), and PD(B-) for receiving diffracted light components diffracted by the phase gratings GT(A), GT(B), GT(A-), and GT(B-), and a light-receiving element PD(Z) for an origin signal.

In this embodiment, the light source means LGT, the collimator lens LNS, the phase grating plate GT, and the light-receiving means PD are housed in a detection head and are fixed in position.

A method of detecting the incremental signal in this embodiment will be described below with reference to FIG. 35. A light beam emitted by the light source means LGT is converted into a collimated light beam by the collimator lens LNS, and the light beam is illuminated on the stationary phase grating plate GT. The collimated light beam simultaneously illuminates the phase grating track for an incremental signal and the origin diffraction lens track for an origin signal on the phase grating plate GT.

As shown in FIG. 35, the phase grating track for an incremental signal generates diffracted light beams by the phase gratings GT(A), GT(B), GT(A-), and GT(B-) each having a three-dimensional pattern, and projects an intensity pattern having a pitch half the original grating pitch onto a space separated by 50 to several 100 µm. Note that each of the phase gratings GT(A), GT(B), GT(A-), and GT(B-) comprises a lamellar grating having a fine structure that does not generate any 0th-order diffracted light. Also, recess and projecting portions of each grating transmit light.

The intensity pattern projected onto the slit scale SLIT by the phase gratings GT(A), GT(B), GT(A-), and GT(B-) on the phase grating plate GT is selectively transmitted through or shielded by the slit gratings SLIT(A) and SLIT(B) on the slit substrate SLIT, which have the same pitch as that of the intensity pattern, in correspondence with the positional relationship between the intensity pattern and the slit gratings SLIT(A) and SLIT(B).

The four phase gratings GT(A), GT(B), GT(A-), and GT(B-) are formed on four regions divided to have the point PO as a boundary, so that their grating layout phases are shifted from each other by ⅛ pitches. With this arrangement, the timings of changes in intensity of signal light components transmitted through these regions are shifted from each other by ¼ periods, thereby generating so-called A- and B-phase signals. In this case, when the slit gratings SLIT(A) and SLIT(B) move by one pitch upon movement of the slit scale SLIT, the intensity pattern moves by two pitches, and the intensity of the light beam transmitted through the slit grating SLIT changes once sinusoidally.

Figure 41A:
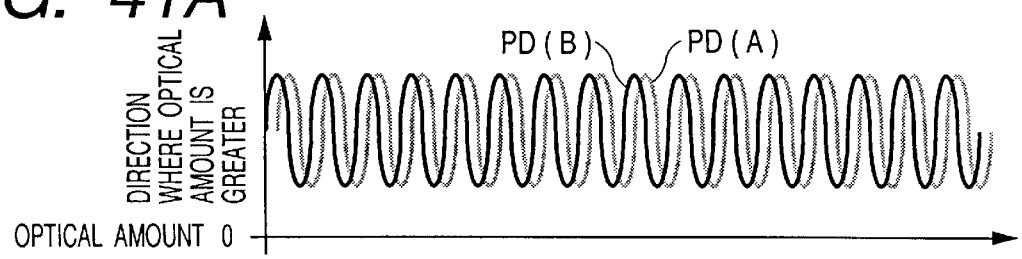
FIGS. 41A to 41E are explanatory views of signals from a light-receiving means in the 10th embodiment of the present invention.

FIG. 41A shows the state of an intensity signal when the amounts of light beams that reach the two light-receiving elements PD(A) and PD(B) of the four light-receiving elements change upon relative movement of the slit scale SLIT. This intensity signal light is received by the light-receiving elements PD(A) and PD(B), and a sinusoidal analog signal current for one period is obtained from the light-receiving elements PD(A) and PD(B) upon movement of the slit scale SLIT by one pitch of the slit grating. For example, if the phase grating pitch of the slit scale SLIT is P=10 µm, a sinusoidal analog signal current having a period of 10 µm is obtained.

In this embodiment, as described above, the light-receiving means PD obtains an incremental signal upon movement of the slit scale SLIT.

In this embodiment, two phase gratings GT(A) and GT(B) which are shifted from each other by ⅛ pitches may be arranged in place of the four phase gratings on the phase grating plate GT, and two light-receiving elements PD(A) and PD(B) may be arranged in place of the four light-receiving elements of the light-receiving means PD, so that A- and B-phase signals may be obtained by the two light-receiving elements.

A method of detecting the analog origin signal in this embodiment will be explained below with reference to FIG. 36. As shown in FIG. 36, a light beam that illuminates the origin lens array LA(Z) on the scale SCL projects a linearly condensed light pattern onto a space corresponding to the position of the focal length f of one lens of the origin lens array LA(Z), and enters the origin slit array SLIT(Z) including an array of a plurality of slits on the slit scale SLIT arranged at the projection space. The light beam that has passed through the origin slit array SLIT(Z) of the slit scale SLIT is incident on the light-receiving element PD(Z). A width a (the width of a region having an intensity of ½ or higher) of the condensed light beam is set to be equal to or smaller than a width b of the origin slit array SLIT(Z). That is, the respective elements are set so that the relationship of a≦b is satisfied.

In this embodiment, since the light-receiving element PD(Z) for origin detection is separated from the slit scale SLIT and is small, the respective lens elements of the origin lens array LA(Z) are appropriately decentered to give appropriate directivity to light beams to be condensed by them, so that the light beams are transmitted through the origin slit grating array SLIT(Z) and efficiently become incident on the light-receiving element PD(Z).

When a light beam illuminates the entire origin lens array LA(Z), the linearly condensed light pattern generated by the origin lens array LA(Z) matches the origin slit grating array SLIT(Z) on the slit scale SLIT, and at an instance when all the lenses and slits match each other upon relative movement of the slit scale SLIT, light beams pass through all the slits. Hence, the sum total of the amounts of these light beams is maximized, and transmission light having a maximum optical amount is incident on the light-receiving element PD(Z), thus outputting a pulse-shaped sharp waveform.

Figure 41B:
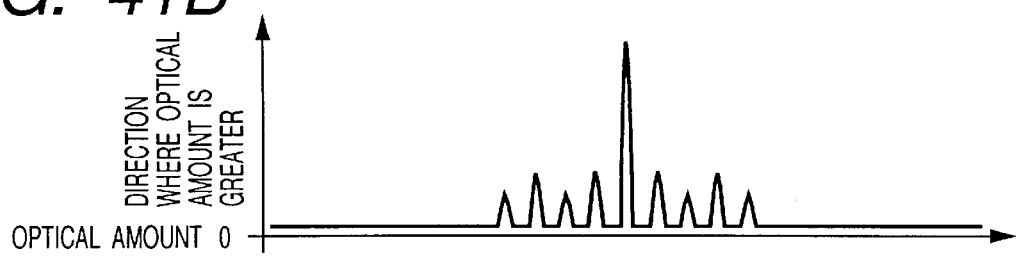

FIG. 41B shows the state of changes in optical amount of light that reaches the light-receiving element PD(Z) upon relative movement of the slit scale SLIT. Note that the bottom positions of a plurality of pulse-shaped waveforms are changed into V shape, and small transmission optical amounts are detected on both sides since a light beam irradiated onto a portion other than the origin lens array LA(Z) is transmitted through the origin slit grating array SLIT(Z) and is incident on the light-receiving element PD(Z). Such changes can be eliminated by forming a light-shielding/light-reducing portion (absorption of light using a light-shielding paint, or a reduction of 0th-order transmission light using a lamellar diffraction grating) on a portion, of the origin lens array track, other than the origin lens array LA(Z). However, if such changes are small, no serious problem is posed.

FIG. 37 is a schematic view showing principal part of an embodiment when the transparent and non-transparent portions of the origin slit grating array SLIT(Z) on the slit substrate SLIT shown in FIG. 36 replace each other. As shown in FIG. 37, when the transparent slit pattern on the slit scale SLIT is reversed, and the linearly condensed light pattern generated by the origin lens array LA(Z) is set to equal the non-transparent slit pattern SLIT(Z-) on the slit scale SLIT when a light beam illuminates the entire origin lens array LA(Z), the light beam is shielded by all the non-transparent slits at an instance when the lenses and slits match each other upon relative movement of the slit scale SLIT, and the sum total of optical amounts is minimized. As a result, transmission light of a minimum optical amount is incident on the light-receiving element PD(Z), and a pulse-shaped sharp waveform obtained by inverting that shown in FIG. 41B is output, as shown in FIG. 41C.

Figure 41C:
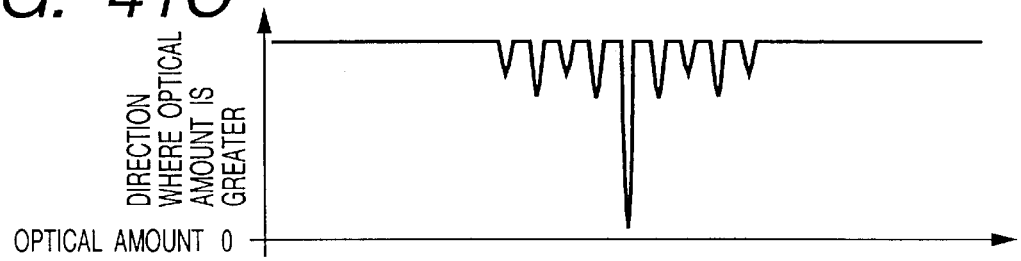

As shown in FIG. 41B or 41C, when the slits of the origin slit grating array SLIT(Z) match the condensed light beams, transmission light of a maximum or minimum optical amount is incident on the light-receiving element, and a pulse-shaped sharp waveform is obtained. Also, pulse-shaped waveforms are output at intervals close to the average interval of slits of the origin slit grating array SLIT(Z) or SLIT(Z-). In this case, by appropriately varying the intervals of the slit elements of the origin slit grating array SLIT(Z) or SLIT(Z-) or the intervals of condensed light beams condensed on the origin slit grating array SLIT(Z) or SLIT(Z-), the latter waveforms are suppressed, and essentially one pulse-shaped sharp waveform is output.

Figure 41D:
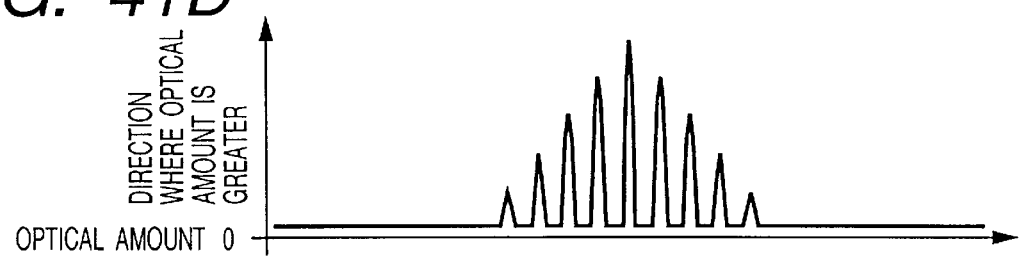

FIG. 38 is a schematic view showing the arrangement wherein the intervals of the slit elements of the origin slit grating array SLIT(Z) shown in FIG. 36 and the condensed light beam intervals on the origin slit grating array SLIT(Z) are set to be equal to each other. At this time, as shown in FIG. 41D, when the slit elements and the condensed light beams match each other, transmission light of a maximum optical amount is incident and a pulse-shaped sharp waveform is obtained. However, before and after this pulse, pulse-shaped waveforms are output at the slit intervals of the origin slit grating array SLIT(Z).

Figure 41E:
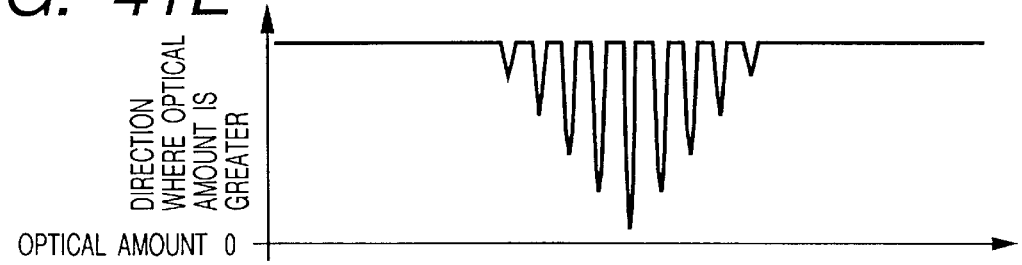

FIG. 39 is a schematic view showing the arrangement wherein the origin slit grating array SLIT(Z) shown in FIG. 38 is reversed to obtain a non-transparent slit grating array SLIT(Z-). At this time, as shown in FIG. 41E, since light beams are shielded by all the non-transparent slits at an instance when the slits and the light beams match each other upon relative movement of the slit scale SLIT, the sum total of optical amounts is minimized. As a result, transmission light of a minimum optical amount is incident on the light-receiving element PD(Z), and a pulse-shaped sharp waveform inverted from that shown in FIG. 41D is output.

In this embodiment, an analog origin signal is obtained in this manner. Extraction of a digital origin signal and its signal processing system in this embodiment will be described below.

Figure 42A:
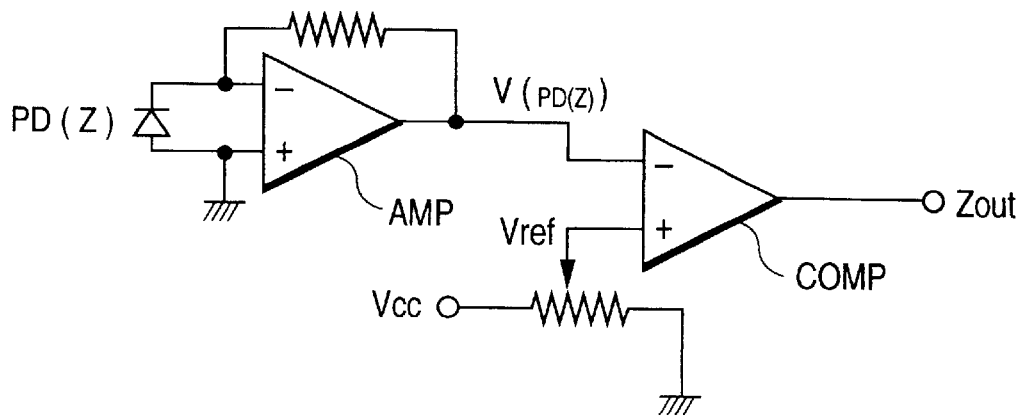
FIGS. 42A and 42B are explanatory views of conversion into a digital origin signal in the 10th embodiment of the present invention.
Figure 42B:
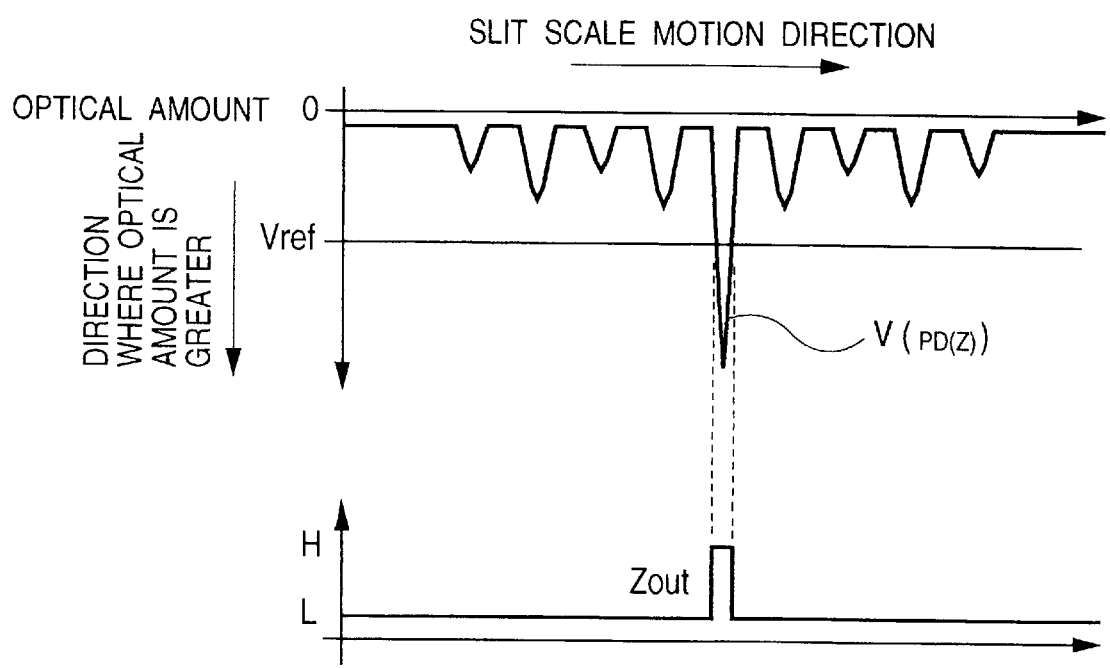

FIG. 40 is a perspective view showing the arrangement of the overall optical system obtained when the incremental signal detection optical system shown in FIG. 35 and the origin signal detection optical system shown in FIG. 36 are combined. FIG. 42A is an explanatory view of a circuit for obtaining a digital origin signal from the output of the light-receiving element PD(Z), and FIG. 42B is an explanatory view showing the state of changes in signal level in the circuit shown in FIG. 42A upon relative movement of the slit scale SLIT. As shown in FIG. 42B, an appropriately set reference voltage Vref and an analog origin signal V(PD(Z)) obtained from the output from the light-receiving element PD(Z) via an amplifier AMP are compared by a comparator COMP to binarize the signal V(PD(Z)), and the binarized signal is output as a digital origin signal.

In FIG. 40, the phase grating plate GT for an incremental signal is divided into four regions, i.e., the phase gratings GT(A), GT(B), GT(A-), and GT(B-), which are formed to have a phase difference of ⅛ pitches from each other. When light beams diffracted by these gratings are received by the four corresponding light-receiving elements PD(A), PD(B), PD(A-) and PD(B-), 4-phase incremental signals having a 90° phase difference from each other are obtained. The method of detecting the incremental signal is the same as that shown in FIG. 35. Also, the method of detecting the origin signal is the same as that shown in FIG. 36.

As described above, in this embodiment, the incremental and origin signal detection optical systems are constituted using common components. In particular, the incremental and origin signal detection optical systems are constituted, as shown in FIGS. 35 and 36, and are integrally arranged, as shown in FIG. 40. A distance G from the phase grating plate GT to the position where an intensity pattern of a pitch half the grating pitch is generated by the phase gratings for an incremental signal is set to be nearly equal to the focal length f of one lens of the origin lens array, so that the slit gratings SLIT(A) and SLIT(B) for an incremental signal and the origin slit grating array SLIT(Z) for origin detection can be formed on a single substrate. In this manner, the slit scale SLIT is commonly used. Also, the light-receiving means PD for an incremental signal, the light-receiving element PD(Z) for an origin signal, and other light-receiving elements are integrally formed as a light-receiving element array on a single substrate, thus simplifying the apparatus. In this embodiment, the following effects are similarly obtained.

(A1) The productivity is splendid.

For example, both the origin lens array LA(Z) and the phase gratings GT(A) and GT(B) for an incremental signal formed on the phase grating plate GT are transparent three-dimensional optical elements, and can be manufactured by the same manufacturing method such as replica, injection molding, or the like, thus achieving a great cost reduction. In particular, when the origin lens array is patterned as a diffraction lens, both the origin lens and the phase gratings have lamellar phase grating patterns, and the step of their projecting and recess portions is determined not to generate 0th-order diffracted light. For this reason, the manufacturing method based on glass etching, and a replica or injection molding method using the same can be used, thus realizing optical elements with very high productivity.

(A2) High-resolution origin and incremental signals are easily obtained.

When the condensed light beam width by the origin lens array LA(Z) on the phase grating plate GT and the slit width of the origin slit grating array SLIT(Z) are decreased, an origin signal having a high resolution required can be easily obtained.

(A3) A downsizing is easy.

Since the phase gratings for an incremental signal and the origin lens array are juxtaposed on the phase grating plate GT, the slit gratings SLIT(A) and SLIT(B) for an incremental signal and the origin slit grating array SLIT(Z) are juxtaposed on the slit scale SLIT, and the four light-receiving elements PD(A), PD(B), PD(A-), and PD(B-) for an incremental signal and the light-receiving element PD(Z) for an origin signal are juxtaposed as a light-receiving element array on the light-receiving element substrate, the respective signal detection optical system members can be commonly used, and special-purpose origin detection members can be omitted, thus realizing a size reduction.

(A4) The origin and incremental signals can be synchronized.

Since both the incremental and origin signals are detected with reference to the phase grating plate and the slit scale, the relationship between the incremental and origin signals are mechanically stabilized, and synchronous signals are obtained.

(A5) An origin signal with a high S/N ratio is obtained.

Since an array of a plurality of lenses are arranged on the phase grating plate, a plurality of origin signal slits are also arranged on the slit scale, and the respective lens elements have directivity toward the light-receiving element PD(Z), the optical amount of light beams which are condensed toward the light-receiving element PD(Z) by the origin lens array LA(Z) increases even when the gap G between the phase grating plate and the slit scale is as small as 50 to several 100 μm. Since such light beams are transmitted through the origin slit array SLIT(Z), the optical amount of the analog origin signal increases, and hence, an analog origin signal with a high S/N ratio can be obtained.

In this embodiment, the phase gratings used for detecting the incremental signal may be formed on a third substrate different from the phase grating plate as the first substrate on which the origin lens array is formed, and the positional relationship between the third and second substrates may be set to be the same as that described above. Using an incremental signal obtained from the light-receiving means PD, relative displacement information between the third and second substrates may be obtained.

Figure 43:
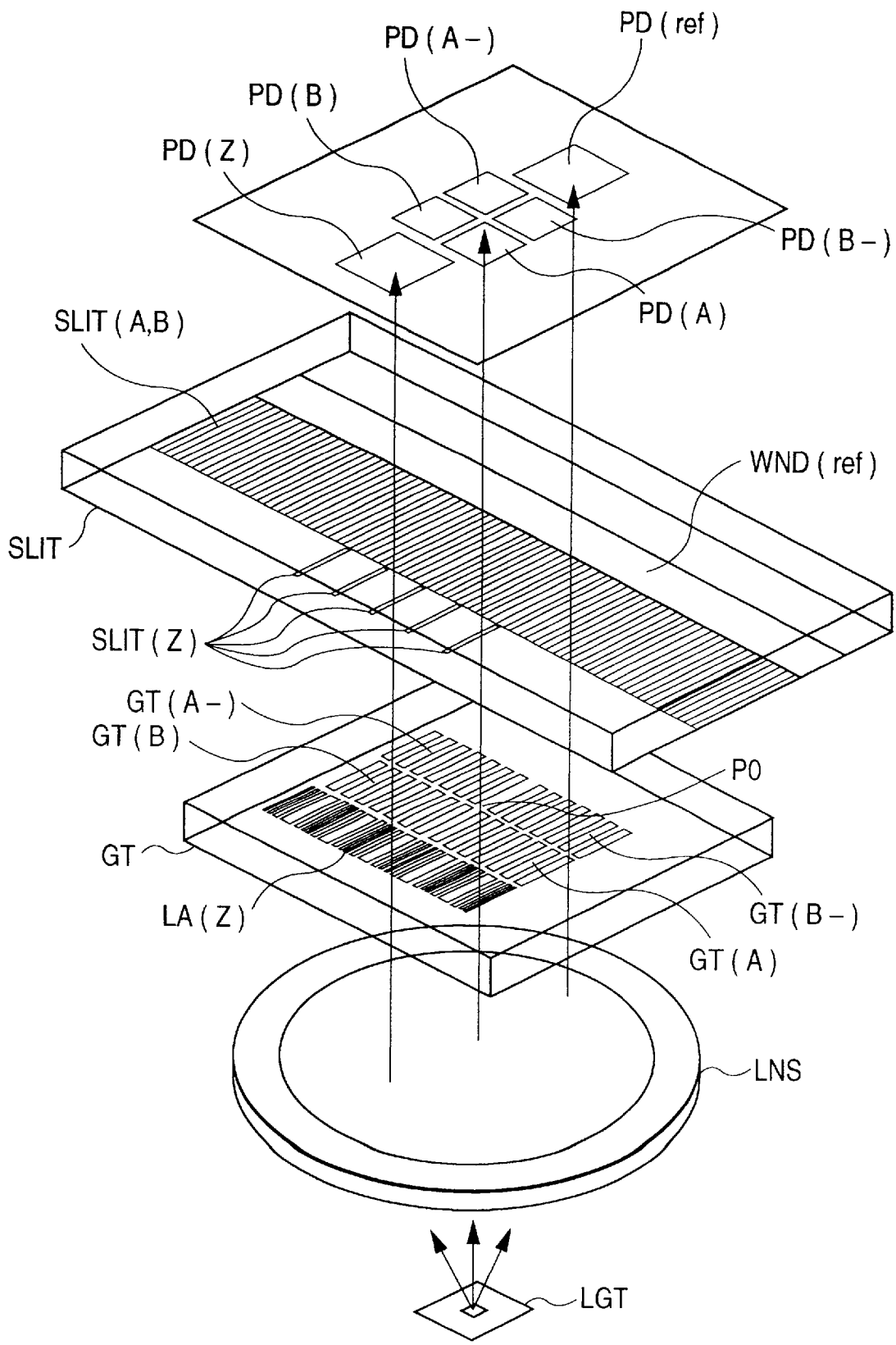
FIG. 43 is a schematic perspective view of principal part of the 11th embodiment of the present invention.

FIG. 43 is a schematic perspective view showing principal part of the 11th embodiment of the present invention. In this embodiment, as compared to the 10th embodiment shown in FIG. 40, an optical amount monitor track (the entire track is a transparent portion) is added to be juxtaposed with the origin lens array track and the incremental phase grating track on the phase grating plate GT, and is illuminated with the same collimated light beam which is also irradiated onto the origin lens array track and the incremental phase grating track on the phase grating plate GT. The light beam is transmitted through the optical amount monitor track and an aperture portion WND(ref) formed on the slit scale SLIT, and is received by a light-receiving element PD(ref) for monitoring the optical amount. Other arrangements are the same as those in the 10th embodiment.

Figure 44A:
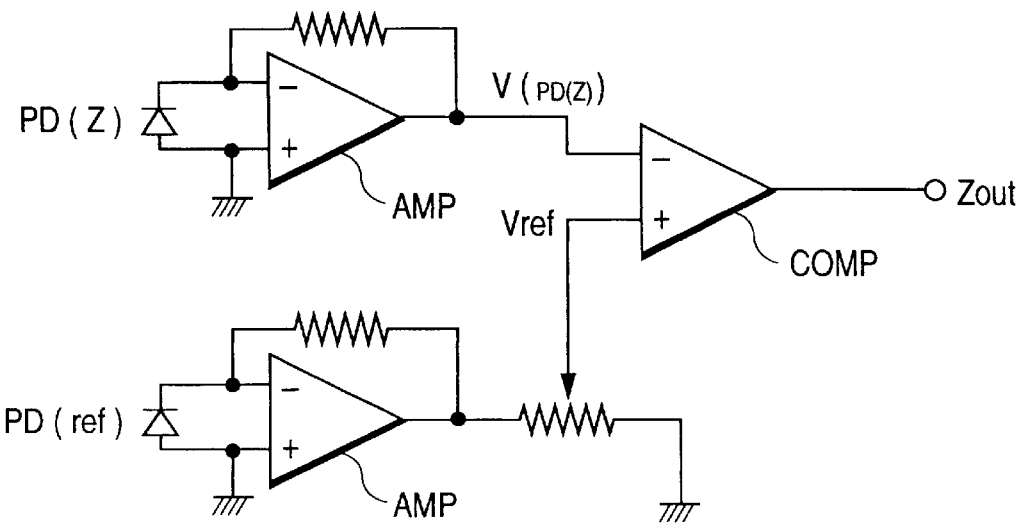
FIGS. 44A and 44B are explanatory views of conversion into a digital origin signal in the 11th embodiment of the present invention.
Figure 44B:
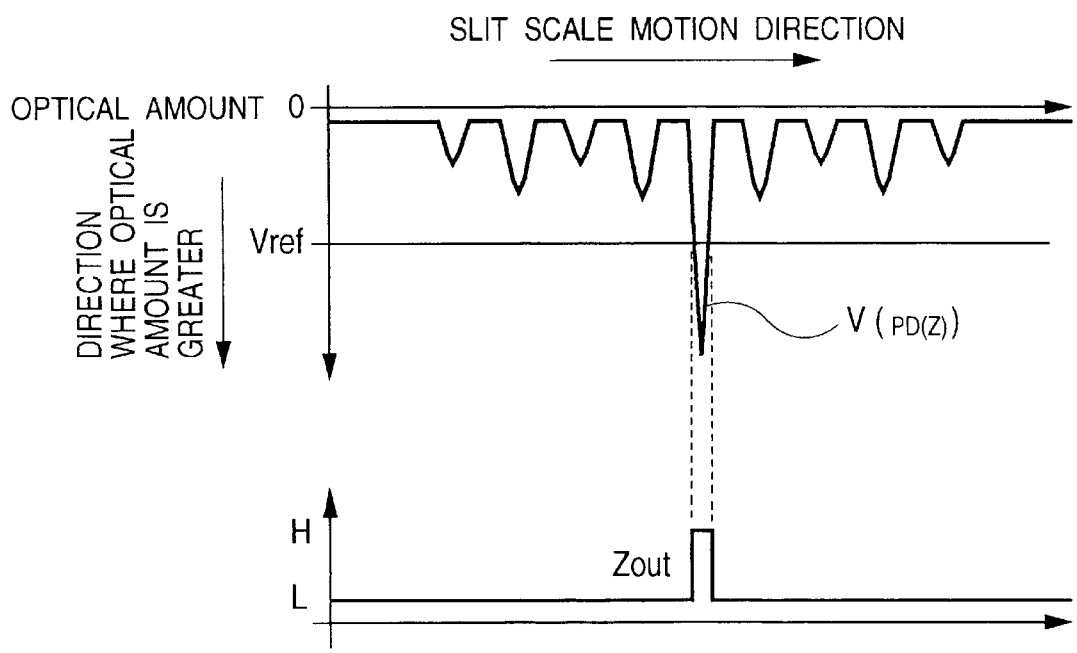

FIG. 44A is an explanatory view of a circuit for obtaining a digital origin signal from the output signals from the light-receiving elements PD(Z) and PD(ref) in this embodiment. In FIG. 44A, the optical amount level detected by the light-receiving element PD(ref) is multiplied with an appropriate coefficient to generate a reference voltage signal Vref, which is compared with an analog origin signal V(PD(Z)) by a comparator, thus binarizing the origin signal and outputting a binarized signal. FIG. 44B is an explanatory view showing the state of changes in signal level in the circuit shown in FIG. 44A upon relative movement of the slit scale SLIT.

In this embodiment, the origin signal can be detected without being influenced by variations in optical amount of light from the light source means.

Figure 45:
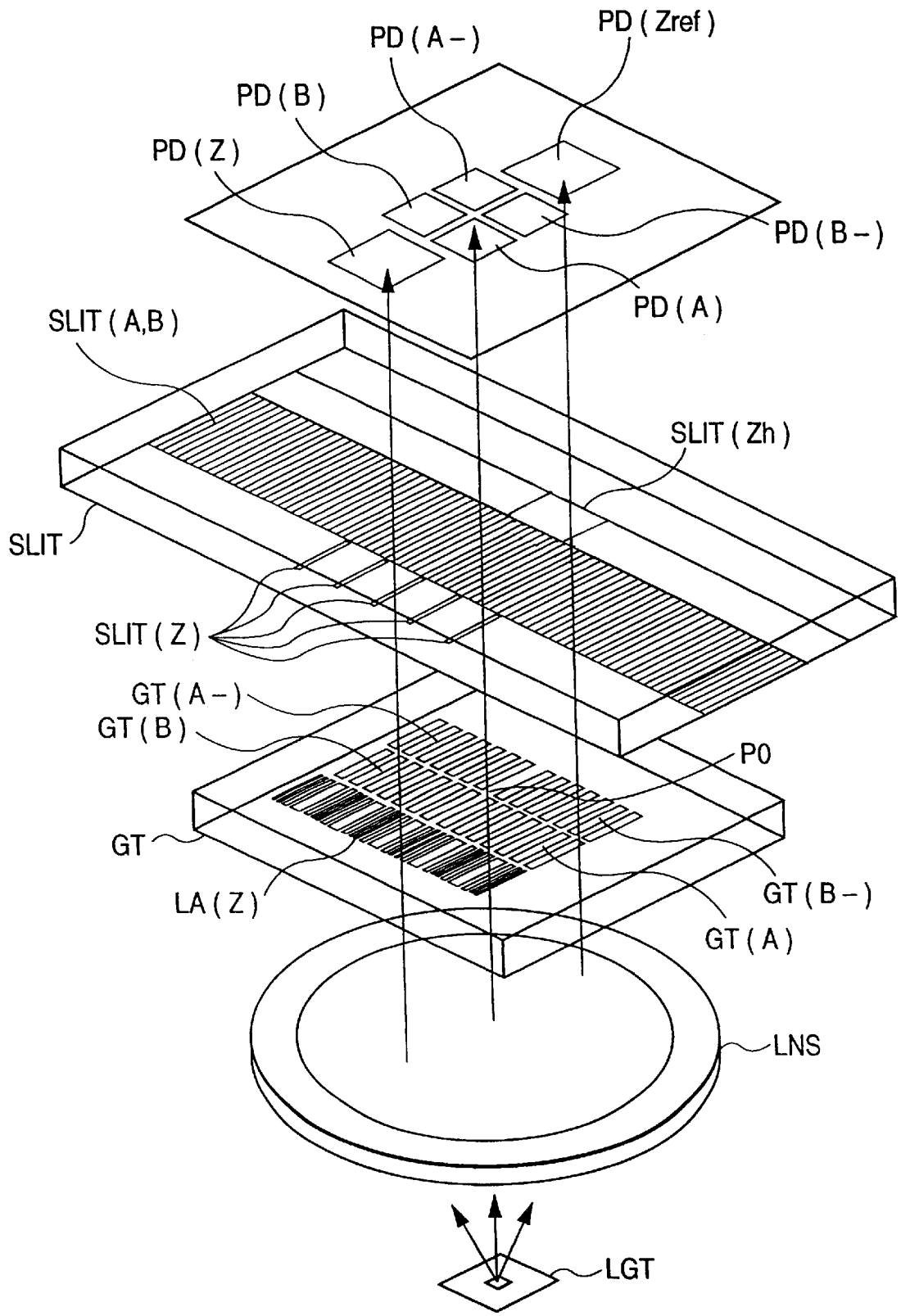
FIG. 45 is a schematic perspective view of principal part of the 12th embodiment of the present invention.

FIG. 45 is a schematic perspective view showing principal part of the 12th embodiment of the present invention. FIG. 45 is a perspective of an embodiment in which, in addition to FIG. 40, an origin vicinity detection track SLIT(Zh) is arranged to be juxtaposed with the origin lens array track and the incremental phase diffraction grating track on the slit scale SLIT, and a semi-transparent pattern reaches a position above the origin vicinity detection track when a light beam illuminates the entire origin lens array.

Figure 46A:
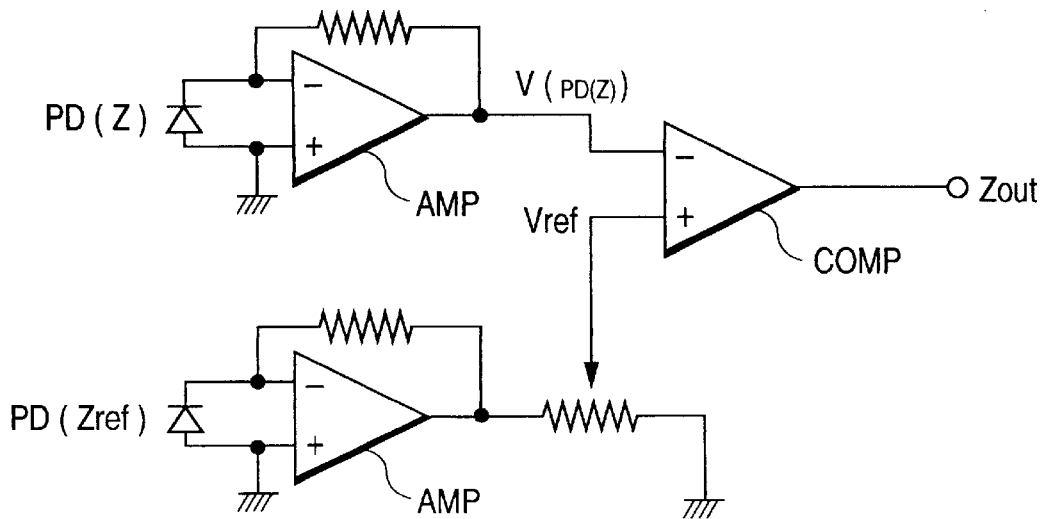
FIGS. 46A and 46B are explanatory views of conversion into a digital origin signal in the 12th embodiment of the present invention.

FIG. 46A shows an embodiment of a circuit for obtaining a digital origin signal from the output signals from the light-receiving elements PD(Z) and PD(Zref). The optical amount level detected by the light-receiving element PD(Zref) is multiplied with an appropriate coefficient to make a reference voltage signal Vref, which is compared with an analog origin signal V(PD(Z)) by a comparator, thus binarizing the origin signal and outputting a binarized signal.

Figure 46B:
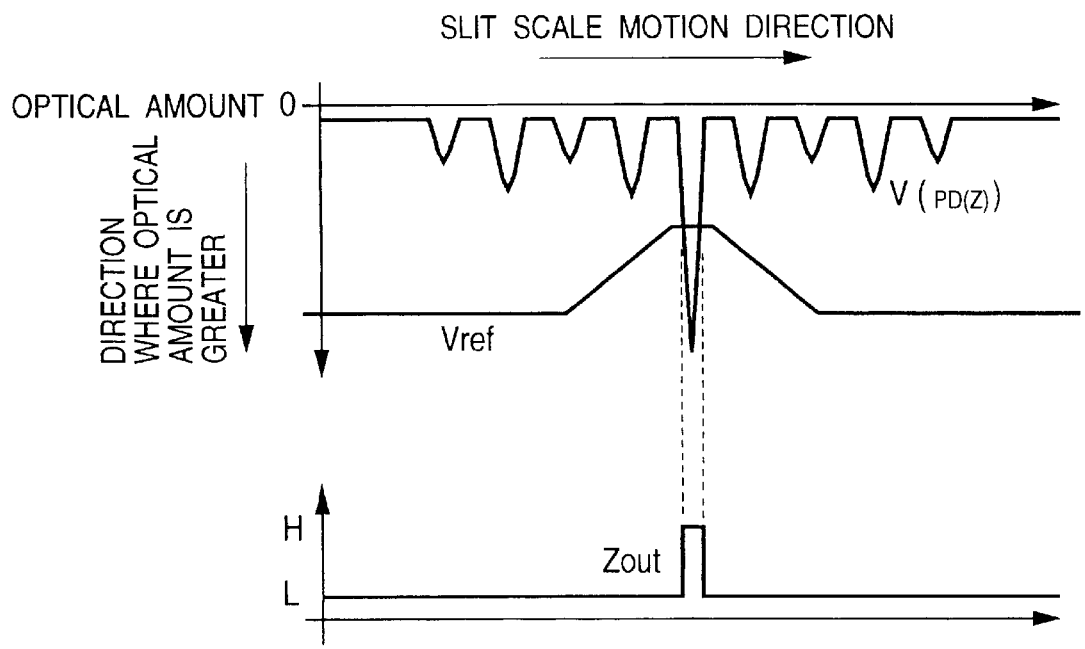

FIG. 46B is an explanatory view showing the state of changes in signal level in the circuit shown in FIG. 46A upon relative movement of the slit scale. In this embodiment, in addition to the feature of origin detection free from the influence of variations in optical amount of the light source, when the analog origin signal level in the embodiment shown in FIG. 36 or 37 is small or when a peak signal having a level which is smaller than that of the maximum peak signal but is negligible is present near the maximum peak signal as in the embodiment shown in FIG. 38 or 39, a triangular or trapezoidal origin vicinity detection signal shown in FIG. 46B can prevent an unwanted signal from being compared by the comparator.

In this embodiment, the origin vicinity detection semi-transparent portion pattern SLIT(Zh) on the slit scale obtains a semi-transparent effect by forming a three-dimensional phase diffraction grating only in the neighborhood of the origin to suppress straight light.

Figure 47:
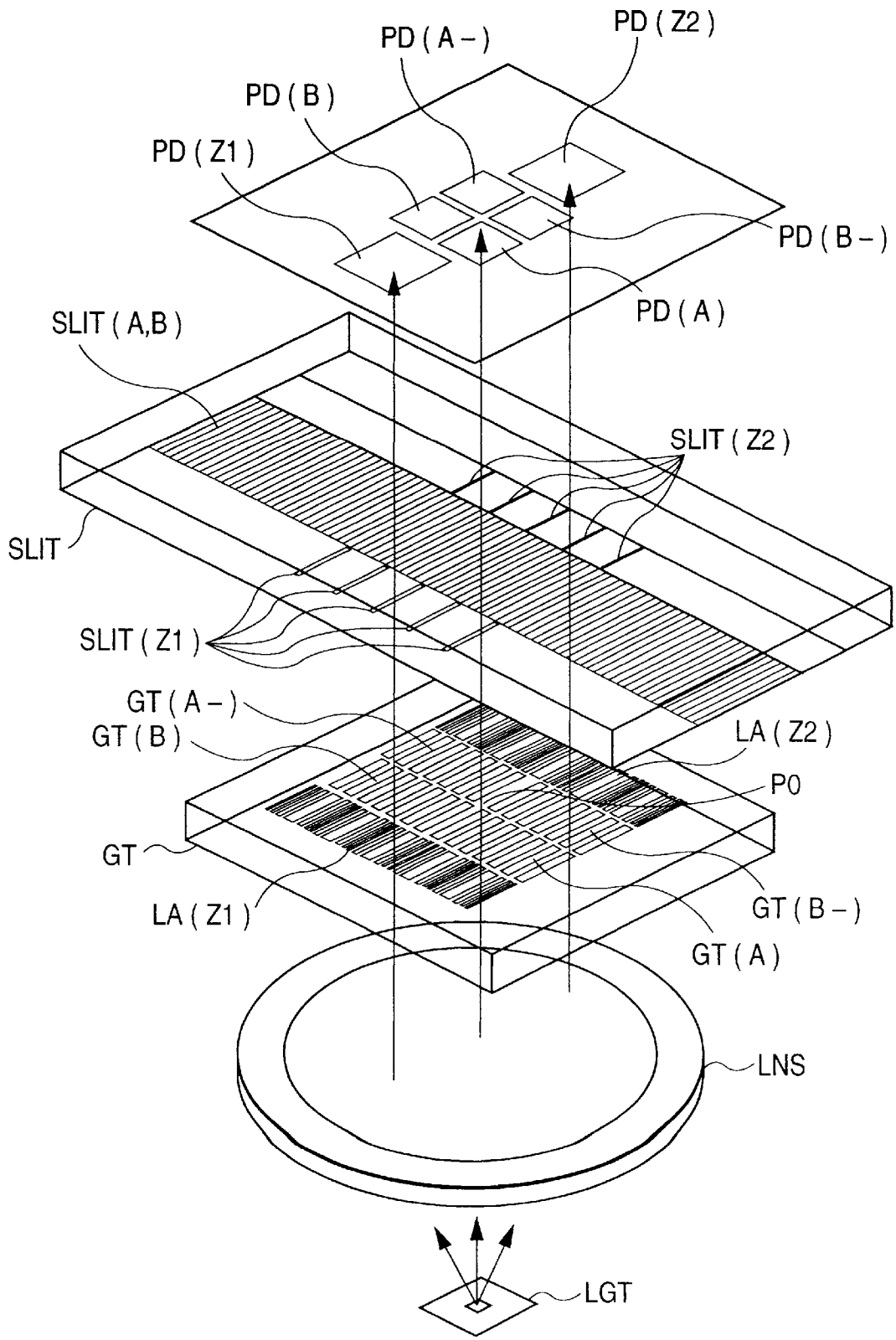
FIG. 47 is a schematic perspective view of principal part of the 13th embodiment of the present invention.

FIG. 47 is a schematic perspective view showing principal part of the 13th embodiment of the present invention. In this embodiment, as compared to the 10th embodiment shown in FIG. 40, another origin lens array track LA(Z2) is arranged to be Juxtaposed with an origin lens array track LA(Z1) and the incremental phase grating track on the phase grating plate GT, and is illuminated with the same collimated light beam as that which illuminates the origin lens array track and the incremental phase grating track on the phase grating plate GT. The light beam is transmitted through an origin slit grating array SLIT(Z1) and is received by a light-receiving element PD(Z1) for origin detection, and at the same time, the light beam is transmitted through a reversed slit array SLIT(Z2) for origin detection and is received by a light-receiving element PD(Z2). Other arrangements are the same as those in the 10th embodiment.

Figure 48A:
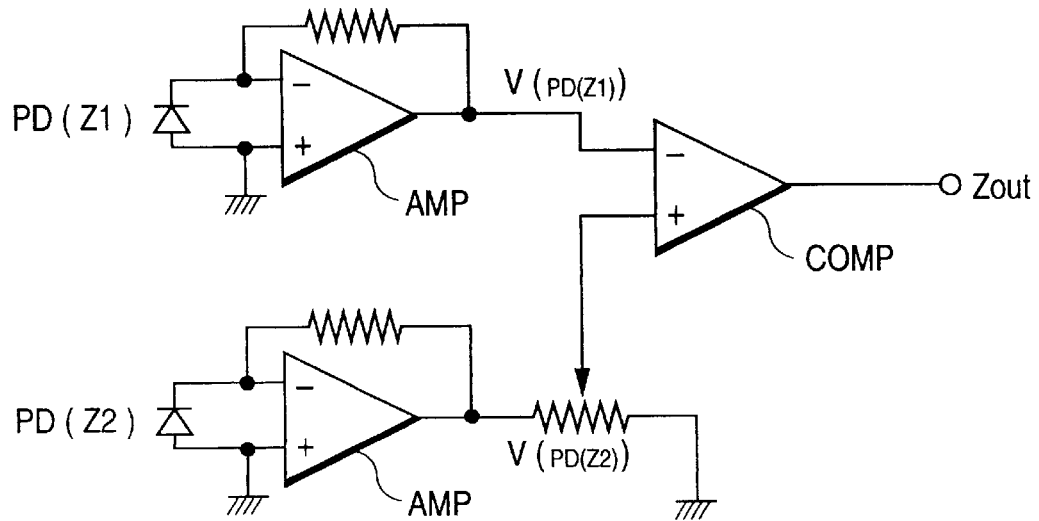
FIGS. 48A and 48B are explanatory views of conversion into a digital origin signal in the 13th embodiment of the present invention.
Figure 48B:
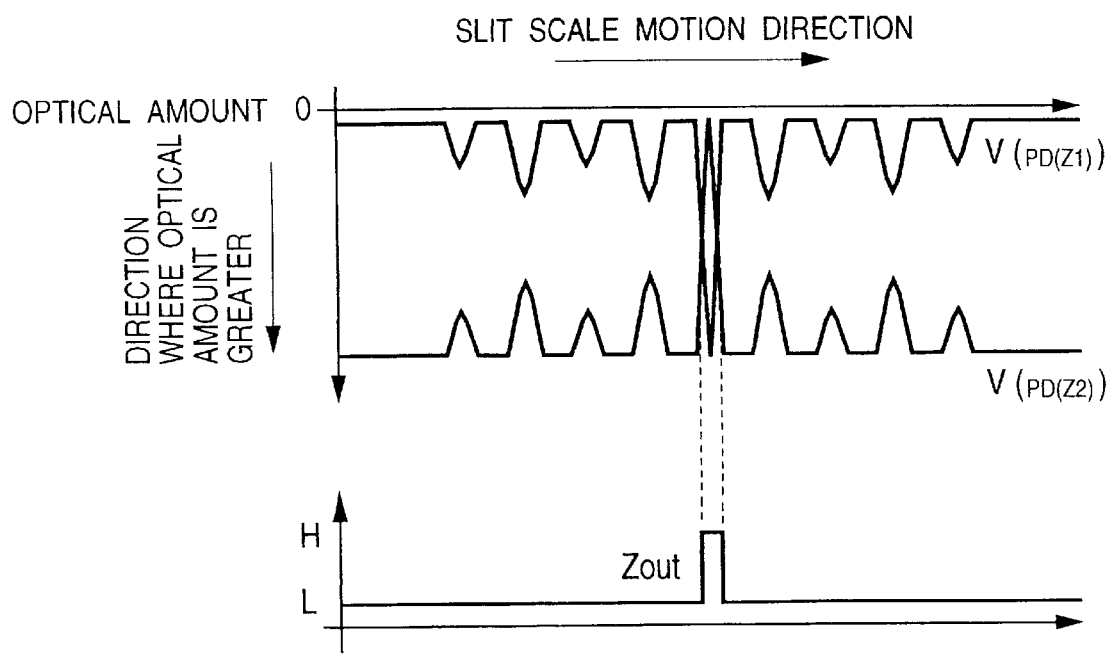

FIG. 48A is an explanatory view of a circuit for obtaining a digital origin signal from the output signals from the light-receiving elements PD(Z1) and PD(Z2). In FIG. 48A, two detected analog origin signals (PD(Z1)) and (PD(Z2)) which are inverted from each other are compared by a comparator to be binarized, and a binarized signal is output. FIG. 48B is an explanatory view showing the state of changes in signal level in the circuit shown in FIG. 48A upon relative movement of the slit scale SLIT.

In this embodiment, in addition to the feature of origin detection free from the influence of variations in optical amount of light from the light source means, when the analog origin signal shown in FIG. 36 or 37 is small or when a peak signal having a level which is smaller than that of the maximum peak signal but is negligible is present near the maximum peak signal as in the embodiment shown in FIG. 38 or 39, the amplitude difference between peak signals can be increased, and binarization of the comparator can be performed more stably.

Figure 49A:
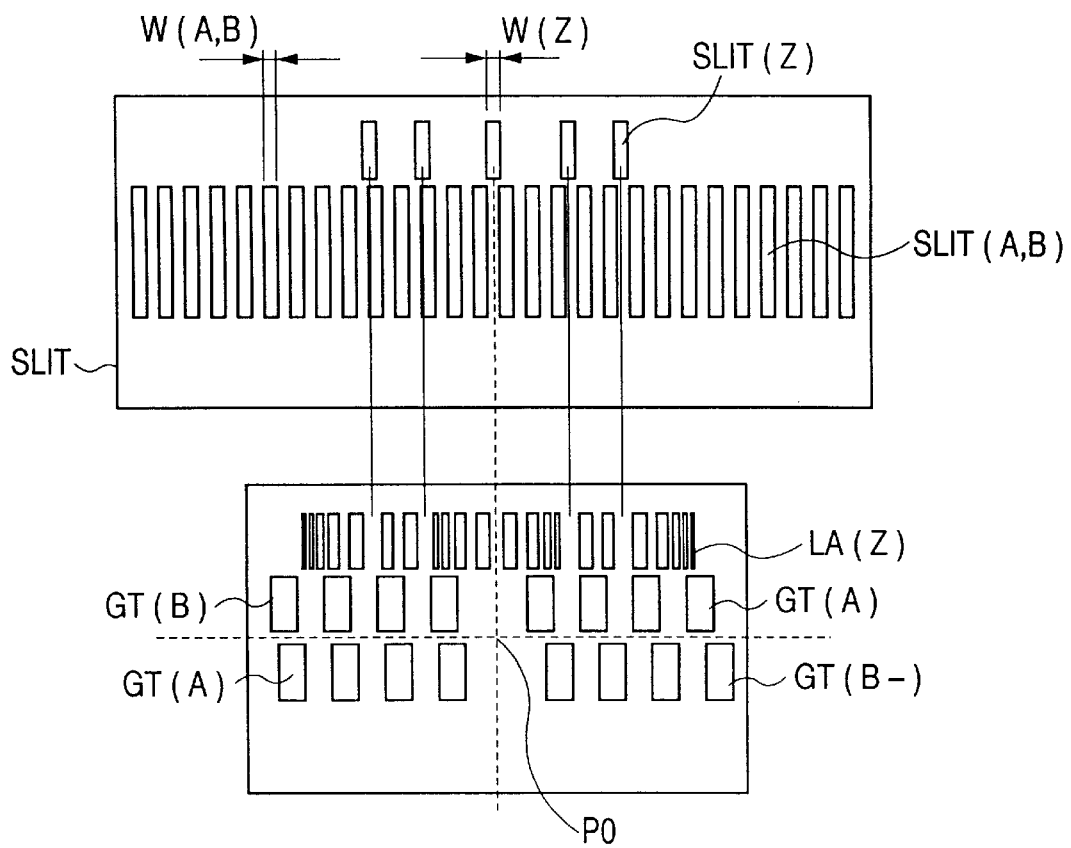
FIGS. 49A and 49B are explanatory views of a synchronization method of an origin signal and an incremental signal in the 14th embodiment of the present invention.
Figure 49B:
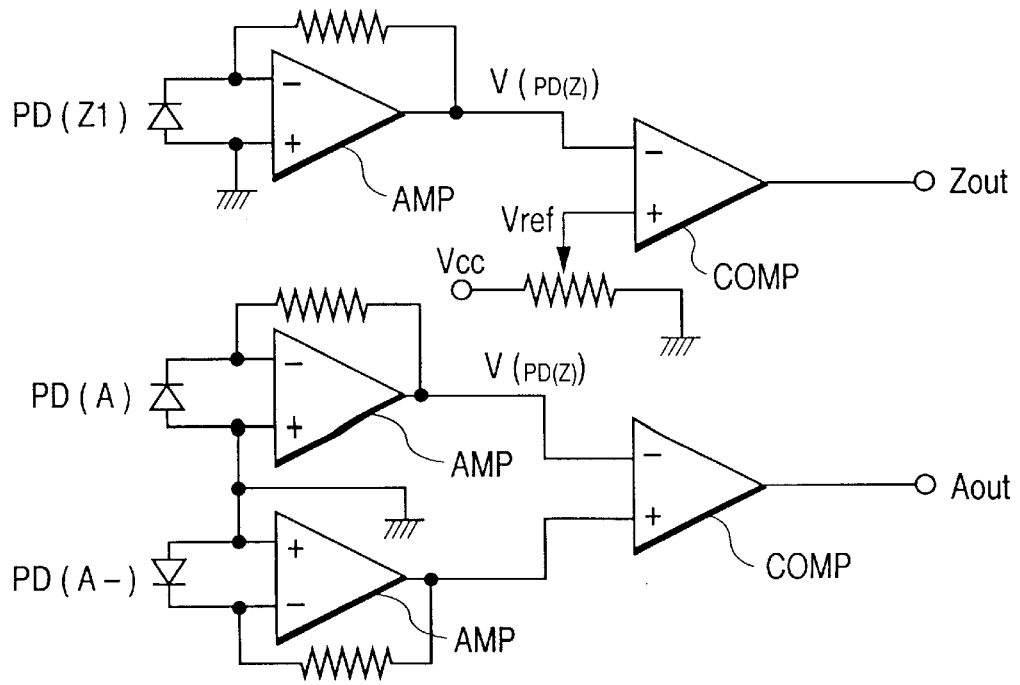

In the displacement information detection apparatus according to the present invention, the incremental and origin signals are synchronized, and a method of synchronizing the two signals will be explained below. FIGS. 49A and 49B are explanatory views of the 14th embodiment when the incremental and origin signals are synchronized in the present invention. As shown in FIG. 49A, let $W(A,B)$ be the slit width of each of the slit gratings SLIT(A) and SLIT(B) for an incremental signal, and $W(Z)$ be the slit width of the origin slit grating array SLIT(Z). Then, these widths are determined so that:

$$W(A,B)=W(Z)$$

As a result, an incremental signal Aout and an origin signal Zout obtained by binarization circuits shown in FIG. 49B have substantially equal detection resolutions (in the case of a digital origin signal obtained by binarizing a peak signal of an analog origin signal by a ½ voltage).

In this embodiment, since both incremental and origin signals are generated by detecting, using the single slit substrate, the intensity pattern and condensed light projected by the single scale SCL onto a space, the detection timings of the two signals hardly shift from each other. More specifically, since the relationship between the origin and incremental signals is optically and mechanically fixed, the two signals are substantially synchronized.

Figure 50:
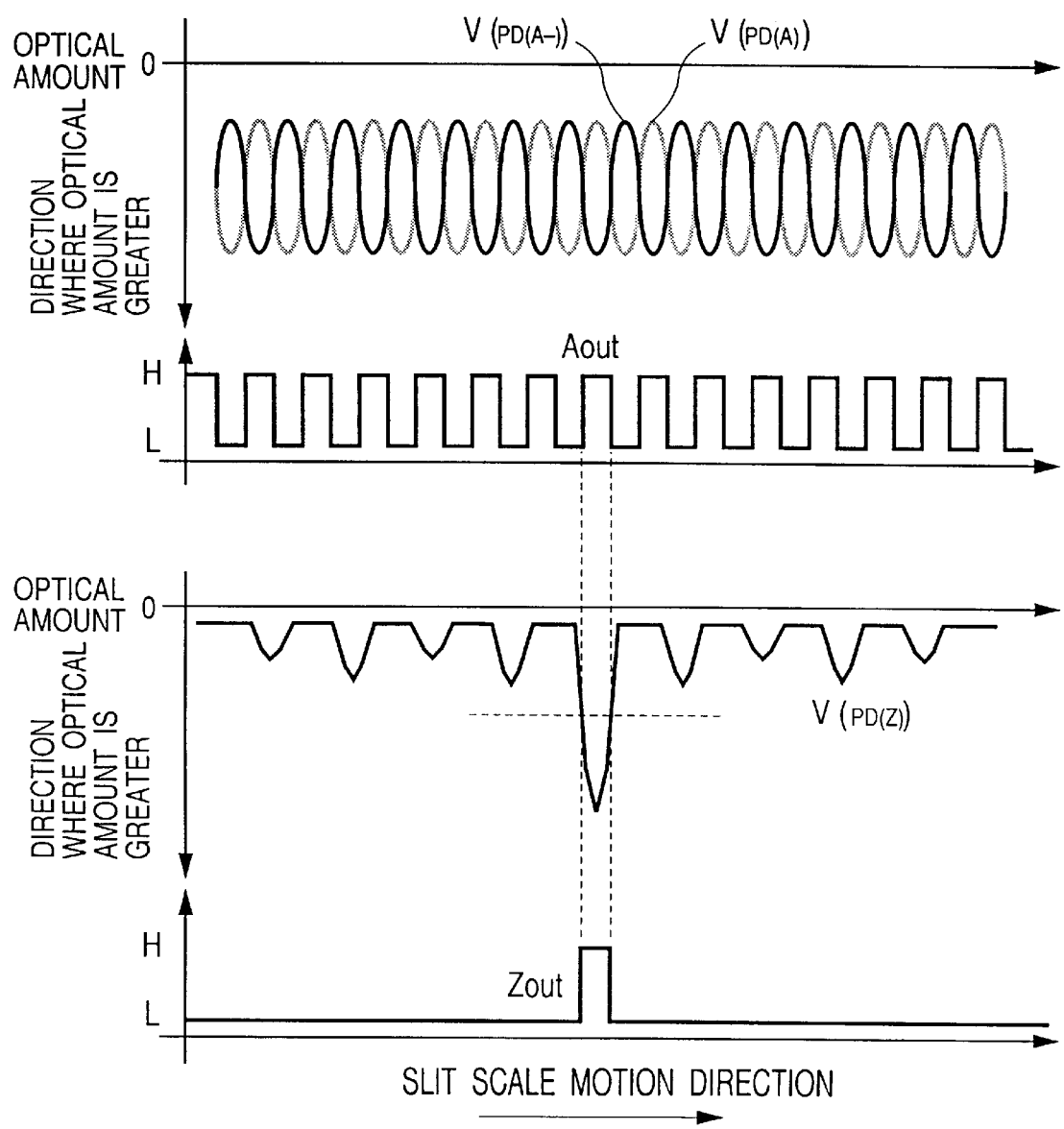
FIG. 50 is an explanatory view of the synchronization method of an origin signal and an incremental signal in the 14th embodiment of the present invention.

FIG. 50 is an explanatory view showing changes in origin signal level and incremental signal level in the circuit shown in FIG. 49B upon movement of the slit scale. As shown in FIG. 50, an origin signal Zout and an incremental signal Aout are substantially synchronized. In FIG. 50, PD(A) and PD(A-) are the light-receiving elements for an A-phase incremental signal, which are 180° out of phase.

Figure 51A:
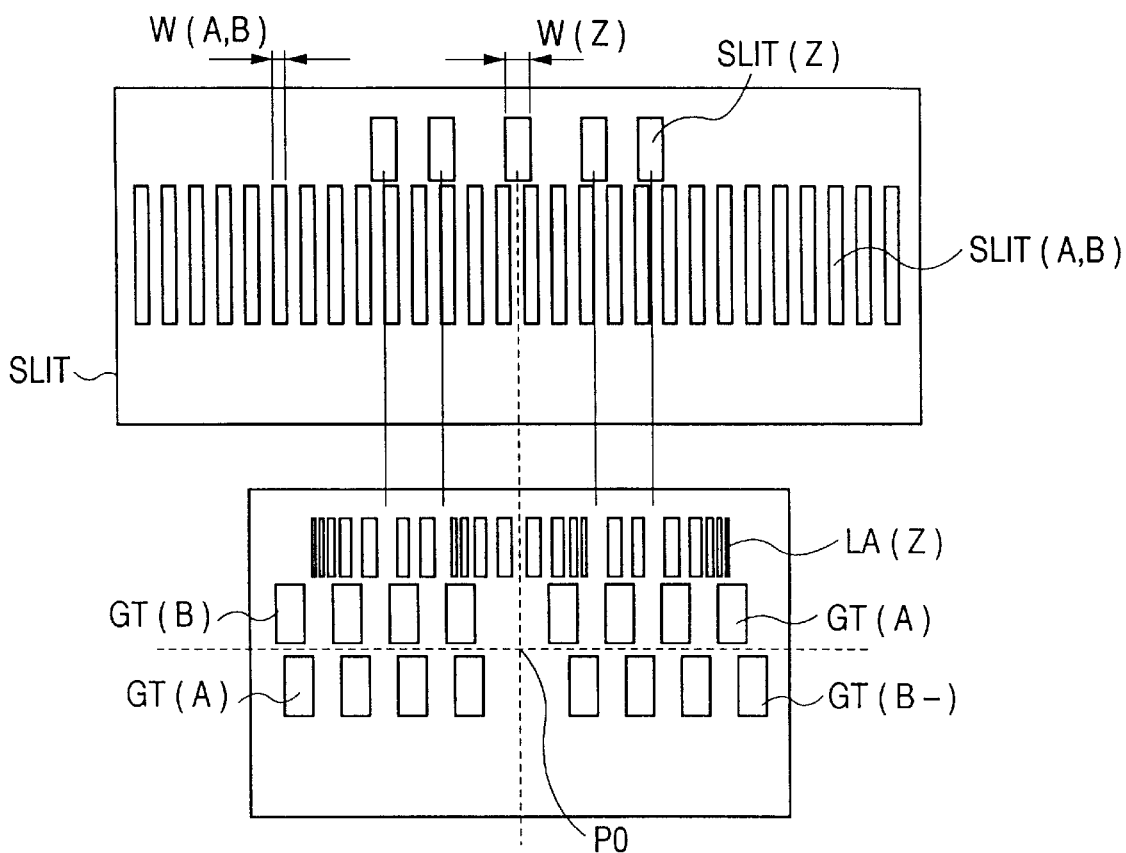
FIGS. 51A and 51B are explanatory views of a synchronization method of an origin signal and an incremental signal in the 15th embodiment of the present invention.
Figure 51B:
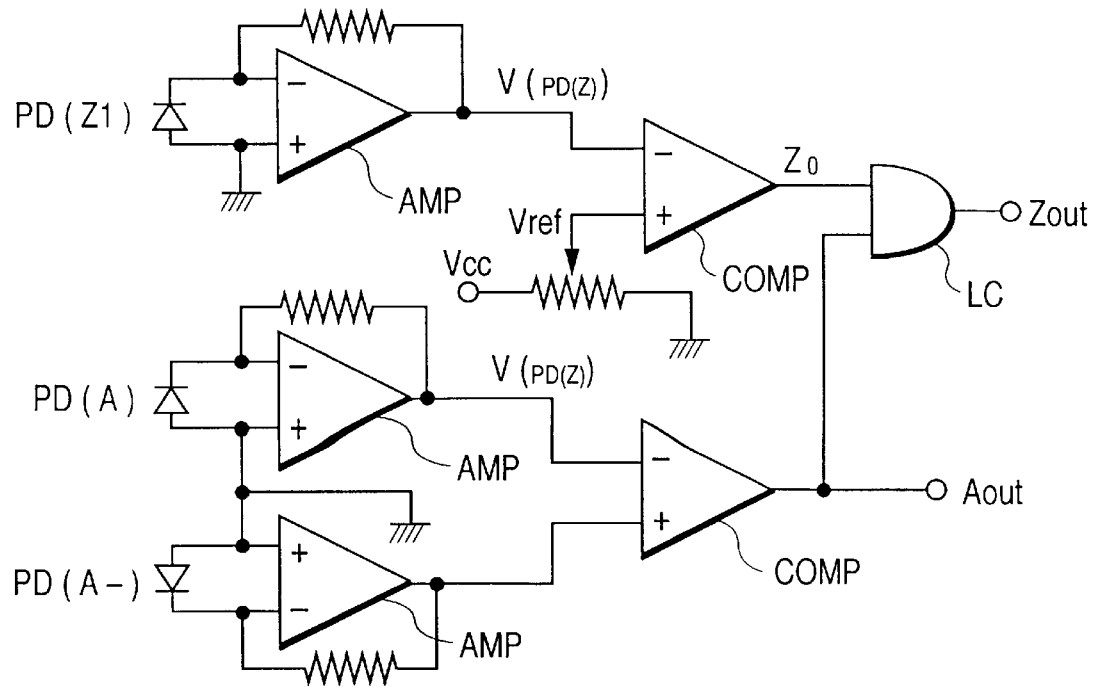

FIGS. 51A and 51B are explanatory views of the 15th embodiment when the incremental and origin signals are synchronized in the present invention. In this embodiment, as compared to the 14th embodiment shown in FIGS. 49A and 49B, the detection resolution of the origin signal is deliberately set to be ½ that of the incremental signal by setting the slit widths so that the relationship of W(A,B)= W(Z)/2 is substantially satisfied.

An origin signal Z0 obtained via a binarization circuit shown in FIG. 51B, and an incremental signal Aout are ANDed by a logic circuit LC, thereby obtaining an origin signal Zout which is perfectly synchronized with the incremental signal Aout including its phase.

Figure 52:
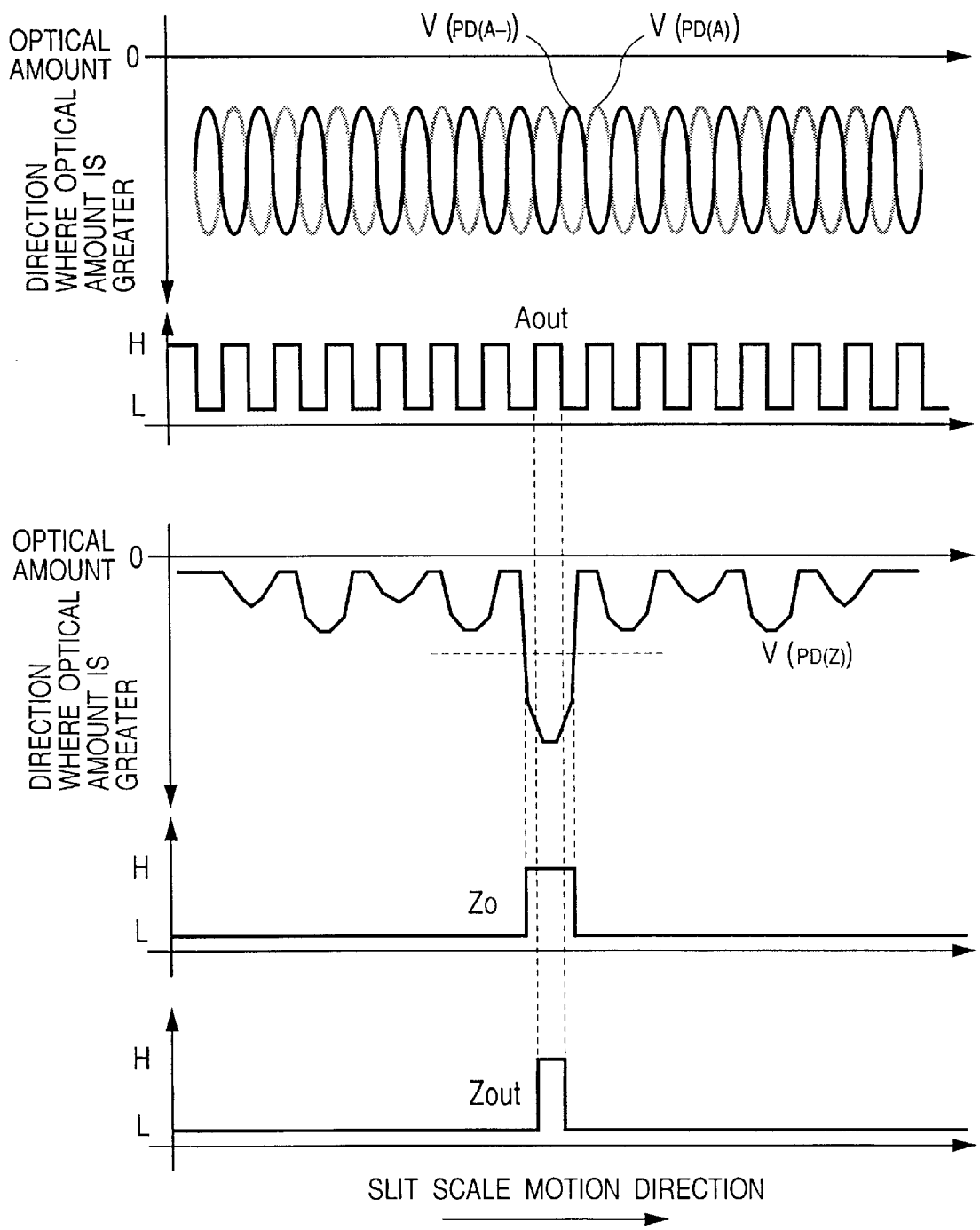
FIG. 52 is an explanatory view of the synchronization method of an origin signal and an incremental signal in the 15th embodiment of the present invention.

FIG. 52 is an explanatory view showing changes in origin signal level and incremental signal level in the circuit shown in FIG. 51B upon relative movement of the slit scale. As shown in FIG. 52, the origin signal Zout and the incremental signal Aout are perfectly synchronously output. Note that PD(A) and PD(A-) in FIG. 52 are the light-receiving elements for an A-phase incremental signal, which are 180° out of phase.

Figure 53:
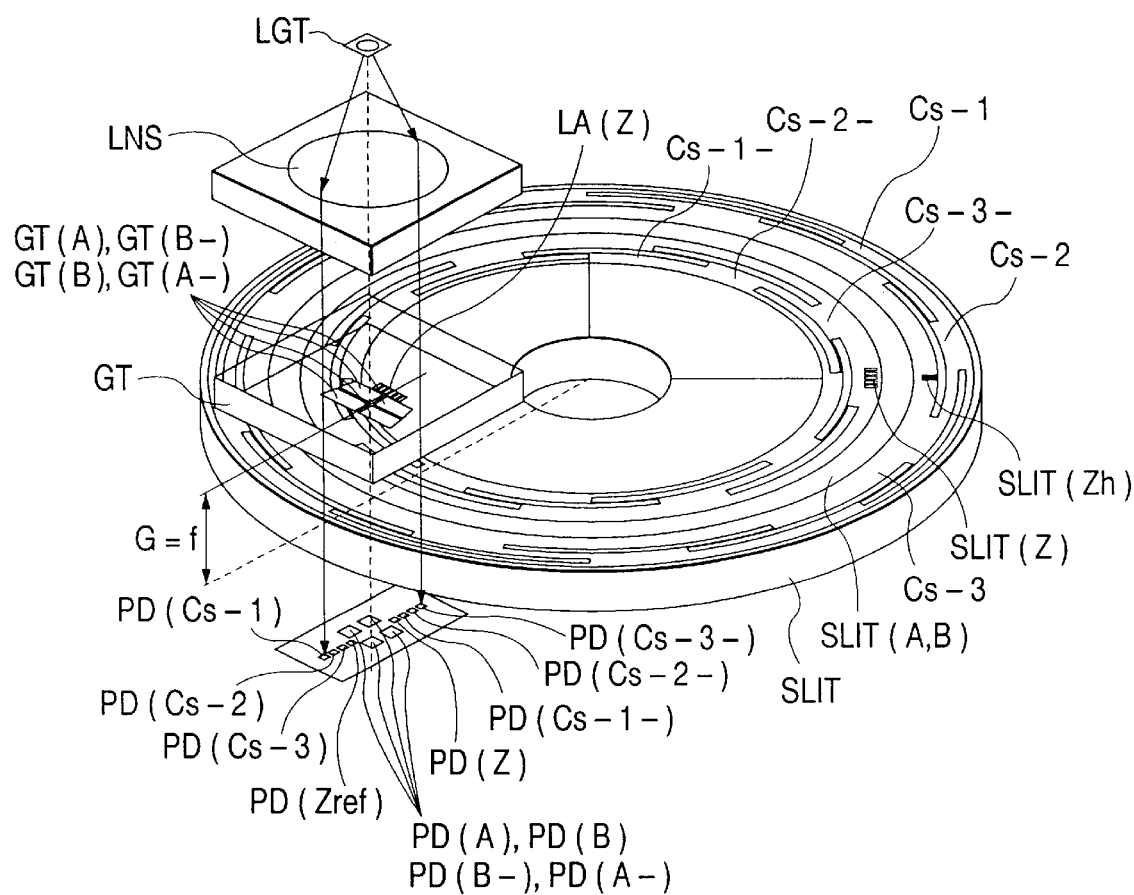
FIG. 53 is a schematic perspective view of principal part of a rotary encoder with an AC motor control signal detection function to which the above embodiment is applied.

FIG. 53 is a perspective view showing principal part of the optical arrangement used when the above-mentioned displacement information detection apparatus is applied to a rotary encoder with 8-pole AC motor control signal phases (Cs phases). In FIG. 53, linear phase gratings for an incremental signal to be formed on the phase grating plate GT are formed on an annular track as radial phase gratings GT(A), GT(B), GT(A-), and GT(B-). On the other hand, the slit scale SLIT is formed into a circular shape as a disk scale, and slits to be formed thereon are formed as radial slit phase gratings SLIT(A) and SLIT(B) having the same radiating central axis as that of the radial phase gratings GT(A), GT(B), GT(A-), and GT(B-).

Note that four-divided phase gratings GT(A), GT(B), GT(A-), and GT(B-) are formed on the phase grating plate GT to shift from each other by ⅛ pitches, as shown in FIG. 40 so that four-phase signals A, B, A-, and B- having a 90° phase difference therebetween are detected as incremental signals.

On the other hand, a light-receiving means PD receives signal light components using four light-receiving elements PD(A), PD(B), PD(A-), and PD(B-) in correspondence with the four phase gratings. Six patterns Cs-1, Cs-2, Cs-3, Cs-1-, Cs-2-, and Cs-3- of the 8-pole AC motor control signal phases (Cs phases) are formed on the slit scale SLIT as the presence/absence of arcuated aperture slits, and are formed on six tracks as intensity patterns having four periods/ revolution to have a 120° phase difference therebetween, since straight light of light beams transmitted through these patterns is transmitted through the aperture slits. Light beams are detected by corresponding light-receiving elements PD(Cs-1) to PD(Cs-3-). These signals are detected parallel to the incremental and origin signals.

In each of the above 10th to 15th embodiments, the arrangement may be modified as follows.

(B1) The origin lens array may comprise a spherical lens array that utilizes refraction. In this case, microlenses can be formed on the surface of a transparent substrate by, e.g., a replica method.

(B2) In the above embodiments, the origin lens array comprises a linear diffraction lens array, but may comprise a circular diffraction lens array that uses a circular zone plate as a phase grating. In this case, dot-like condensed light beams appear on the slit scale. Likewise, an elliptic diffraction lens may be used.

(B3) On the origin vicinity detection track, the origin vicinity detection semi-transparent portion comprises another light beam restriction means (e.g., a slit pattern) in place of the amplitude grating.

(B4) The origin pulse signal may be directly output as an analog origin signal without being binarized. Alternatively, an analog origin signal may be output after an unwanted signal is removed by an appropriate circuit.

(B5) AC motor control signal tracks and the like may be juxtaposed on the slit scale together with the origin slit grating track and the incremental slit grating track, and light beams transmitted through these tracks are simultaneously received by a single light-receiving element array, thus realizing an encoder that can output incremental signals, an origin signal, and AC motor control signals.

(B6) The slit scale may be replaced by a rotary disk to constitute a rotary information detection apparatus.

(B7) AC motor control signal tracks and the like may be juxtaposed on the movable slit scale together with the origin detection slit array track and the incremental signal slit track, and light beams transmitted through these tracks are simultaneously received by a single light-receiving element array, thus realizing an encoder that can output incremental signals, an origin signal, and AC motor control signals (Cs phases).

What is claimed is:

1. A displacement information detection apparatus comprising:
    a light generation portion;
    a first unit including a first grating for displacement information detection and a plurality of lens members for original detection;
    a second unit including a second grating for displacement detection, which cooperates with said first grating, and an origin detection mark;
    at least one first light-receiving element for receiving light generated by said light generation portion and propagated via said first and second gratings, and outputting a signal including relative displacement information between said first and second units; and
    at least one second light-receiving element for receiving light generated by said light generation portion and propagated via said plurality of lens members, said at least one second light-receiving element outputting a signal indicating an origin based on a change in light-receiving state when said origin detection mark is present in an optical path of light leaving said plurality of lens members.

2. An apparatus according to claim 1, wherein said first grating comprises a phase type diffraction grating, and said second grating comprises an amplitude grating.

3. An apparatus according to claim 2, wherein said plurality of lens members comprises a phase type diffraction grating lens.

4. An apparatus according to claim 2, wherein said first grating comprises a lamellar grating.

5. An apparatus according to claim 1, wherein said plurality of lens members condenses incident light into a dot pattern or a linear pattern.

6. An apparatus according to claim 5, wherein a width, on said second unit, of a light beam condensed by each of said plurality of lens members is designed to be not more than a width of a transmission or light-shielding portion of said origin detection mark.

7. An apparatus according to claim 1, wherein said first and second units are arranged, so that an interval between said plurality of lens members and said origin detection mark matches a focal length of said plurality of lens members.

8. An apparatus according to claim 1, wherein the signal indicating the origin output from said at least one second light-receiving element is a pulse signal.

9. An apparatus according to claim 8, further comprising a circuit for converting the pulse signal output from said at least one second light-receiving element into a rectangular wave signal.

10. An apparatus according to claim 1, wherein said origin detection mark has transparent and non-transparent patterns, and said apparatus further comprises a circuit generating a difference signal between signals output from two second light-receiving elements arranged in correspondence with the transparent and non-transparent patterns.

11. An apparatus according to claim 1, wherein said origin detection mark has patterns corresponding to said plurality of lens members.

12. An apparatus according to claim 11, wherein an arrangement of the plurality of patterns of said origin detection mark is substantially equal to a light beam pattern sequence projected by said plurality of lens members onto said second unit.

13. An apparatus according to claim 11, wherein at least some of said plurality of lens members are decentered to impart directivity to light beams that pass therethrough.

14. An apparatus according to claim 1, wherein said first grating for displacement information detection and said plurality of lens members for origin detection are arranged on a single substrate.

15. An apparatus according to claim 1, wherein said second grating for displacement detection and said origin detection mark are arranged on a single substrate.

16. An apparatus according to claim 1, wherein said light generation portion, said first unit, and said first and second light-receiving elements are integrated, and said second unit is movable relative to them.

17. An apparatus according to claim 16, wherein said second unit is pivotally arranged.

18. An apparatus according to claim 1, wherein said light generation portion, said second unit, and said first and second light-receiving elements are integrated, and said first unit is movable relative to them.

19. An apparatus according to claim 18, wherein said first unit is pivotally arranged.

20. An apparatus according to claim 11, wherein each of said plurality of lens members condenses light from said light generation portion so as to form a plurality of condensed lights of which intervals in arrangement are uneven.

21. An apparatus according to claim 11, wherein said origin detection mark includes a plurality of element patterns arranged unevenly.

\* \* \* \* \*

UNITED STATES PATENT AND TRADEMARK OFFICE
CERTIFICATE OF CORRECTION

PATENT NO. : 6,229,140 B1
DATED : May 8, 2001
INVENTOR(S) : Koh Ishizuka

Page 1 of 1

It is certified that error appears in the above-identified patent and that said Letters Patent is hereby corrected as shown below:

Column 1,
Line 52, "separated" should read -- separated from --.

Column 2,
Line 18, "errors" should read -- errors of --.

Column 26,
Line 17, "Juxtaposed" should read -- juxtaposed --.

Signed and Sealed this

Twenty-first Day of May, 2002

Attest:

*Attesting Officer*

JAMES E. ROGAN
*Director of the United States Patent and Trademark Office*